(12) United States Patent
Kaji

(10) Patent No.: US 11,109,006 B2
(45) Date of Patent: Aug. 31, 2021

(54) IMAGE PROCESSING APPARATUS AND METHOD

(71) Applicant: SONY CORPORATION, Tokyo (JP)

(72) Inventor: Yohsuke Kaji, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/645,102

(22) PCT Filed: Aug. 31, 2018

(86) PCT No.: PCT/JP2018/032333
§ 371 (c)(1),
(2) Date: Mar. 6, 2020

(87) PCT Pub. No.: WO2019/054204
PCT Pub. Date: Mar. 21, 2019

(65) Prior Publication Data
US 2020/0329220 A1 Oct. 15, 2020

(30) Foreign Application Priority Data
Sep. 14, 2017 (JP) .............................. JP2017-176426

(51) Int. Cl.
*H04N 9/31* (2006.01)
*G06T 7/33* (2017.01)
(52) U.S. Cl.
CPC ............. *H04N 9/3185* (2013.01); *G06T 7/33* (2017.01); *H04N 9/3147* (2013.01)
(58) Field of Classification Search
CPC ....... H04N 9/3185; H04N 9/3147; G06T 7/33
See application file for complete search history.

(56) References Cited

U.S. PATENT DOCUMENTS 9,316,831 B2 * 4/2016 Takahashi .......... G02B 27/0093
10,319,111 B2 * 6/2019 Kaji .......................... G06T 7/80
(Continued)

FOREIGN PATENT DOCUMENTS

JP 2000-227782 A 8/2000
JP 2006-114948 A 4/2006
(Continued)

OTHER PUBLICATIONS

Raskar et al., The Office of the Future: A Unified Approach to Image-Based Modeling and Spatially Immersive Displays, SIGGRAPH 98, Computer Graphics Proceedings, Annual Conference Series, Jul. 19-24, 1998, pp. 1-10, Orlando, Florida.

*Primary Examiner* — Brian P Yenke
(74) *Attorney, Agent, or Firm* — Paratus Law Group, PLLC

(57) ABSTRACT

There is provided an image processing apparatus and a method that allow for corresponding point detection at a higher speed and with higher accuracy. By outputting invisible light and visible light via the same optical system, an image of the invisible light and an image of the visible light are projected to cause a portion or all of the image of the invisible light and a portion or all of the image of the visible light to be projected in the same region on a projection surface. The present disclosure is applicable to, for example, an image processing apparatus, an image projecting apparatus, an image projection imaging apparatus, a control apparatus, an information processing apparatus, a projection imaging system, an image processing method, a program, or the like.

20 Claims, 47 Drawing Sheets

(56) References Cited

U.S. PATENT DOCUMENTS

| | | | |
|---|---|---|---|
| 10,349,023 B2* | 7/2019 | Kaji | H04N 9/3147 |
| 10,469,814 B2* | 11/2019 | Kaji | G06T 7/74 |
| 10,565,717 B2* | 2/2020 | Link | G06T 7/13 |
| 10,802,384 B2* | 10/2020 | Kaji | G02B 27/0068 |
| 10,852,127 B2* | 12/2020 | Katsuki | G01B 11/254 |
| 10,924,718 B2* | 2/2021 | Katsuki | G06T 7/521 |
| 2006/0291014 A1* | 12/2006 | Hirata | H04N 9/3194 358/504 |
| 2008/0151196 A1* | 6/2008 | Kinoshita | H04N 9/3161 353/69 |
| 2011/0249014 A1* | 10/2011 | Kolstad | H04N 5/332 345/589 |
| 2013/0250036 A1* | 9/2013 | Rosenberg | H04N 7/152 348/14.09 |
| 2015/0049308 A1* | 2/2015 | Mealing | G03B 17/54 353/31 |
| 2016/0180498 A1* | 6/2016 | Kobayashi | G06T 15/00 345/9 |
| 2017/0140221 A1* | 5/2017 | Ollila | G06K 9/00604 |
| 2017/0256069 A1* | 9/2017 | Link | G06T 7/13 |
| 2017/0347086 A1* | 11/2017 | Watanabe | H04N 13/25 |
| 2018/0164670 A1* | 6/2018 | Kaji | H04N 9/3185 |
| 2018/0255266 A1* | 9/2018 | Tamura | H04N 9/3194 |
| 2018/0364032 A1* | 12/2018 | Katsuki | G06T 3/00 |
| 2019/0028685 A1* | 1/2019 | Kaji | G06T 7/74 |
| 2019/0035109 A1* | 1/2019 | Kaji | G06K 9/4671 |
| 2020/0099906 A1* | 3/2020 | Sugisawa | G09G 5/00 |
| 2020/0128219 A1* | 4/2020 | Katsu Ki | H04N 9/3147 |
| 2020/0244938 A1* | 7/2020 | Wu | H04N 9/3179 |
| 2020/0288057 A1* | 9/2020 | Yamauchi | G06K 9/00577 |
| 2020/0355994 A1* | 11/2020 | Kaji | H04N 9/3194 |
| 2020/0389631 A1* | 12/2020 | Katsuki | G06T 5/50 |
| 2021/0035315 A1* | 2/2021 | Ota | H04N 9/3182 |
| 2021/0035316 A1* | 2/2021 | Shishido | H04N 9/3147 |

FOREIGN PATENT DOCUMENTS

| | | |
|---|---|---|
| JP | 2009-206800 A | 9/2009 |
| JP | 2011-182076 A | 9/2011 |
| JP | 2012-078490 A | 4/2012 |
| JP | 2012-118289 A | 6/2012 |
| JP | 2016-122186 A | 7/2016 |
| WO | WO 2016/002510 A1 | 1/2016 |
| WO | WO 2016/204068 A1 | 12/2016 |
| WO | WO 2017/104447 A1 | 6/2017 |

* cited by examiner

| TYPE | Circle | Disc | Rectangle Vertical | Rectangle Horizontal |
|---|---|---|---|---|
| VARIABLE PATTERN | ● | ○ | ▬ | ▮ |

FIG. 36

| TYPE | Circle | Disc | Rectangle Vertical | Rectangle Horizontal |
|---|---|---|---|---|
| VARIABLE PATTERN | ● | ○ | ▬ | ▮ |
| CODE | 0 | 1 | 2 | 3 |

IMAGE PROCESSING APPARATUS AND METHOD

CROSS REFERENCE TO PRIOR APPLICATION

This application is a National Stage Patent Application of PCT International Patent Application No. PCT/JP2018/032333 (filed on Aug. 31, 2018) under 35 U.S.C. § 371, which claims priority to Japanese Patent Application No. 2017-176426 (filed on Sep. 14, 2017), which are all hereby incorporated by reference in their entirety.

TECHNICAL FIELD

The present disclosure relates to an image processing apparatus and a method, and in particular, to an image processing apparatus and a method that allow for a corresponding point detection at a higher speed and with higher accuracy.

BACKGROUND ART

In order to reduce distortion of an projected image projected by a projector or to align projected images projected by a plurality of projectors, there has been a method in which an image of a projected image is captured by a camera, and geometric correction of the projected image is performed with use of the captured image in accordance with a position of the projector, a posture of the projector, a projected surface shape, and the like. In a case of such a method, it has been necessary to determine corresponding points of the projected image and the captured image.

For example, a method of embedding a gray code in a projected image has been proposed as on-line sensing, which is a technique of obtaining a corresponding point while projecting an image of a content or the like (see, for example, NPL 1). Further, as another method, a method of projecting a pattern image with the use of a light source of an invisible region has also been considered.

CITATION LIST

Non-Patent Literature

NPL 1: Imperceptible Structured Light Ramesh Raskar, SIGGRAPH 98

SUMMARY OF THE INVENTION

Problem to be Solved by the Invention

However, in the case of the ISL described in NPL 1, positive and negative pattern images need to be projected. Therefore, there has been a possibility that time required for the corresponding point detection increases. For this reason, for example, in a case where a moving body is used as a projection surface, there has been a possibility that the process does not follow variation in a shape or a posture of the projection surface, and the accuracy of the corresponding point detection decreases.

Further, also in a case where a pattern image is projected with the use of a light source of an invisible region, for example, in a case where a moving body is used as a projection surface, it has been difficult to achieve consistency between a configuration that performs projection and imaging in the invisible region and a configuration that performs projection and imaging in the visible region. Therefore, there has been a possibility that the accuracy of the corresponding point detection decreases.

The present disclosure is made in view of such a circumstance, and makes it possible to perform corresponding point detection at a higher speed and with higher accuracy.

Means for Solving the Problem

An image processing apparatus of an aspect of the present technology is an image processing apparatus including a projecting unit that outputs invisible light and visible light via the same optical system and thereby projects an image of the invisible light and an image of the visible light to cause a portion or all of the image of the invisible light and a portion or all of the image of the visible light to be projected in the same region on a projection surface.

An image processing method of an aspect of the present technology is an image processing method including outputting, by an image processing apparatus, invisible light and visible light via the same optical system and thereby projecting an image of the invisible light and an image of the visible light to cause the image of the invisible light and the image of the visible light to be superimposed on each other.

In the image processing apparatus and the method of an aspect of the present technology, the invisible light and the visible light are outputted via the same optical system. Thereby, the image of the invisible light and the image of the visible light are so projected as to be superimposed on each other.

Effects of the Invention

According to the present disclosure, it is possible to process an image. In particular, it is possible to perform corresponding point detection at a higher speed and with higher accuracy.

BRIEF DESCRIPTION OF DRAWINGS

FIG. 35 is a diagram illustrating an example of a variable pattern.

FIG. 36 is a diagram illustrating an example of a code assigned to a variable pattern.

MODES FOR CARRYING OUT THE INVENTION

Hereinafter, modes for carrying out the present disclosure (hereinafter, referred to as embodiments) will be described. It is to be noted that the description will be given in the following order.
1. Corresponding Point Detection Method
2. First Embodiment (Projection Imaging System)
3. Second Embodiment (Projection Imaging System•Projection Imaging Apparatus)
4. Others 1. Corresponding Point Detection Method <Corresponding Point Detection and Geometric Correction>

Figure 1:
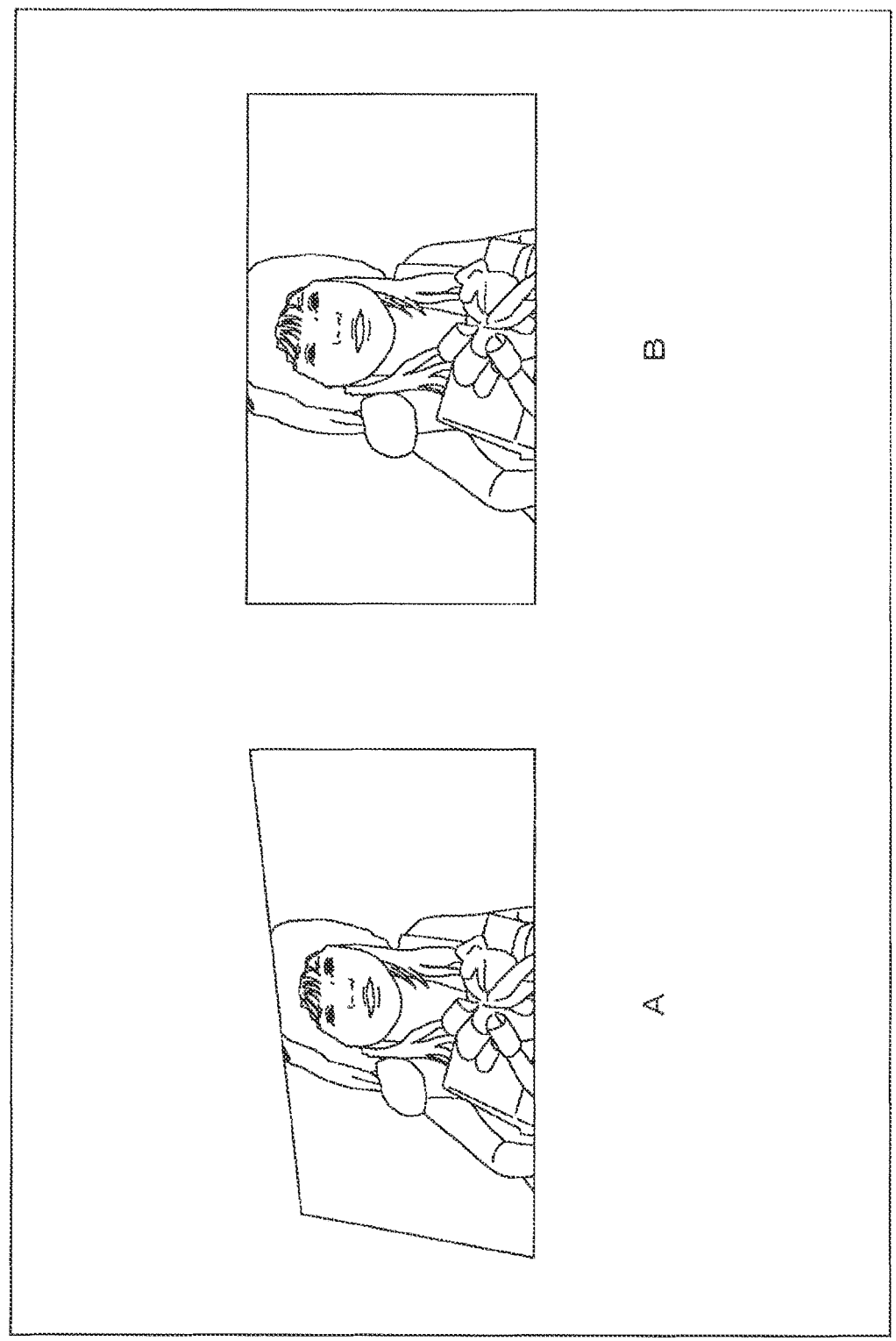
FIG. 1 is a diagram illustrating an example of a state of geometric correction.

Due to a posture (position, orientation, etc.) of a projector with respect to a projection surface (screen, wall, etc.), a shape of the projection surface, etc., an image that is projected (also referred to as a projected image) may be distorted and it may become difficult to view the image in some cases, for example, as illustrated in A of FIG. 1. In such a case, by performing geometric correction such as correction of distortion on the image projected by the projector, the distortion of the projected image can be reduced and it is possible to make it easier to view the projected image, as in a case of B of FIG. 1.

Figure 2:
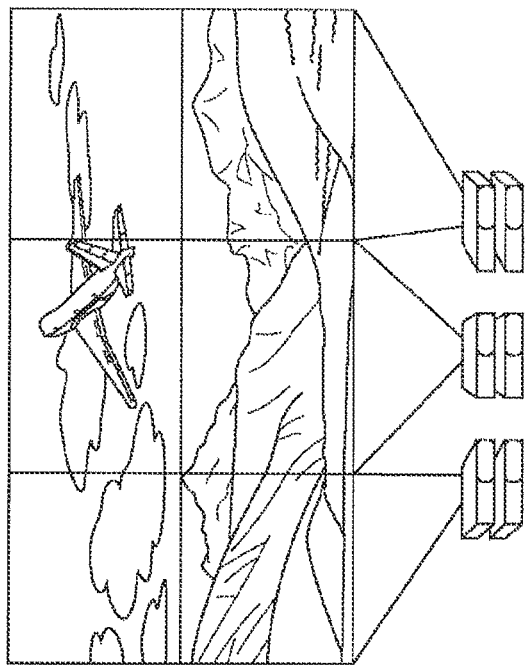
FIG. 2 is a diagram illustrating an example of a state of geometric correction.
Figure 2:
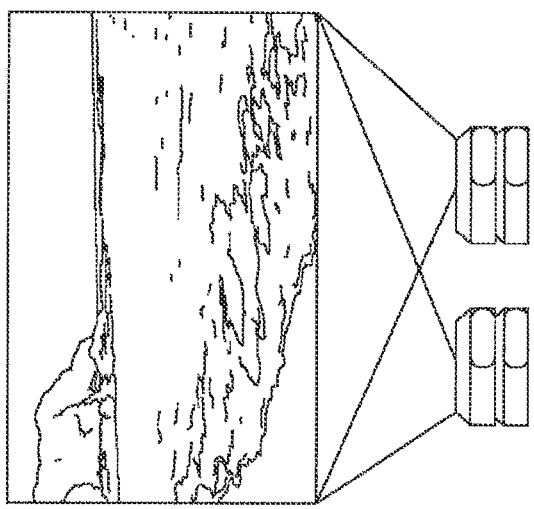

Further, as in an example in FIG. 2, there are systems in which images are projected by a plurality of projectors to form a single projected image. For example, as illustrated in A of FIG. 2, there is a method of increasing a contrast ratio and achieving a high dynamic range by projecting images at the same position from a plurality of projectors. Further, for example, as illustrated in B of FIG. 2, by arranging the projected images projected from the respective projectors, a projected image larger than the projected image projected by a single projector (projected image having a higher resolution than the projected image projected by a single projector) may be achieved. In cases of these methods, if the positional relationship between the projected images projected from the respective projectors is inappropriate, there is a possibility that the image quality of the projected image as a whole is decreased due to the projected images being superimposed while being displaced or an unnecessary gap being generated. Therefore, not only the distortion correction described above for the respective projected images but also geometric correction such as alignment of the projected images may be required in some cases.

Figure 3:
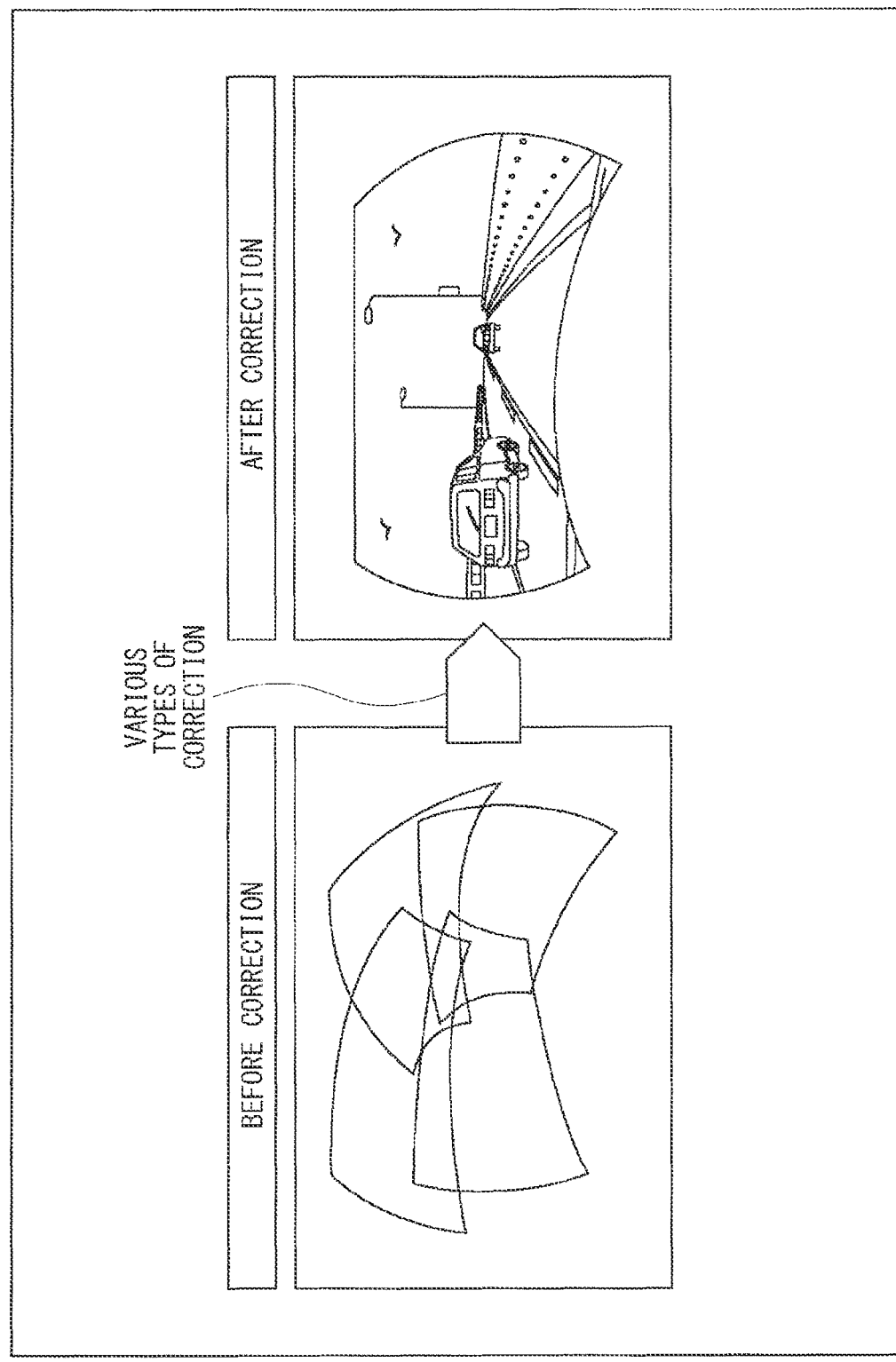
FIG. 3 is a diagram illustrating an example of a state of geometric correction.

By performing the geometric correction on the images to be projected in this manner, even in a case where images are projected from a plurality of projectors onto a projection surface of a curved surface as in an example in FIG. 3, the images can be projected as a single image. It is to be noted that, in a case where a large projected image is formed by arranging a plurality of projected image as in the example in B of FIG. 2 or the example in FIG. 3, alignment thereof can be made easier by superimposing (overlapping) portions of neighboring projected images as in the example in FIG. 3.

Such geometric correction can be performed manually by an operator or the like who operates the projector, but may require a complicated operation. Therefore, a method has been considered in which an image of a projected image projected by a projector is captured with use of a camera, and geometric correction is performed with use of the captured image.

Figure 4:
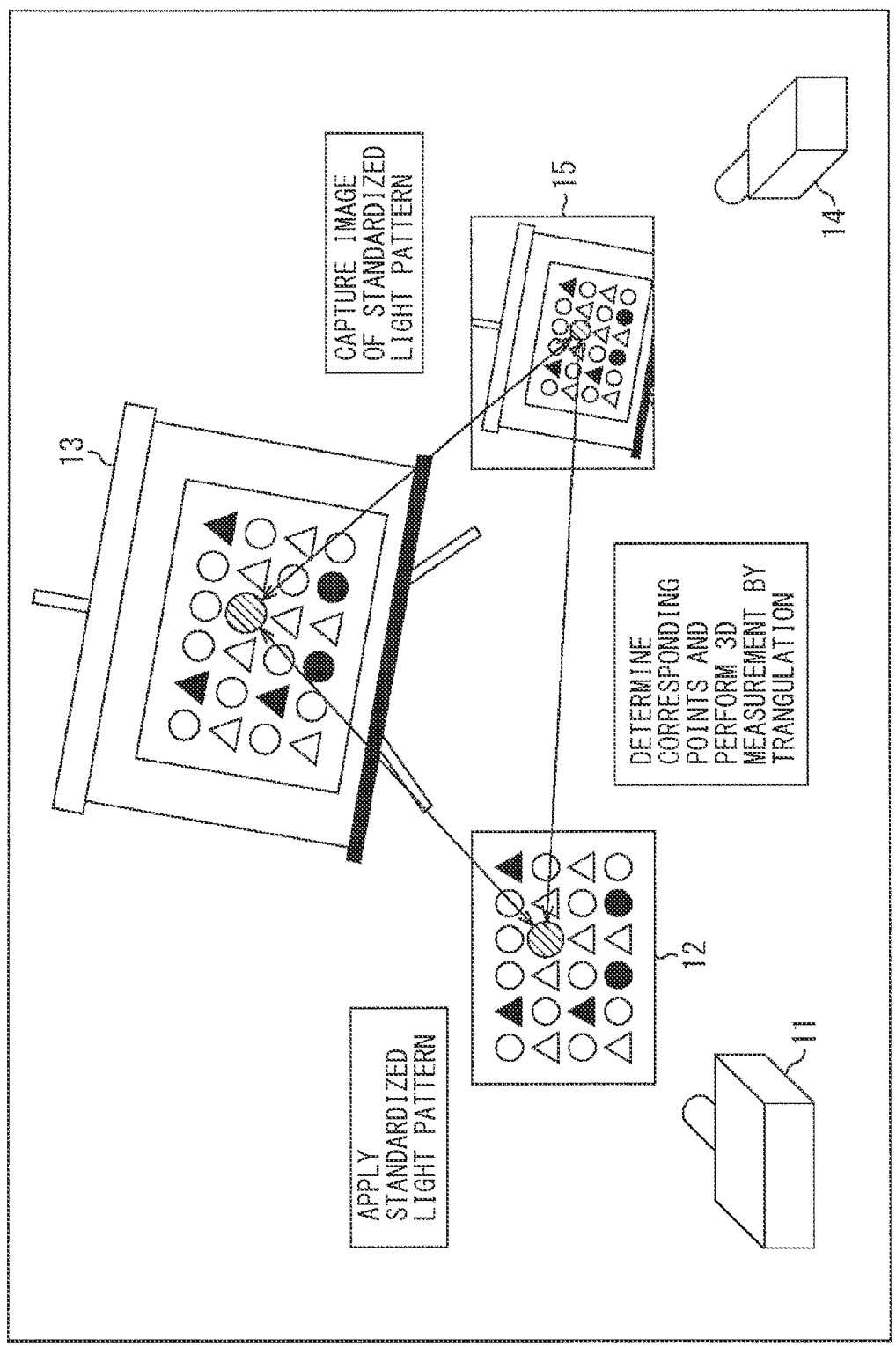
FIG. 4 is a diagram illustrating an example of a state of corresponding point detection.

For example, as in an example in FIG. 4, a standardized light pattern 12 of a predetermined pattern is projected from a projector 11 onto a screen 13, and an image of the projected standardized light pattern 12 is captured by a camera 14 to obtain a captured image 15. Then, corresponding points of the standardized light pattern 12 and the captured image 15 are obtained on the basis of the pattern of the standardized light pattern 12. The posture (positional relationship) of the projector 11 and the camera 14, the shape of the screen 13, and the like are obtained by triangulation or the like on the basis of the corresponding points, and geometric correction is performed on the basis of results thereof. In this manner, geometric correction can be performed more easily than in a case of performing it manually.

In a case where the geometric correction is performed with the use of a camera in this manner, corresponding points (a pixel of the projected image and a pixel of the captured image corresponding to the same position on the projection surface) need to be obtained of the projected image (which may be an image to be projected) and the captured image. That is, a correspondence relationship between a pixel of the camera 14 (captured image 15) and a pixel of the projector 11 (standardized light pattern 12) needs to be obtained.

Further, in a case where a plurality of projectors is used as in the examples in FIG. 2 and FIG. 3, the positional relationship between the projected images is also required to be obtained.

Figure 5:
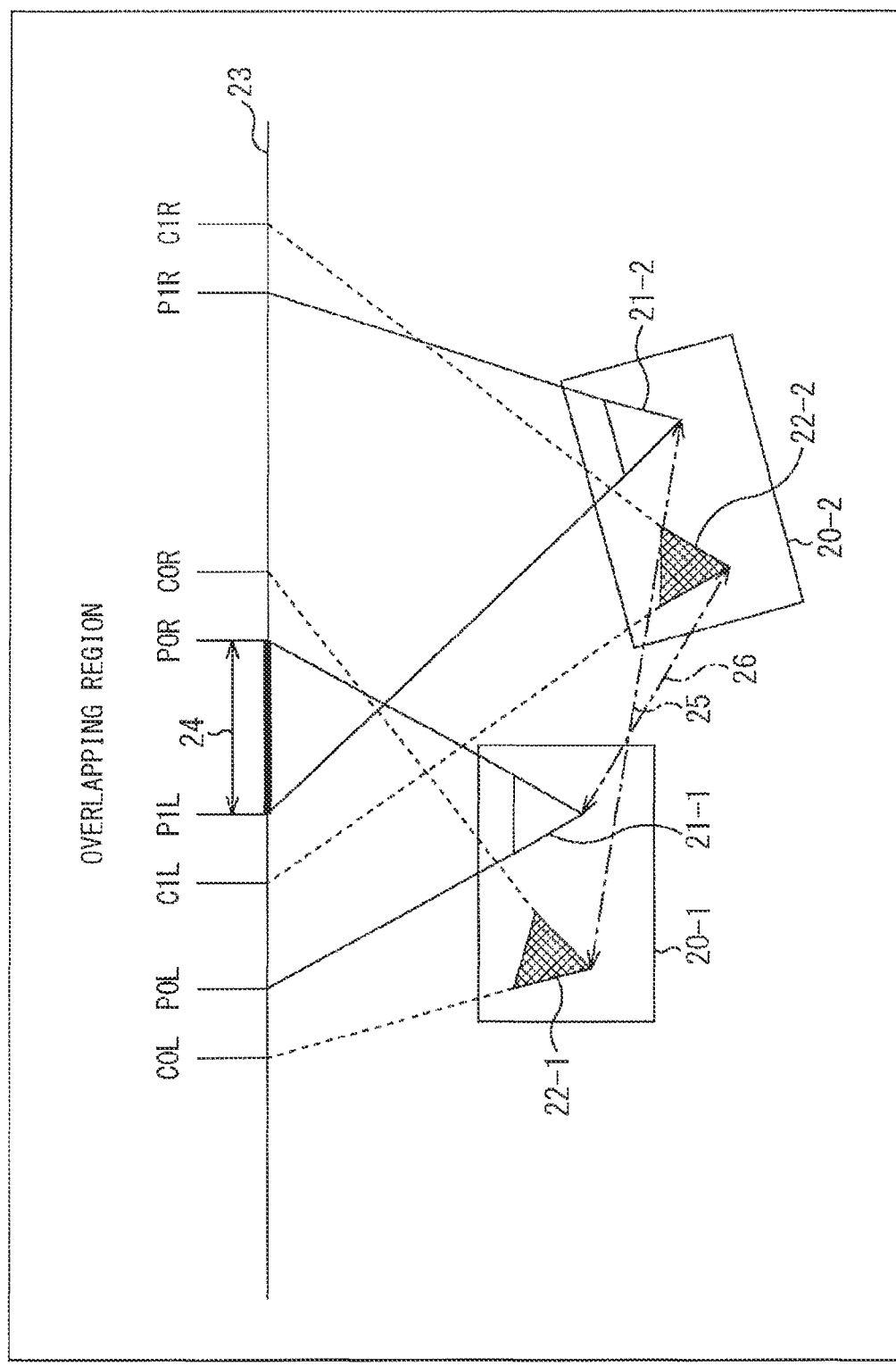
FIG. 5 is a diagram illustrating an example of a state of corresponding point detection.

For example, as in an example in FIG. 5, consider a case where a projection imaging apparatus 20-1 including a projecting unit 21-1 (projector) and an imaging unit 22-1 (camera) and a projection imaging apparatus 20-2 including a projecting unit 21-2 (projector) and an imaging unit 22-2 (camera) cooperate to project an image. Here, in a case where the projection imaging apparatus 20-1 and the projection imaging apparatus 20-2 do not need to be described being distinguished from each other, they are referred to as a projection imaging apparatus 20. Further, in a case where the projecting unit 21-1 and the projecting unit 21-2 do not need to be described being distinguished from each other, they are referred to as a projecting unit 21. Further, in a case where the imaging unit 22-1 and the imaging unit 22-2 do not need to be described being distinguished from each other, they are referred to as an imaging unit 22.

As illustrated in FIG. 5, a projection region (range of projected image) on a projection surface 23 in which projection is performed by the projecting unit 21-1 of the projection imaging apparatus 20-1 is a range from P0L to P0R. Further, a projection region on the projection surface 23 in which projection is performed by the projecting unit 21-2 of the projection imaging apparatus 20-2 is a range from P1L to P1R. In other words, a range (range from P1L to P0R) indicated by a double-headed arrow 24 is an overlapping region in which the projected images of the respective units are superimposed on each other.

It is to be noted that an imaging region (range included in the captured image) on the projection surface 23 in which imaging is performed by the imaging unit 22-1 of the projection imaging apparatus 20-1 is a range from C0L to C0R. Further, an imaging region (range included in the captured image) on the projection surface 23 in which imaging is performed by the imaging unit 22-2 of the projection imaging apparatus 20-2 is a range from C1L to C1R.

Figure 6:
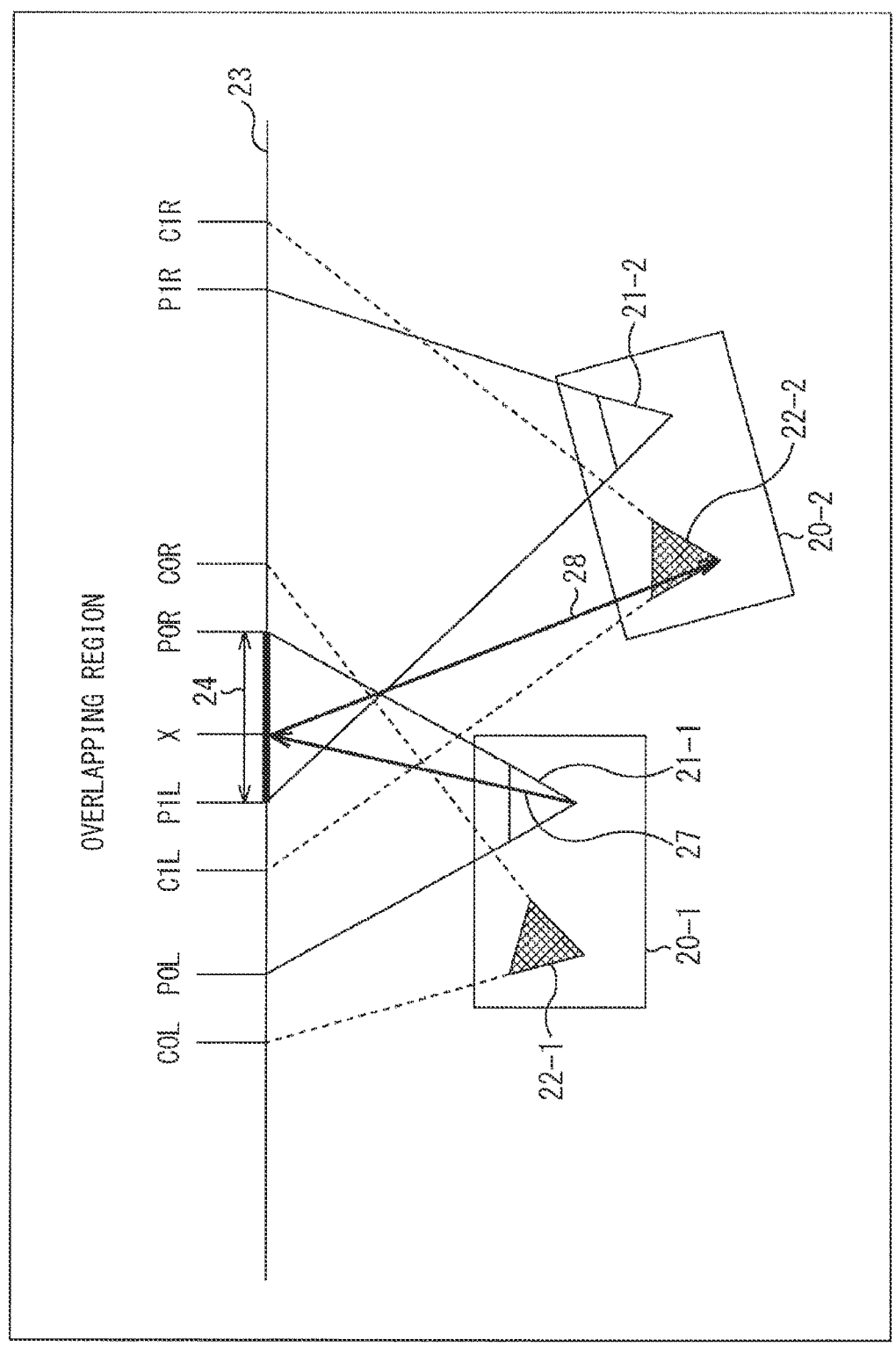
FIG. 6 is a diagram illustrating an example of a state of corresponding point detection.

In a case of such a system, as described above, in order to align the projected images with each other, not only the corresponding points of the projecting unit 21 and the imaging unit 22 in each projection imaging apparatus 20 need to be obtained, but also correspondence points of the projecting unit 21 and the imaging unit 22 between the projection imaging apparatuses 20 need to be obtained. Therefore, for example, as illustrated in FIG. 6, it is determined which pixel (arrow 28) of the imaging unit 22-2 receives light (arrow 27) that is applied from a certain pixel of the projecting unit 21-1 and reflected at X on the projection surface 23. Further, a similar pixel correspondence relationship is also obtained between the projecting unit 21-2 and the imaging unit 22-1.

In this manner, by obtaining the corresponding points of all of the projecting units 21 and the imaging units 22 for which the corresponding point can be obtained, it is possible to perform alignment of overlapping regions, i.e., a range indicated by the double-headed arrow 24 by geometric correction.

<On-Line Sensing>

It is conceivable that the corresponding point detection for such geometric correction is performed prior to starting projection of an image, there has been a possibility that the corresponding points are displaced due to an influence of an external disturbance such as a temperature or vibration, etc. after the initial installation and during the projection of the image. If the corresponding points are displaced, geometric correction becomes inappropriate. Therefore, there has been a possibility that distortion or misalignment occurs in the projected image.

In such a case, it is required to re-detect the corresponding points; however, it is not preferable for a user viewing the image that the projection of the image is therefore interrupted (there has been a possibility of decreasing a degree of satisfaction). Therefore, a method (on-line sensing) of detecting corresponding points while continuing to project an image has been considered.

As an on-line sensing technique, for example, a method using invisible light such as Infrared, a method using an image feature amount such as SIFT, an ISL (Imperceptible Structured Light) method, or the like has been considered. In a case of the method using invisible light such as Infrared, a projector projecting invisible light (for example, an Infrared projector) is additionally required, which may increase costs. Further, in a case of the method using the image feature amount such as SIFT, since detection accuracy or density of the corresponding points depends on the image contents to be projected, it has been difficult to perform corresponding point detection with stable accuracy.

In contrast, in the case of the ISL method, since visible light is used, it is possible to suppress an increase in system components (that is, an increase in cost). Further, the corresponding point detection can be performed with stable accuracy independently of an image to be projected.

<ISL Method>

The ISL method is a technique in which a structured light pattern, which is an image of a predetermined pattern, is reversed in positive and negative directions and embedded in a projected image to be projected as not to be perceived by a human.

Figure 7:
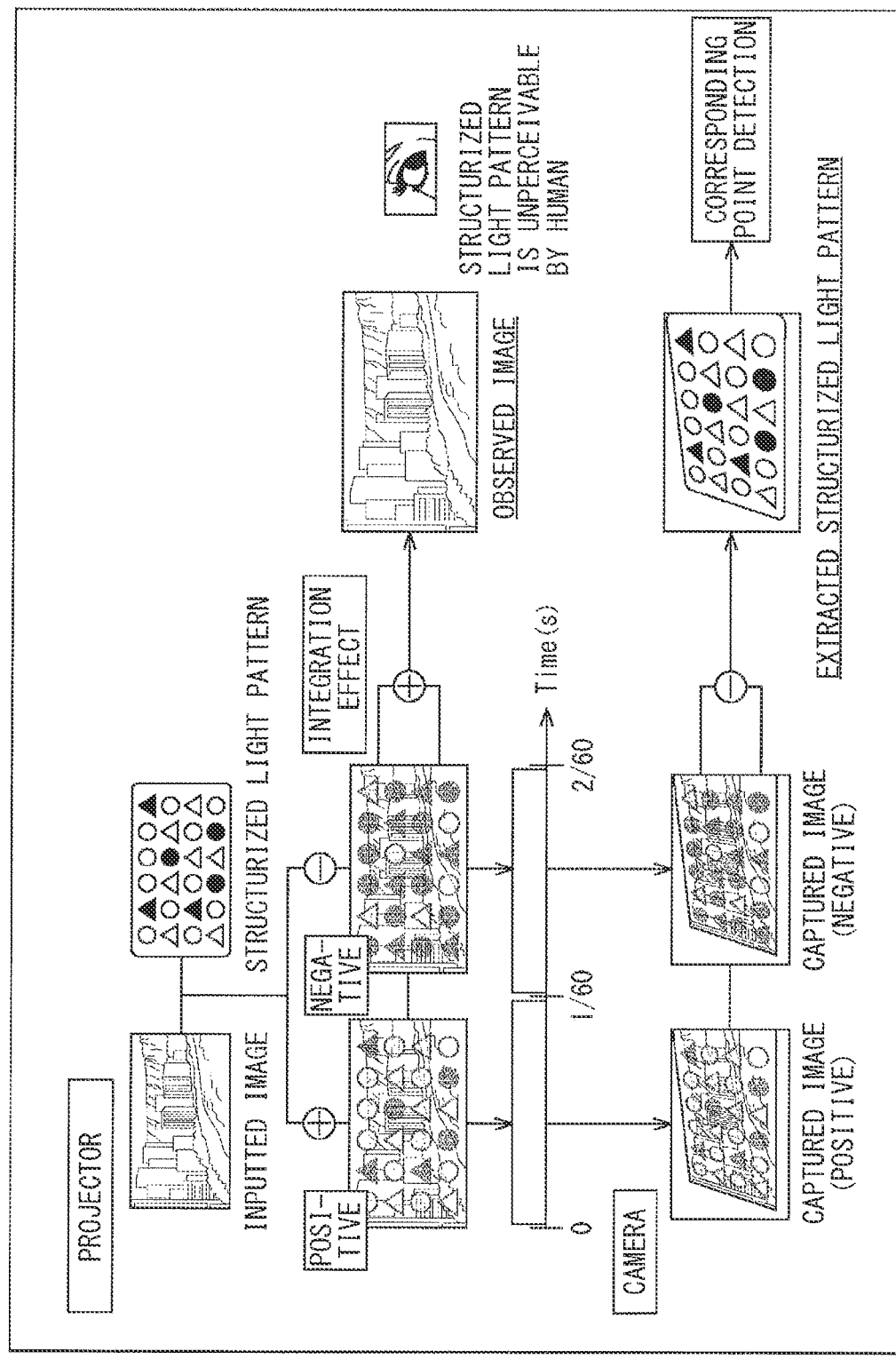
FIG. 7 is a diagram describing an example of an ISL.

As illustrated in FIG. 7, the projector adds a predetermined structured light pattern to a certain frame of an input image to generate a frame image in which a positive image of the structured light pattern is combined with the input image (content image). Further, the structured light pattern is subtracted from the next frame of the input image to generate a frame image in which a negative image of the structured light pattern is combined with the input image. Further, the projector successively projects the frames. The two frames that are the positive and negative frames switched at a high speed are added to be perceived by the human eye by an integration effect. As a result, it is difficult for a user viewing the projected image to recognize the structured light pattern embedded in the input image.

In contrast, the camera captures images of the projected images of these frames and obtains a difference between the captured images of both frames to extract only the structured light pattern included in the captured image. The corresponding point detection is performed with use of the extracted structured light pattern.

As described above, in the ISL method, the structured pattern can be easily extracted only by obtaining the difference between the captured images. Therefore, the corresponding point detection can be ideally performed with stable accuracy independently of an image to be projected.

However, in the case of the ISL method, the positive and negative pattern images are required to be projected, which may increase the time required for corresponding point detection. Further, in order to achieve both invisibility and robustness, an amplitude of the pattern needs to be reduced and a large number of captured images need to be added together, which may further increase the time required for the corresponding point detection. For this reason, for example, in a case where a moving body is used as a projection surface, there has been a possibility that the process does not follow variation in a shape or a posture of the projection surface, and the accuracy of corresponding point detection decreases.

<Corresponding Point Detection with Use of Invisible Light>

Therefore, in order to perform projection mapping in real time (immediately), a method of using a light source of an invisible region has been examined. For example, it has been considered to further add a depth sensor that projects a pattern image of invisible light or the like and captures an image thereof to obtain depth information of a subject.

Figure 8:
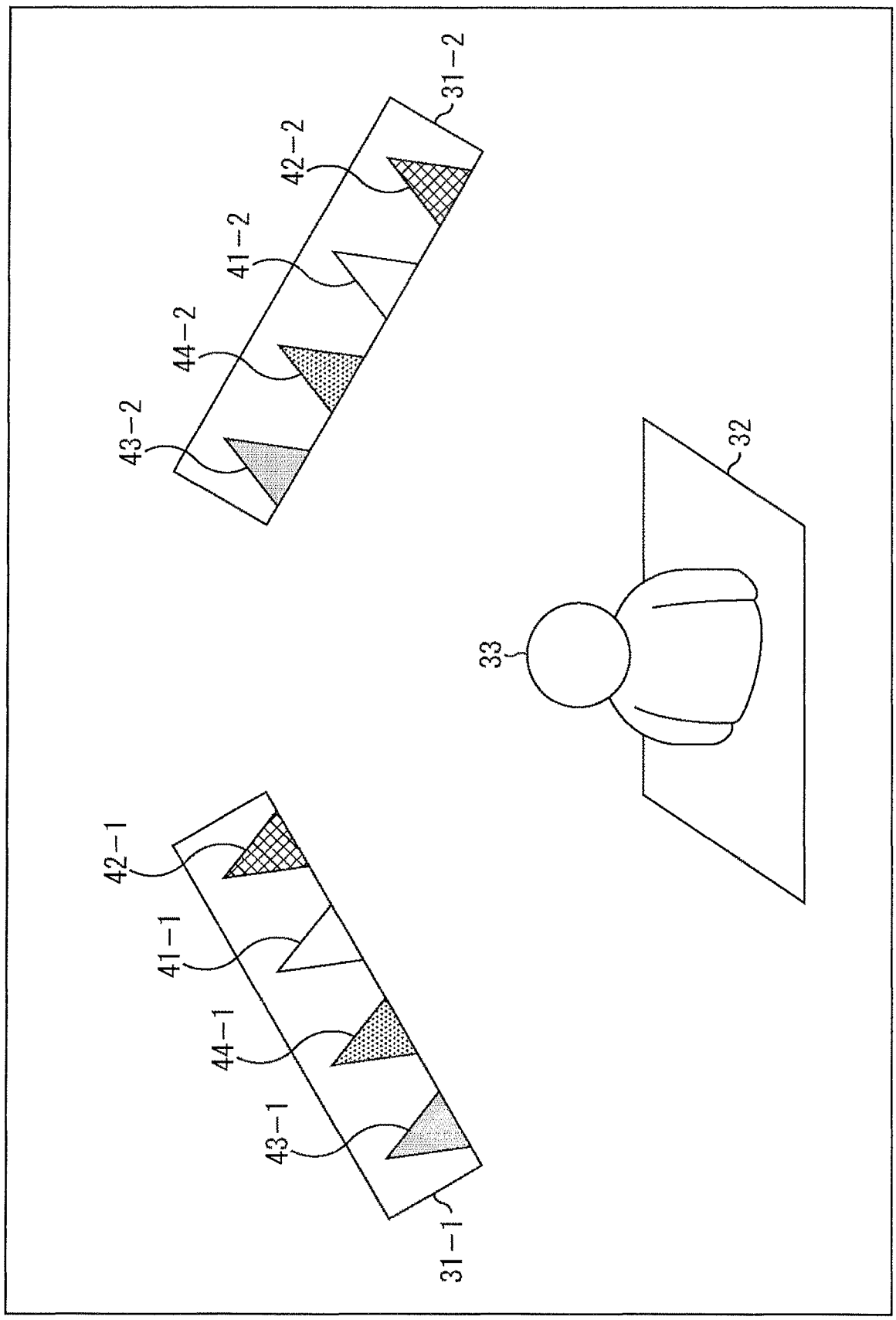
FIG. 8 is a diagram illustrating an example of corresponding point detection with use of invisible light.

For example, a projection imaging system illustrated in FIG. 8 includes a projection imaging apparatus 31-1 and a projection imaging apparatus 31-2. In a case where the projection imaging apparatus 31-1 and the projection imaging apparatus 31-2 do not need to be described being distinguished from each other, they are referred to as a projection imaging apparatus 31.

The projection imaging apparatus 31-1 includes a projecting unit 41-1 projecting an image of visible light, an imaging unit 42-1 receiving visible light to capture an image of a subject, a projecting unit 43-1 projecting an image of infrared light (IR light) which is invisible light, and an imaging unit 44-1 receiving IR light to capture an image of the subject.

The projection imaging apparatus 31-2 includes a projecting unit 41-2 projecting an image of visible light, an imaging unit 42-2 receiving visible light and capturing an image of a subject, a projecting unit 43-2 projecting an image of IR light, and an imaging unit 44-2 receiving IR light and capturing an image of the subject.

In a case where the projecting unit 41-1 and the projecting unit 41-2 do not need to be described being distinguished from each other, they are referred to as a projecting unit 41. In a case where the imaging unit 42-1 and the imaging unit 42-2 do not need to be described being distinguished from each other, they are referred to as an imaging unit 42. In a case where the projecting unit 43-1 and the projecting unit 43-2 do not need to be described being distinguished from each other, they are referred to as a projecting unit 43. In a case where the imaging unit 44-1 and the imaging unit 44-2 do not need to be described being distinguished from each other, they are referred to as an imaging unit 44.

Each projection imaging apparatus 31 projects an image onto a planar surface 32 or a moving body 33 as a projection surface.

In such a projection imaging system, in order to achieve three-dimensional consistency between sensing and projection, a relative posture of each device needs to be calibrated. A specific procedure is performed as follows.

Figure 9:
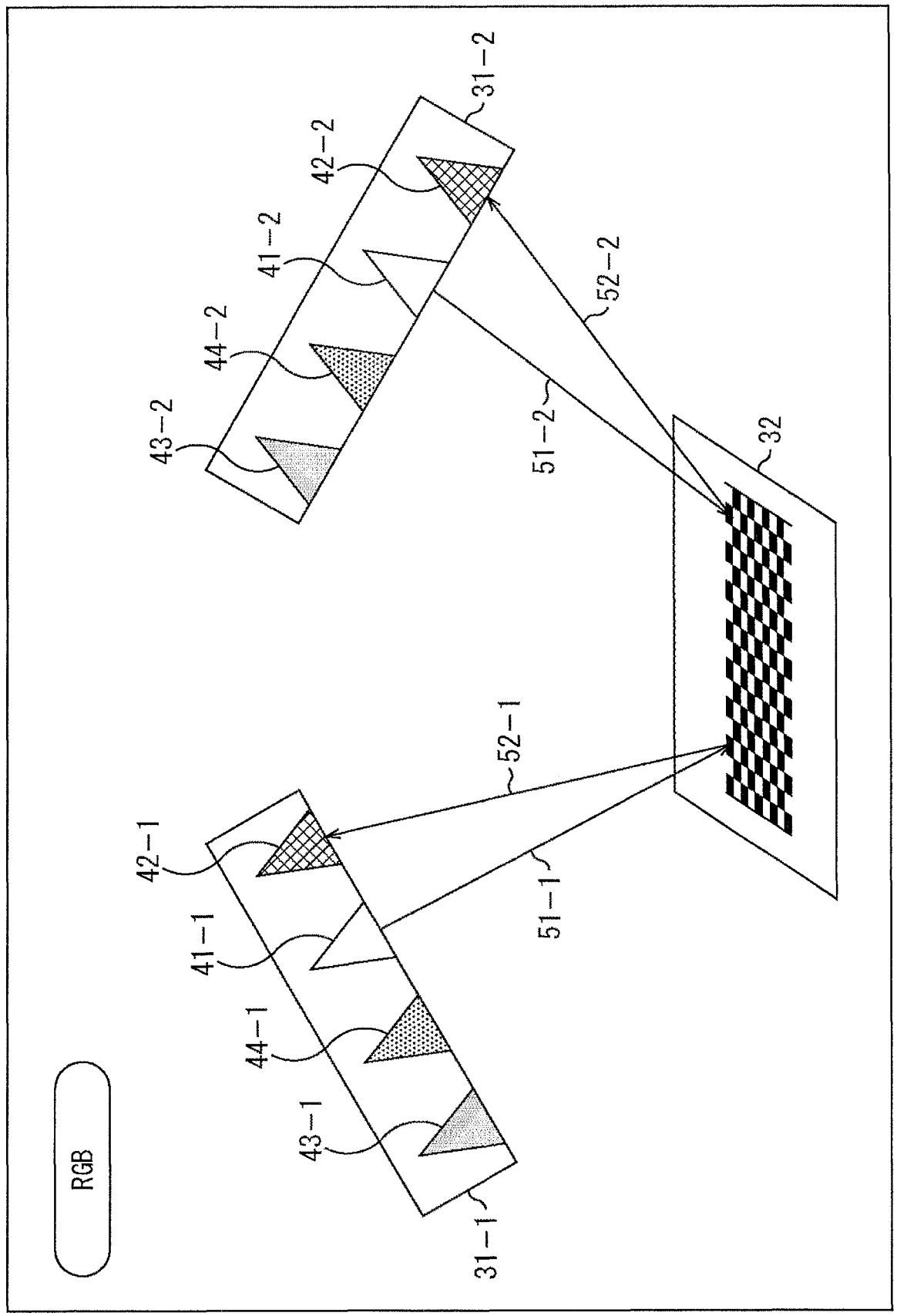
FIG. 9 is a diagram illustrating an example of corresponding point detection with use of invisible light.

First, as illustrated in FIG. 9, prior calibration is performed on a configuration using visible light (the projecting unit 41 and the imaging unit 42). For example, in a case of the projection imaging apparatus 31-1, the projecting unit 41-1 projects a pattern image onto the planar surface 32 (arrow 51-1), and the imaging unit 42-1 captures an image of the projected image (arrow 52-1), thereby obtaining a correspondence relationship between a pixel of the projecting unit 41-1 and a pixel of the imaging unit 42-1. Similarly, in a case of the projection imaging apparatus 31-2, the projecting unit 41-2 projects a pattern image onto the planar surface 32 (arrow 51-2), and the imaging unit 42-2 captures an image of the projected image (arrow 52-2), thereby obtaining a correspondence relationship between a pixel of the projecting unit 41-2 and a pixel of the imaging unit 42-2.

Figure 10:
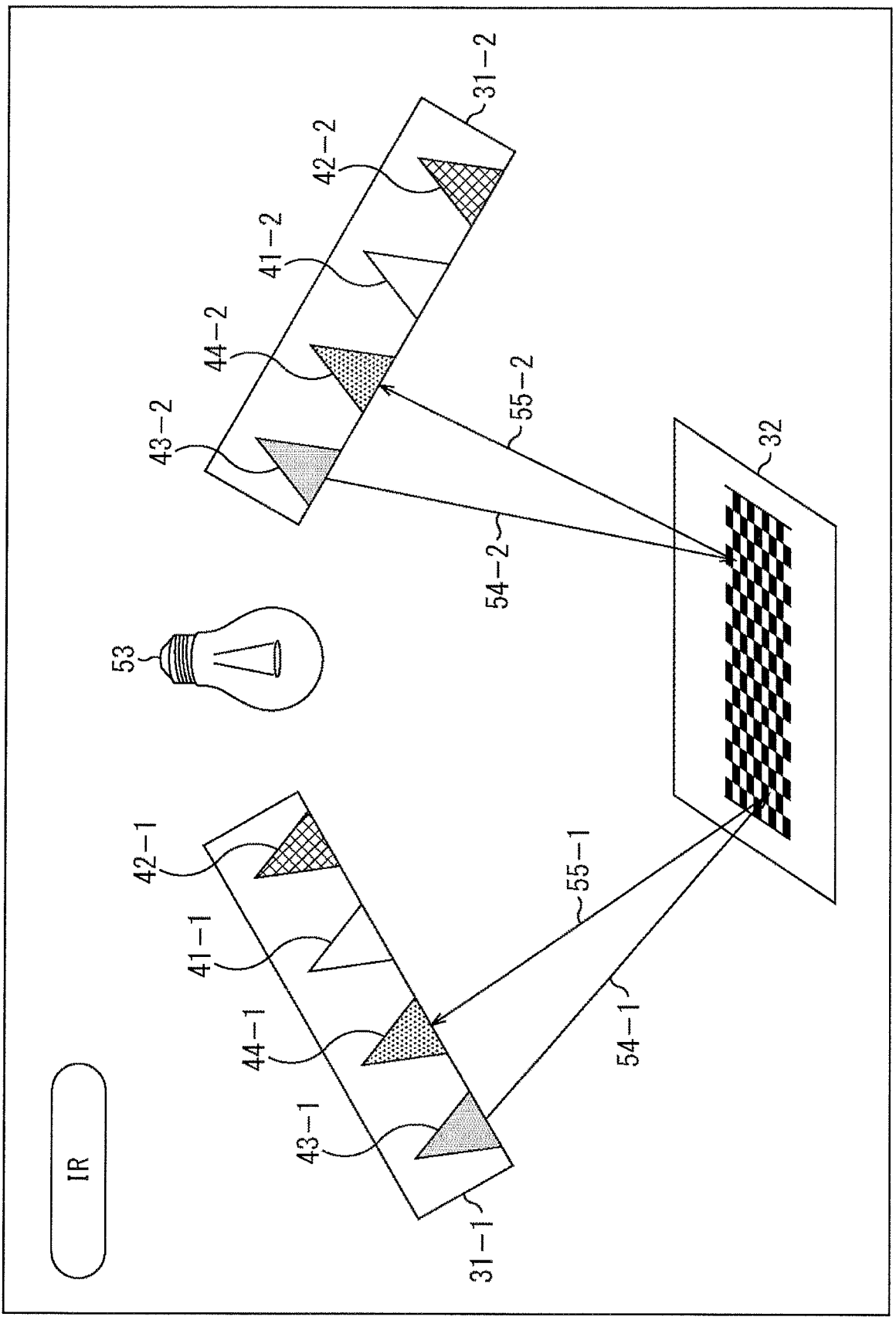
FIG. 10 is a diagram illustrating an example of corresponding point detection with use of invisible light.

Next, as illustrated in FIG. 10, prior calibration is performed on a configuration using invisible light (the projecting unit 43 and the imaging unit 44). At this time, a halogen lamp 53 is used to make the pattern image visible. For example, in a case of the projection imaging apparatus 31-1, the projecting unit 43-1 projects the pattern image onto the planar surface 32 (arrow 54-1), and the imaging unit 44-1 captures an image of the projected image (arrow 55-1), thereby obtaining a correspondence relationship between a pixel of the projecting unit 43-1 and a pixel of the imaging unit 44-1. Similarly, in a case of the projection imaging apparatus 31-2, the projecting unit 43-2 projects the pattern image onto the planar surface 32 (arrow 54-2), and the imaging unit 44-2 captures an image of the projected image (arrow 55-2), thereby obtaining a correspondence relationship between a pixel of the projecting unit 43-2 and a pixel of the imaging unit 44-2.

Figure 11:
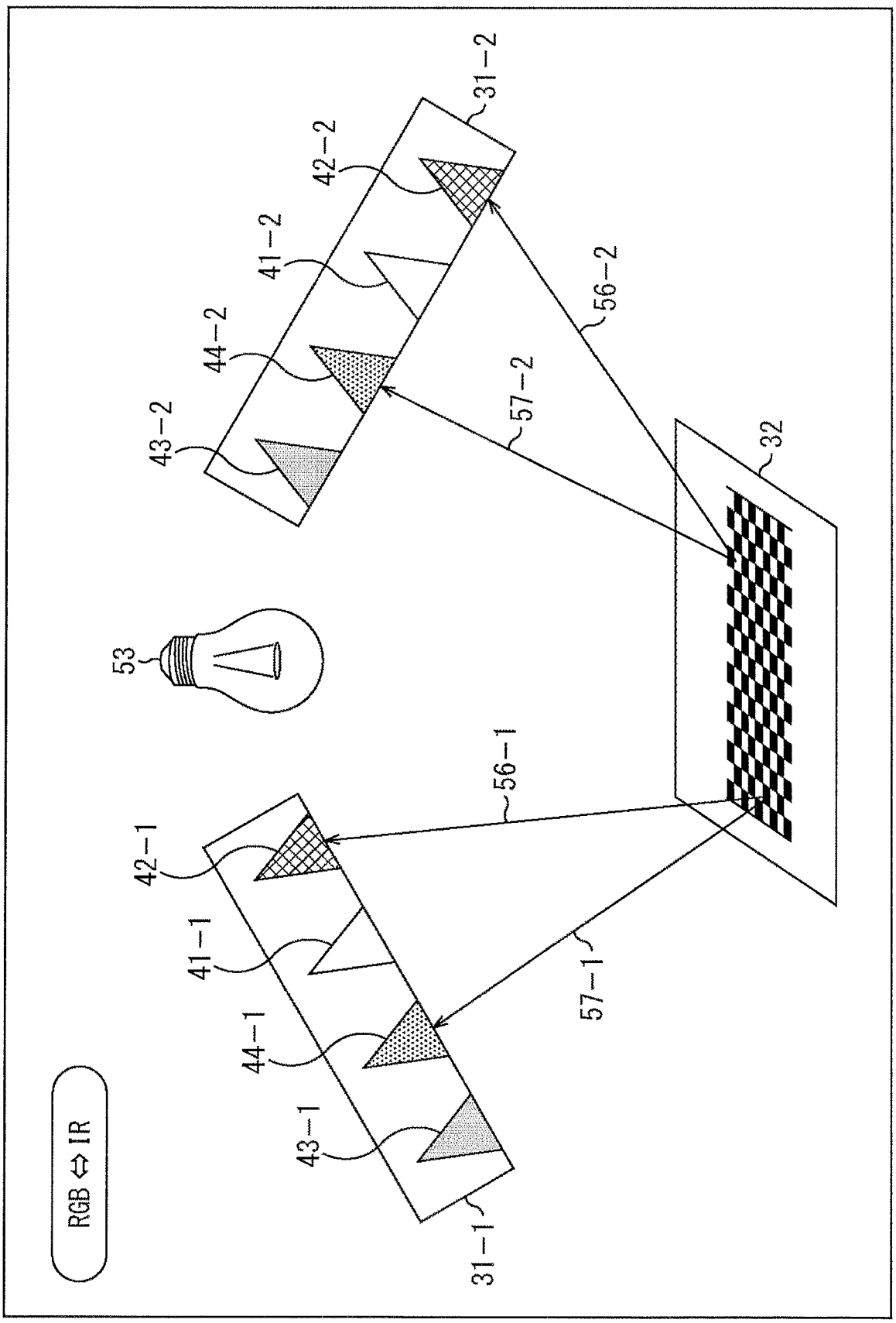
FIG. 11 is a diagram illustrating an example of corresponding point detection between a configuration using invisible light and a configuration using visible light.

Next, as illustrated in FIG. 11, prior calibration is performed between the configuration using visible light and the configuration using invisible light. At this time, relative postures of the imaging unit 42 and the imaging unit 44 are obtained in order to achieve consistency between the visible light and the invisible light. For example, in the case of the projection imaging apparatus 31-1, the captured image (pattern image) of the imaging unit 42-1 is compared with the captured image (pattern image) of the imaging unit 44-1 to obtain a correspondence relationship (arrow 56-1 and arrow 57-1) between the pixel of the imaging unit 42-1 and the pixel of the imaging unit 44-1. Similarly, in the case of the projection imaging apparatus 31-2, the captured image (pattern image) of the imaging unit 42-2 is compared with the captured image (pattern image) of the imaging unit 44-2 to obtain a correspondence relationship (arrow 56-2 and arrow 57-2) between the pixel of the imaging unit 42-2 and the pixel of the imaging unit 44-2.

Figure 12:
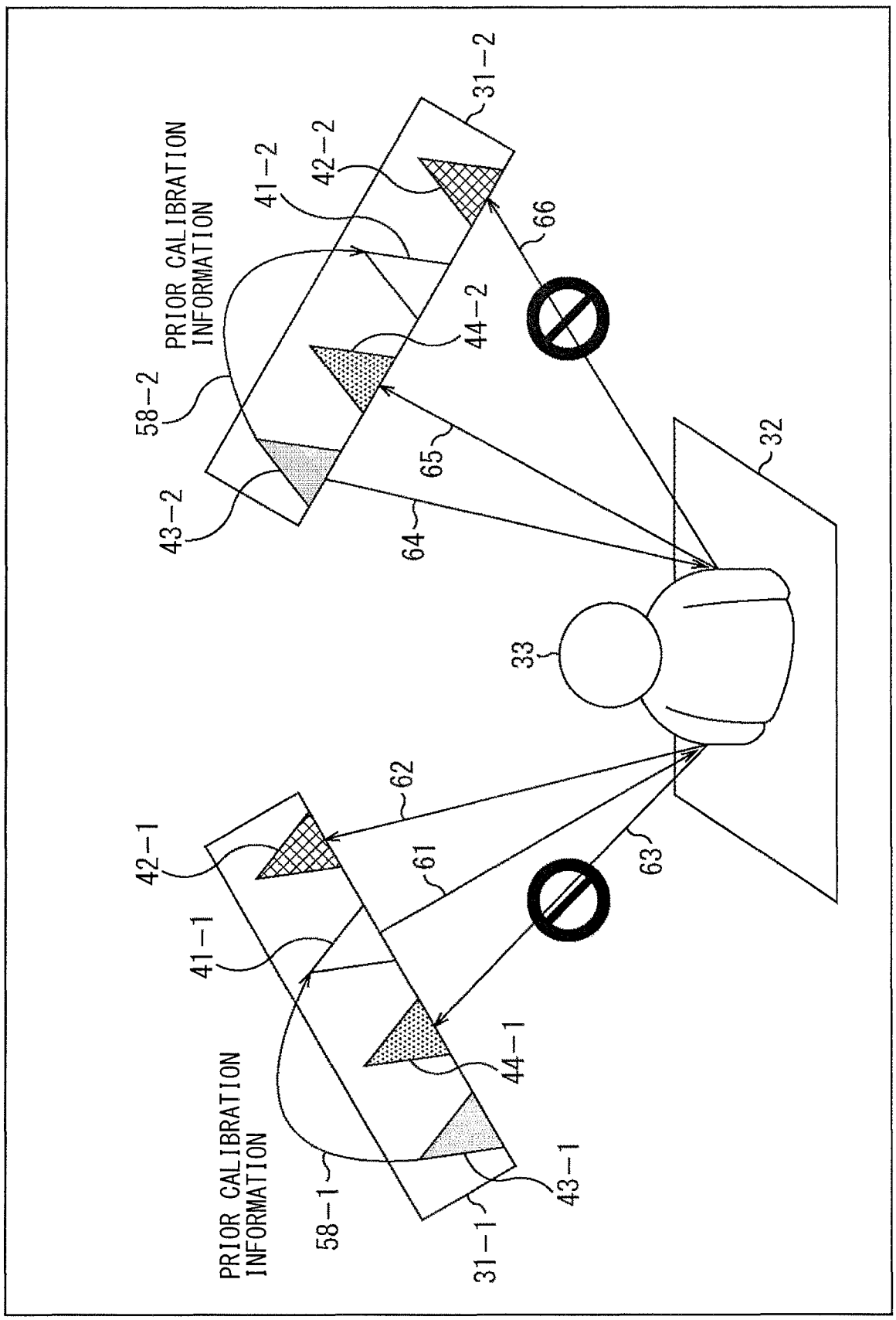
FIG. 12 is a diagram illustrating an example of a state of on-line sensing.

The prior calibration is completed by the above procedure, and actual sensing is performed to perform projection on the basis of information therefrom. However, in many cases, the consistency between the visible light and the invisible light (RGB-IR) is a local optimal solution in the situation at the time of the prior calibration. Therefore, if the environment is largely changed from the situation, there has been a possibility that accuracy may not be achieved with the prior calibration information. For example, as in an example in FIG. 12, in a case where the moving body 33 serves as a projection surface, the shape, the posture, and the like of the projection surface are varied by the motion of the moving body 33. Therefore, it has been difficult to perform projection mapping with sufficient accuracy by geometric correction based on the prior calibration information.

However, although overall optimization is to be performed in accordance with the projection situation, it goes without saying that the RGB world and the IR world cannot be connected at the time of sensing. Therefore, for example, as in the projection imaging apparatus 31-1 in FIG. 12, although on-line sensing (arrow 61 and arrow 62) can be performed between the projecting unit 41-1 and the imaging unit 42-1, it has been difficult to perform on-line sensing (arrow 61 and arrow 63) between the projecting unit 41-1 and the imaging unit 44-1. Similarly, as in the projection imaging apparatus 31-2 in FIG. 12, although on-line sensing (arrow 64 and arrow 65) between the projecting unit 43-2 and the imaging unit 44-2 can be performed, it is difficult to perform on-line sensing (arrow 64 and arrow 66) between the projecting unit 43-2 and the imaging unit 42-2. Therefore, it has been difficult to improve accuracy of geometric correction by on-line sensing.

2. First Embodiment

<Projection Imaging System>

Figure 13:
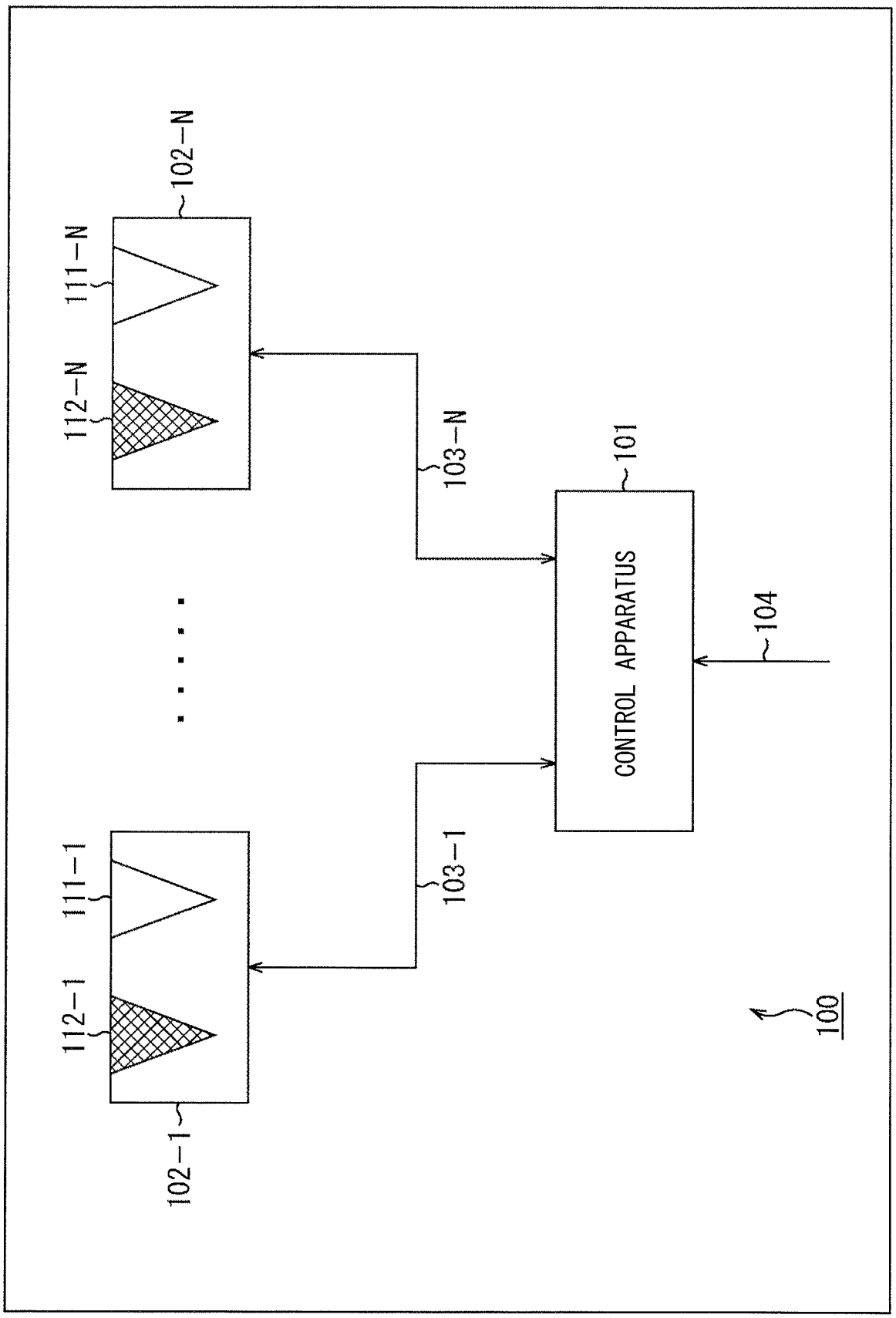
FIG. 13 is a block diagram illustrating a main configuration example of a projection imaging system.

FIG. 13 is a block diagram illustrating a main configuration example of an embodiment of a projection imaging system to which the present technology is applied. In FIG. 13, a projection imaging system 100 is a system capable of projecting an image, capturing an image of a projected image, and performing corresponding point detection by on-line sensing.

As illustrated in FIG. 13, the projection imaging system 100 includes a control apparatus 101 and projection imaging apparatuses 102-1 to 102-N (N is any natural number). The projection imaging apparatuses 102-1 to 102-N are coupled to the control apparatus 101 via cables 103-1 to 103-N, respectively.

Hereinafter, in a case where the projection imaging apparatuses 102-1 to 102-N need not be described being distinguished from each other, they are referred to as a projection imaging apparatus 102. Further, in a case where the cables 103-1 to 103-N need not be described being distinguished from each other, the cables 103-1 to 103-N are referred to as a cable 103.

The control apparatus 101 controls each projection imaging apparatus 102 via the cable 103. For example, the control apparatus 101 can supply an image inputted via a cable 104 to each projection imaging apparatus 102 and cause the image to be projected. Further, for example, the control apparatus 101 can instruct each projection imaging apparatus 102 to capture an image of a projected image or the like, and acquire the captured image. Further, for example, the control apparatus 101 can detect corresponding points of the projected image and the captured image, and can perform geometric correction on an image (image caused to be projected by each projection imaging apparatus 102) inputted via the cable 104 on the basis of the obtained corresponding points. It is to be noted that, in addition to an image process (e.g., enlargement, reduction, deformation, etc.) on an image to be projected, the geometric correction may also include control of an optical system of each projection imaging apparatus 102 or the like (e.g., control of a projection direction, an imaging direction, etc. of an image, or the like).

The projection imaging apparatuses 102-1 to 102-N include projecting units 111-1 to 111-N projecting images, and imaging units 112-1 to 112-N capturing images of a subject, respectively. In the following description, in a case where the projecting units 111-1 to 111-N do not need to be described being distinguished from each other, they are referred to as a projecting unit 111. Further, in a case where the imaging units 112-1 to 112-N do not need to be described being distinguished from each other, they are referred to as an imaging unit 112.

The projecting unit 111 has a function of a so-called projector. That is, the projection imaging apparatus 102 can be driven as a projector with use of the projecting unit 111. For example, the projection imaging apparatus 102 can project an image supplied from the control apparatus 101 onto any projection surface with the use of the projecting unit 111.

The imaging unit 112 has a function of a so-called camera. That is, the projection imaging apparatus 102 can be driven as a camera with use of the imaging unit 112. For example, the projection imaging apparatus 102 can use the imaging unit 112 to capture an image of a projection surface on which an image is projected by the projecting unit 111, and can supply data of the obtained captured image to the control apparatus 101.

The number of the projecting units 111 and the number of the imaging units 112 included in the projection imaging apparatus 102 may each be any number. They may be one or may be two or more. The number of the projecting units 111 and the number of the imaging units 112 may not be the same. The numbers of the projecting units 111 and the imaging units 112 included in the respective projection imaging apparatus 102 may not be uniform.

Further, the number of the projection imaging apparatuses 102 may be any number, and may be one or two or more. In a case where there is a plurality of projection imaging apparatuses 102, the projection imaging apparatuses 102 can cooperate with each other under the control of the control apparatus 101 to project images as described with reference to FIGS. 2 and 3. That is, the projection imaging system 100 in that case is a so-called multi-projection system, and can achieve so-called projection mapping.

It is to be noted that the projection direction and an enlargement rate of the image, the distortion correction of the projected image, etc. by the projecting unit 111 may be controllable. For this control, for example, the position and the posture of the optical system included in the projecting unit 111 and the projecting unit 111 as a whole may be controllable.

In addition, the imaging direction and an angle of view of the image, the distortion correction of the captured image, etc. by the imaging unit 112 may be controllable. For this control, for example, the position and the posture of the optical system included in the imaging unit 112 and the imaging unit 112 as a whole may be controllable.

Further, the control of the projecting unit 111 and the control of the imaging unit 112 described above may be performed independently of each other. In addition, the position and the posture of the projection imaging apparatus 102 may be controllable. It is to be noted that the control of the projecting unit 111, the imaging unit 112, and the projection imaging apparatus 102 may be performed by the control apparatus 101, or may be performed by an apparatus other than the control apparatus 101.

The cable 103 is any communication standard electric communication cable that can provide a communication path between the control apparatus 101 and the projection imaging apparatus 102. It is to be noted that it is sufficient that the control apparatus 101 and the projection imaging apparatus 102 can communicate with each other. For example, the control apparatus 101 and the projection imaging apparatus 102 may be coupled to each other by wireless communication. In this case, the cable 103 can be omitted.

In such a projection imaging system 100, the control apparatus 101 performs corresponding point detection between each of the projecting units 111 and each of the imaging units 112 in order to perform geometric correction on an image. For example, the control apparatus 101 can perform the corresponding point detection by on-line sensing. At this time, the control apparatus 101 can perform the corresponding point detection to which the present technology is applied.

<Projection Imaging Apparatus>

Figure 14:
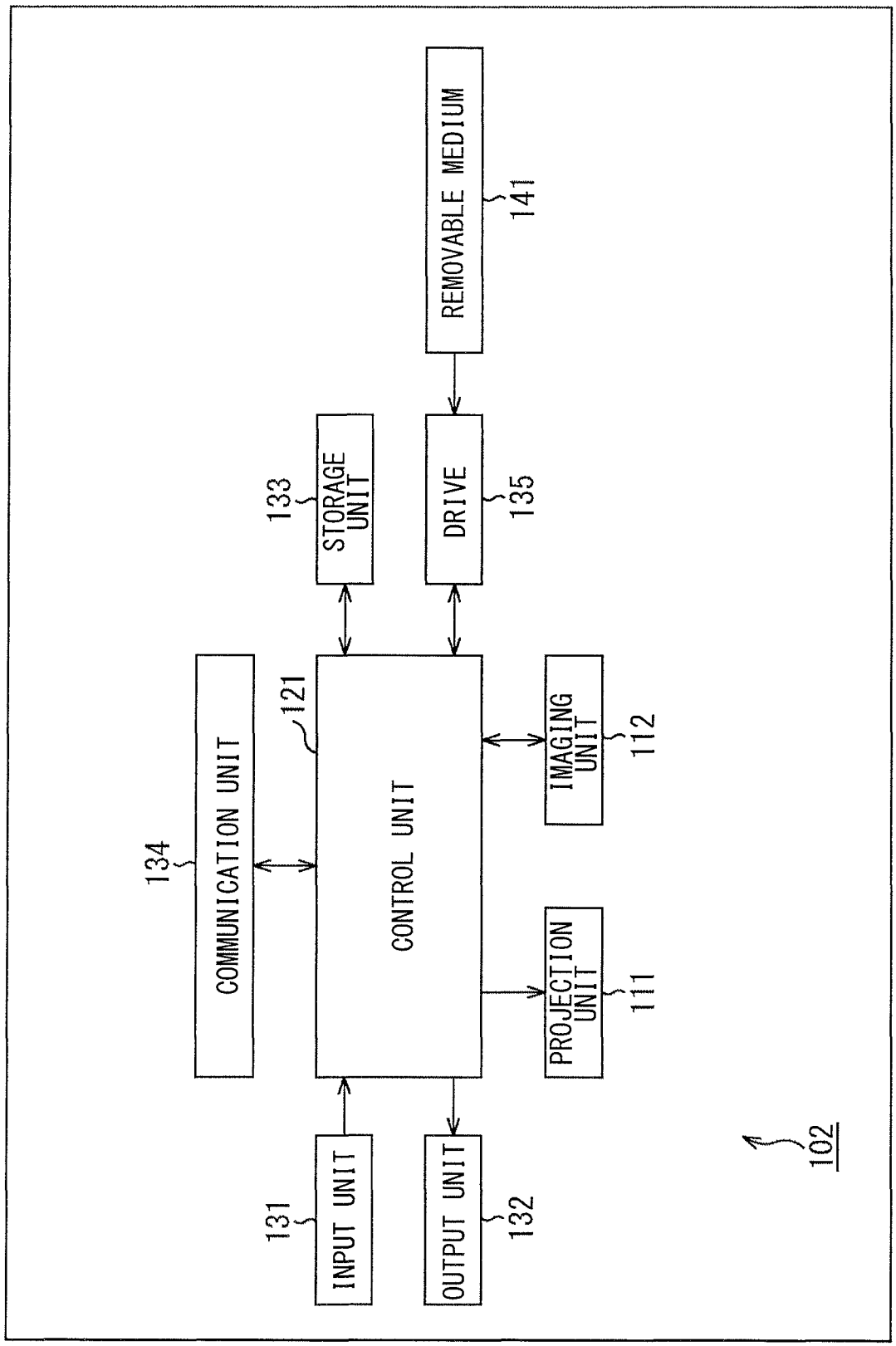
FIG. 14 is a block diagram illustrating a main configuration example of a projection imaging system.

FIG. 14 is a block diagram illustrating a main configuration example of the projection imaging apparatus 102. As illustrated in FIG. 14, the projection imaging apparatus 102 includes a control unit 121, the projecting unit 111, the imaging unit 112, an input unit 131, an output unit 132, a storage unit 133, a communication unit 134, and a drive 135.

The control unit 121 includes, for example, a CPU (Central Processing Unit), a ROM (Read Only Memory), a RAM (Random Access Memory), and the like, and controls each processing unit in the apparatus, and executes various processes required for the control, such as an image process, for example. The control unit 121 performs those processes on the basis of the control by the control apparatus 101, for example.

The projecting unit 111 is controlled by the control unit 121 and performs a process related to projection of an image. For example, the projecting unit 111 projects an image supplied from the control unit 121 onto outside of the projection imaging apparatus 102 (for example, a projection surface or the like). It is to be noted that, although details will be described later, the projecting unit 111 can project not only an image of visible light (RGB) but also an image of invisible light (IR).

The imaging unit 112 is controlled by the control unit 121 to capture an image of a subject outside the apparatus (for example, a projection surface or the like), to generate a captured image, and supplies the captured image to the control unit 121. For example, the imaging unit 112 captures an image of the projected image projected on the projection surface by the projecting unit 111. The imaging unit 112 includes, for example, an image sensor using a CMOS (Complementary Metal Oxide Semiconductor), an image sensor using a CCD (Charge Coupled Device), or the like, and performs photoelectric conversion on light from a subject by the image sensor to generate an electric signal (data) of the captured image. It is to be noted that the imaging unit 112 includes a pixel receiving visible light (RGB) and a pixel receiving invisible light (IR), and can generate not only a captured image of visible light but also a captured image of invisible light.

The input unit 131 includes any input device that accept external information such as a user input. For example, the input unit 131 may include one or more of an operation button, a touch panel, a camera, a microphone, and an input terminal. Further, for example, the input unit 131 may include any one or more sensors such as an optical sensor or a temperature sensor. It goes without saying that the input unit 131 may include input devices other than those described above.

The output unit 132 includes any output device outputting information such as an image or a sound. For example, the output unit 132 may include one or more of a display, a speaker, and an output terminal. It goes without saying that the output unit 132 may include an output device other than those described above.

The storage unit 133 includes any storage medium. For example, the storage unit 133 may include one or more of a hard disk, a RAM disk, and a non-volatile memory. It goes without saying that the storage unit 133 may include any storage medium other than those described above.

The communication unit 134 includes any network interface. For example, the communication unit 134 communicates with the control apparatus 101. It is to be noted that the communication unit 134 may have a wired communication function, may have a wireless communication function, or may have both.

The drive 135 reads out information stored in the removable medium 141 attached to itself, and writes information on the removable medium 141 attached to itself. The drive 135 reads information from the removable medium 141, and supplies the read information to the control unit 121, for example. Further, the drive 135 writes the information supplied from the control unit 121 on the removable medium 141. The removable medium 141 is a recording medium attachable to and detachable from the drive 135. For example, it may be a magnetic disk, an optical disk, a magneto-optical disk, a semiconductor memory, or the like.

<Projecting Unit>

Figure 15:
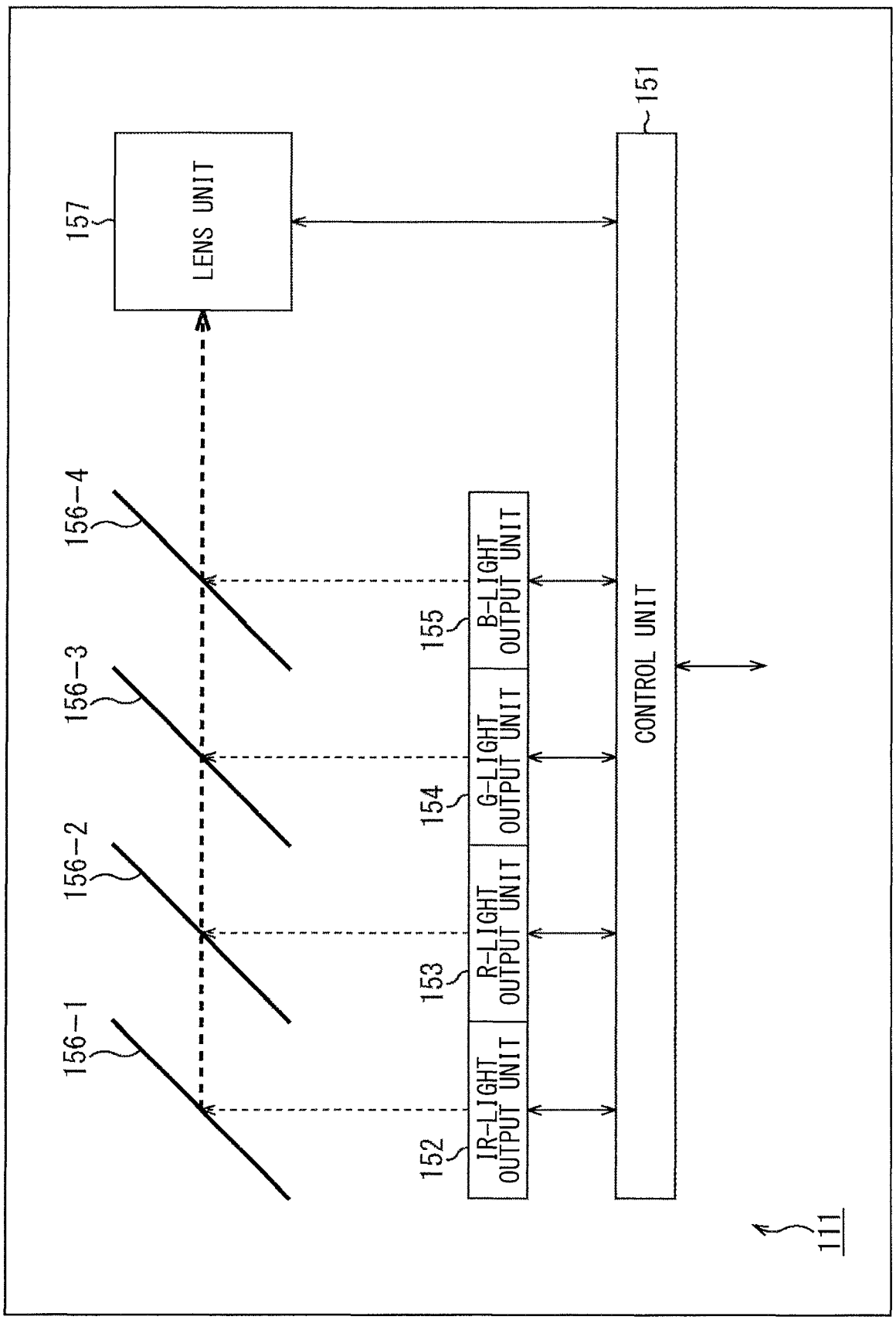
FIG. 15 is a block diagram illustrating a main configuration example of a projecting unit.

FIG. 15 is a block diagram illustrating a main configuration example of the projecting unit 111. As illustrated in FIG. 15, the projecting unit 111 includes a control unit 151, an IR-light output unit 152, an R-light output unit 153, a G-light output unit 154, a B-light output unit 155, mirrors 156-1 to 156-4, and a lens unit 157.

The control unit 151 performs a process related to drive control of units from the IR light output unit 152 to the lens unit 157 in accordance with the control by the control unit 121. For example, the control unit 151 supplies image data of each color component supplied from the control unit 121 to a processing unit corresponding to the color component in the units from the IR-light output unit 152 to the B-light output unit 155, and cause the light of each color component (an image of each color component) to be outputted. Further, for example, the control unit 151 controls the lens unit 157 to control a focal length and the like.

The IR-light output unit 152 outputs IR light (infrared light), which is invisible light, in accordance with the control by the control unit 151. The R-light output unit 153 outputs R light (light of a red component), which is visible light, in accordance with the control by the control unit 151. The G-light output unit 154 outputs G light (light of a green component), which is visible light, in accordance with the control by the control unit 151. The B-light output unit 155 outputs B light (light of a blue component), which is visible light, in accordance with the control by the control unit 151.

Each of the units from the IR-light output unit 152 to the B-light output unit 155 outputs light of a plurality of pixels. That is, each of the units from the IR-light output unit 152 to the B-light output unit 155 outputs an image of the corresponding color component (wavelength range). For example, the units from the IR-light output unit 152 to the B-light output unit 155 may each include a liquid crystal device including a visible light source, an invisible light source, and a pixel of the corresponding color component. That is, the projecting unit 111 may project an image of visible light and an image of invisible light with use of the liquid crystal device. For example, as the liquid crystal device, a liquid crystal device may be used that has become suitable to visible light and invisible light by changing a portion of pixels for R light of a single plate type liquid crystal device for visible light (for RGB light) to pixels for IR light. It is to be noted that the liquid crystal device may be a reflection type or a transmission type.

The mirror 156-1 reflects the IR light outputted from the IR-light output unit 152 toward the lens unit 157. The mirror 156-2 reflects the R light outputted from the R-light output unit 153 toward the lens unit 157, and transmits the IR light reflected by the mirror 156-1. The mirror 156-3 reflects the G light outputted from the G-light output unit 154 toward the lens unit 157, and transmits the IR light reflected by the mirror 156-1 and the R light reflected by the mirror 156-2. The mirror 156-4 reflects the B light outputted from the B-light output unit 155 toward the lens unit 157, and transmits the IR light reflected by the mirror 156-1, the R light reflected by the mirror 156-2, and the G light reflected by the mirror 156-3.

The lens unit 157 is an optical system formed by any optical device such as a lens or an aperture, and has a predetermined optical influence on entering light. The control unit 151 can control the optical influence of the lens unit 157 by setting the position, the posture, or the like of the optical device included in the lens unit 157 or selecting the optical device to be used. For example, the control unit 151 can control the focal length, the image projection direction, and the like as described above.

As indicated by a dotted line arrow in FIG. 15, all of the light outputted from the units from the IR-light output unit 152 to the B-light output unit 155 is outputted from the projecting unit 111 via the lens unit 157. That is, the projecting unit 111 outputs the invisible light and the visible light via the same optical system. In this manner, the projecting unit 111 so projects the image of the invisible light and the image of the visible light that a portion or all thereof is projected on the same region on the projection surface.

By doing so, the correspondence relationship of the pixels between the image of the invisible light and the image of the visible light becomes known. Therefore, the alignment of the RGB light and the sensing IR light with desired high accuracy is obtained. Accordingly, the multi-hop calibration becomes unnecessary. In other words, it is possible to more easily apply the result of on-line sensing performed with use of the invisible light (IR light) to projection of visible light. Therefore, the on-line sensing can be performed with use of the invisible light. Accordingly, the corresponding point detection can be performed faster than that in the case of the ISL, and the corresponding point detection can be performed with higher accuracy than that in the case of the ISL. In other words, the on-line overall optimization by the IR light of the sensing makes it possible to project the RGB light with high accuracy in accordance with the projection situation.

It is to be noted that the color component (wavelength range) of the visible light outputted (projected) by the projecting unit 111 may be any color component as long as it is in the visible range (wavelength range of visible light), and is not limited to the above-described RGB light. In addition, the number of color components of the visible light may be any number, and is not limited to the three colors (RGB) described above. For example, the projecting unit 111 may output visible light of four or more colors, or may output visible light of two or less colors. In addition, the wavelength range of the invisible light outputted (projected) by the projecting unit 111 may be any wavelength range as long as it is an invisible range (wavelength range of the invisible light), and is not limited to the above-described IR light (infrared light). For example, the projecting unit 111 may output ultraviolet light as the invisible light. Further, the number of light rays outputted as the invisible light may also be any number. For example, the projecting unit 111 may output a plurality of light rays (images) having different wavelength ranges from each other as (images of) the invisible light.

<Image Data>

The control apparatus 101 supplies the image data of the image to be projected to the projection imaging apparatus 102. The control unit 121 of the projection imaging apparatus 102 to which the image data is supplied supplies the image data to the projecting unit 111. The control unit 151 of the projecting unit 111 extracts the image data of each color component of the visible light and the image data of the invisible light from the supplied image data, and controls the units from the IR-light output unit 152 to the B-light output unit 155 on the basis of the extracted image data, thereby causing each light to be outputted.

Figure 16:
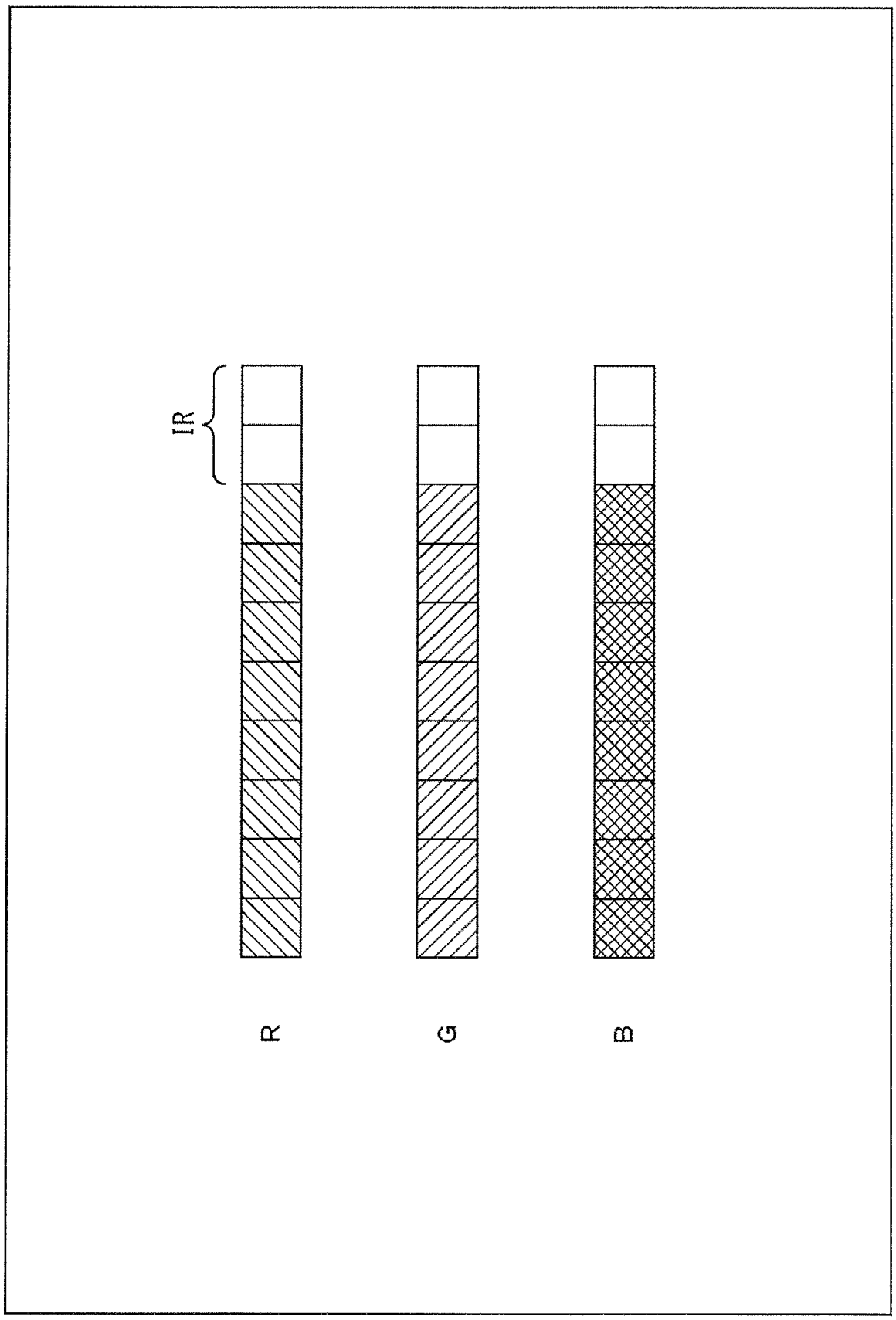
FIG. 16 is a diagram illustrating an example of image data.

FIG. 16 is a diagram illustrating an example of a format of the image data. In a case of an example in FIG. 16, the image data includes R-light data, G-light data, and B-light data. A data length of the data for each color component is 10 bits. Image data of respective color components of visible light is stored in the upper 8 bits, and image data of invisible light is stored in the lower 2 bits. By doing so, it is possible to transmit image data of visible light and image data of invisible light in a format for visible light. Therefore, it can be processed as image data of visible light. Therefore, development of a configuration transmitting image data of invisible light becomes unnecessary.

For example, when the image data of such a format is supplied, the control unit 151 extracts the image data of each color component of the visible light from the upper 8 bits of the data for each color component, controls the units from the R-light output unit 153 to the B-light output unit 155 on the basis of each extracted image data, and causes each light to be outputted. Further, the control unit 151 extracts the image data of the IR light from the lower 2 bits of the data for each color component, controls the IR-light output unit 152 on the basis of the extracted image data of the IR light, and causes each light to be outputted.

That is, the image data supplied from the control apparatus 101 may be configured in a format of image data of visible light, image data of visible light may be stored in a portion of bits in the format, and image data of invisible light may be stored in another portion of bits. The projecting unit 111 may extract the image data of the visible light and the image data of the invisible light included in the inputted image data, and project an image of visible light corresponding to the image data of visible light and an image of invisible light corresponding to the image data of invisible light.

More specifically, the format of the visible light image data may be in an RGB format (RGB) including R-light data, G-light data, and B-light data. The image data of each color component of visible light may be stored in a portion of bits of an upper portion of the data of each color component, and the image data of invisible light may be stored in a portion of bits of a lower part of the data of each color component.

It is to be noted that the control unit 121 of the projection imaging apparatus 102 may extract the image data of each color component of the visible light and the image data of the invisible light from the image data of the visible light format, and may supply them to the projecting unit 111.

<Color Sequential>

The projecting unit 111 may sequentially project images of respective color components of visible light and an image of invisible light in a predetermined order. For example, as illustrated in FIG. 17, the projecting unit 111 may project the respective images of the RGB light and the image of the IR light sequentially (sequentially project the respective images) within one vertical synchronization period (1V period) of the image data.

Figure 17:
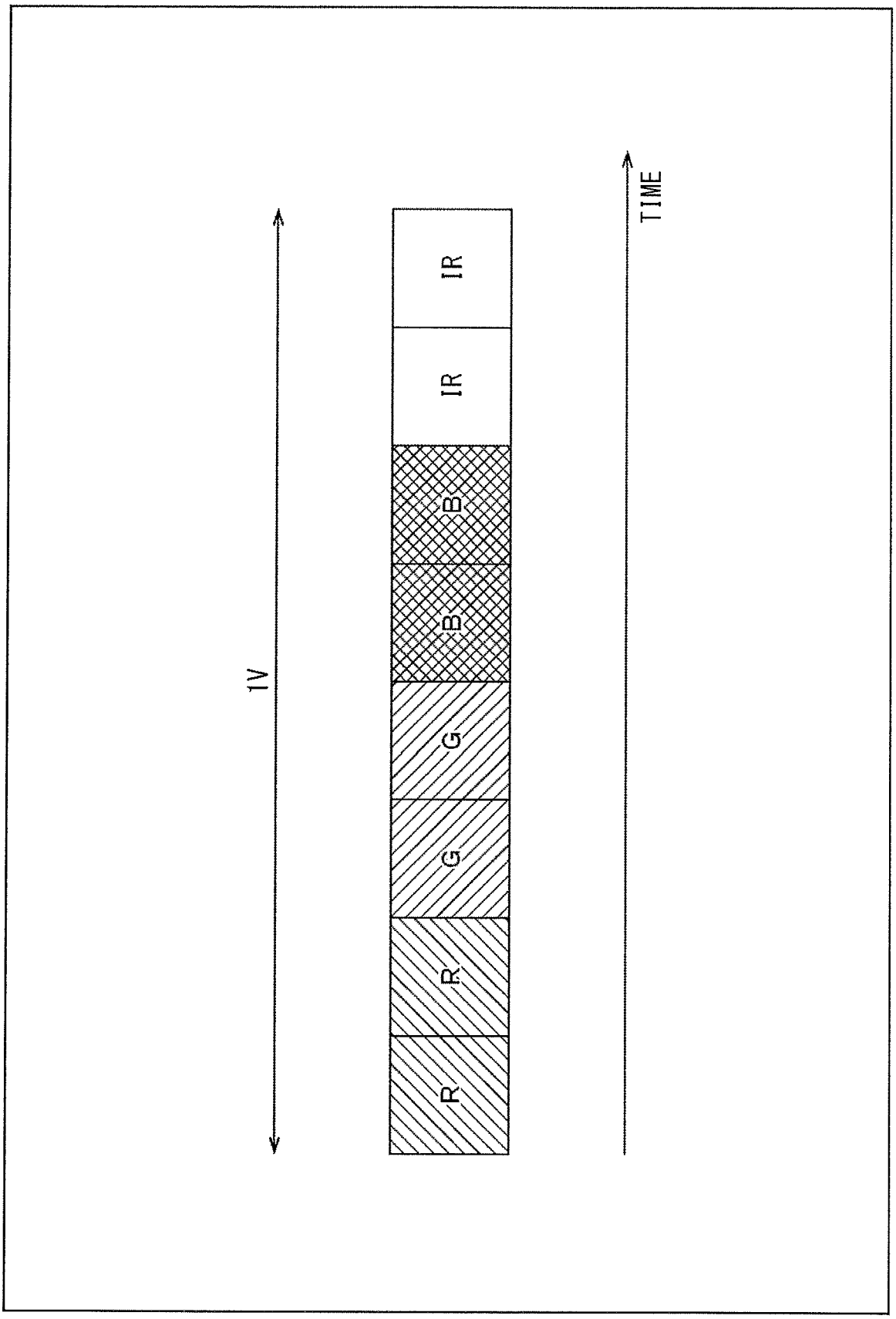
FIG. 17 is a diagram illustrating an example of a state of image projection.

In a case of an example in FIG. 17, the projecting unit 111 sequentially projects the R-light image, the G-light image, the B-light image, and the IR-light image in this order by two frames each in one vertical synchronization period of the image data. It is to be noted that one frame of the image data of each wavelength-range component indicated by a square in FIG. 17 is also referred to as a sub-frame (Sub-Frame). In the case of the example in FIG. 17, images of eight sub-frames are displayed within one vertical synchronization period of the image data.

<Image Content>

It is to be noted that that the R-light image, the G-light image, and the B-light image, which are images of visible light, are frame images of an image content (for example, a moving image), and the IR-light image, which is an image of invisible light, is a pattern image for corresponding point detection. For example, in a case where a moving image is projected as an image content, frame images different from each other may be projected in each sub-frame in FIG. 17. For example, in the case in FIG. 17, images of six frames of a moving image and a pattern image (two sub-frame periods) are projected within one vertical synchronization period of the image data. That is, among the images sequentially projected by the projecting unit 111, the images of the respective color components of visible light may be images of frames different from each other in the moving image. The image of invisible light may include a predetermined feature point and a predetermined variable pattern, and may be a pattern image directed to detecting of corresponding points of the projected image projected by the projecting unit 111 and the captured image captured by the imaging unit 112.

Such projection may be controlled by the control apparatus 101. That is, when the control apparatus 101 (a projection control unit 233 to be described later) controls the projecting unit 111 to cause a moving image to be projected, an image of the R component of the visible light for the first two frames of the six frames, an image of the G component of the visible light for the next two frames, an image of the B component of the visible light for the next two frames, and a pattern image of the invisible light may be sequentially projected every six consecutive frames of the moving image.

It is to be noted that, at this time, the control apparatus 101 may control the projecting unit 111 to project the pattern image of the invisible light for a period in which two frames of the moving image are projected (that is, for a period corresponding to two sub-frames).

<Imaging of Invisible Light Image>

The imaging unit 112 captures an image of a projected image of the pattern image projected by the projecting unit 111. That is, the imaging unit 112 may perform imaging only during a period in which the image of invisible light is projected, although the projecting unit 111 sequentially projects the images of the respective wavelength ranges as described above. For example, in a case in FIG. 18, each of the imaging units 112 (Cam0 to Cam3) performs imaging in synchronization with a timing of projection of the IR light by the corresponding projecting unit 111 (corresponding one from Pro0 to Pro3) and only for that period. The control apparatus 101 may control such projection or imaging.

By doing so, it is possible to suppress the image of visible light projected by the projecting unit 111 corresponding to the imaging unit 112 from being included in the captured image obtained by the imaging unit 112. Accordingly, it is possible to suppress a decrease in accuracy of corresponding point detection with use of the captured image.

Figure 18:
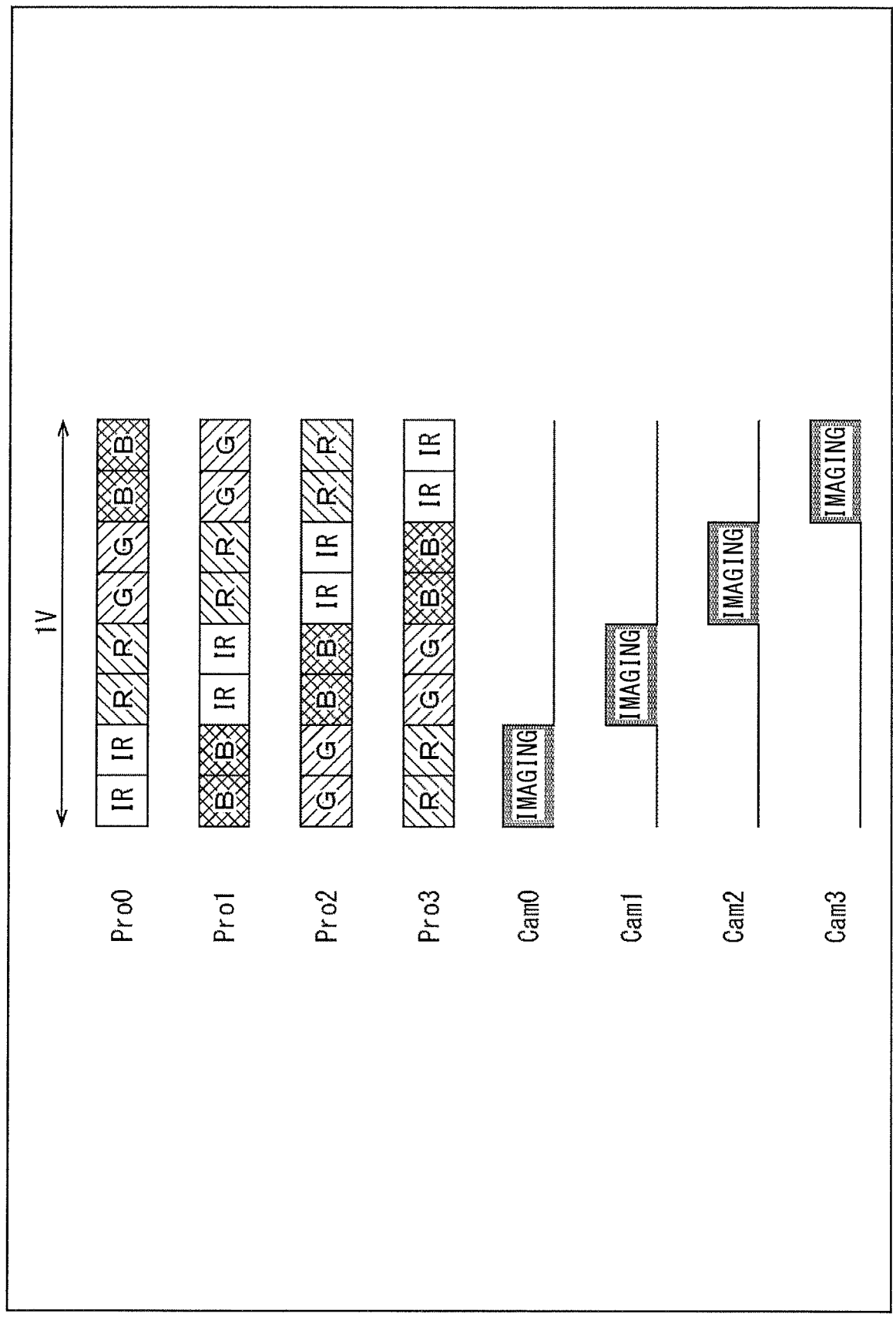
FIG. 18 is a diagram illustrating an example of a state of projection of an image and imaging of a pattern image.

Further, as in an example in FIG. 18, in a case where the plurality of projecting units 111 project images, the projecting units 111 may project the respective IR-light images at timings different from each other. Further, each imaging unit 112 may perform imaging in synchronization with a timing of projection of the IR light by the corresponding projecting unit 111 and only for that period. The control apparatus 101 may control such projection or imaging. That is, the control apparatus 101 may control the plurality of projecting units 111 to project the pattern images as images of invisible light at timings different from each other, and control the imaging units 112 to capture images of the pattern image of invisible light projected by the respective projecting units 111.

By doing so, it is possible to suppress the pattern images projected from the plurality of projecting units 111 from interfering with each other (the pattern images projected from the plurality of projecting units 111 from being included in the captured image). Therefore, it is possible to suppress a decrease in accuracy of corresponding point detection.

<Increase in Frame Rate>

Figure 19:
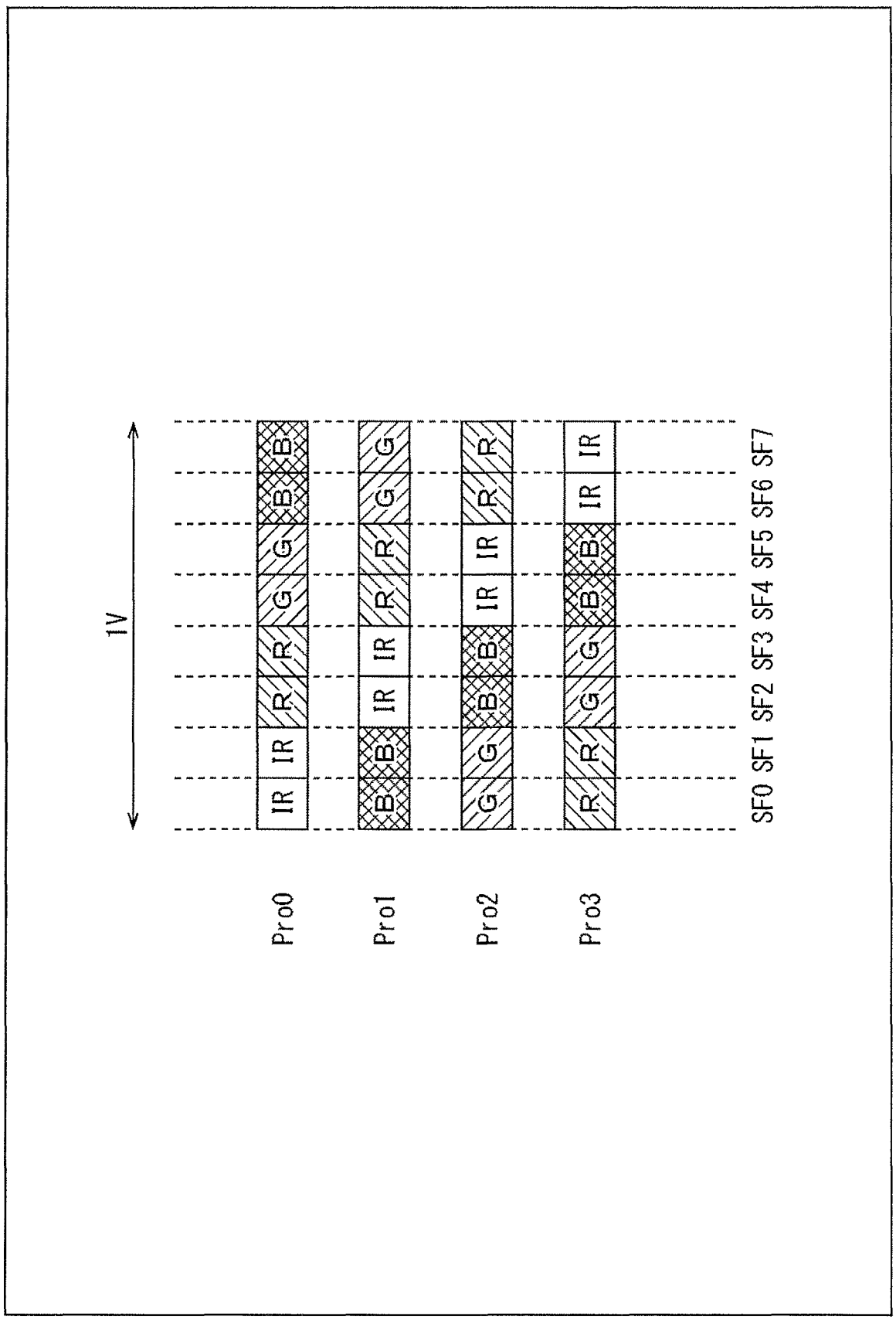
FIG. 19 is a diagram illustrating an example of a state of image projection.

Further, in a case where images are projected by four or more projecting units 111, the projection timings of the images in the respective wavelength ranges may be divided into four types as in the example in FIG. 18. By doing so, as illustrated in an example in FIG. 19, it is possible to project images in all of the wavelength ranges (the R-light image, the-G light image, the B-light image, and the IR-light image) in the respective sub-frames (SF0 to SF7). Therefore, by making the images of visible light of the respective sub-frames images of frames (consecutive frames) different from each other of the moving image as described above, it is possible to achieve high frame-rate image projection in a region where these projected images are superimposed. Further, in this case, color braking can be reduced because the single plate type is not substantially used.

Such projection may be controlled by the control apparatus 101. That is, the control apparatus 101 may control the four or more projecting units 111 to project the images of the respective color components of the visible light in respective frames of the moving image and the pattern image of the invisible light in each frame of the moving image in the same period.

It is to be noted that, in this case, each imaging unit 112 performs imaging in a sub-frame in which the corresponding projecting unit 111 projects the pattern image of the invisible light. For example, in the case of the example in FIG. 18, the imaging units 112 (Cam0 to Cam3) sequentially capture images of two sub-frames (i.e., two frames of a moving image).

By doing so, the imaging timings of the respective imaging units 112 can be different from each other. Therefore, it is possible to suppress interference due to the pattern image projected by the non-corresponding projecting unit 111.

Therefore, it is possible to suppress a decrease in accuracy of corresponding point detection.

Such imaging may be controlled by the control apparatus 101. That is, the control apparatus 101 may control the imaging units 112 to capture images of the projected images while performing switching between the imaging units 112 every two frames of the moving image in synchronization with the projection timings of the respective frames of the moving image.

<Control Apparatus>

Figure 20:
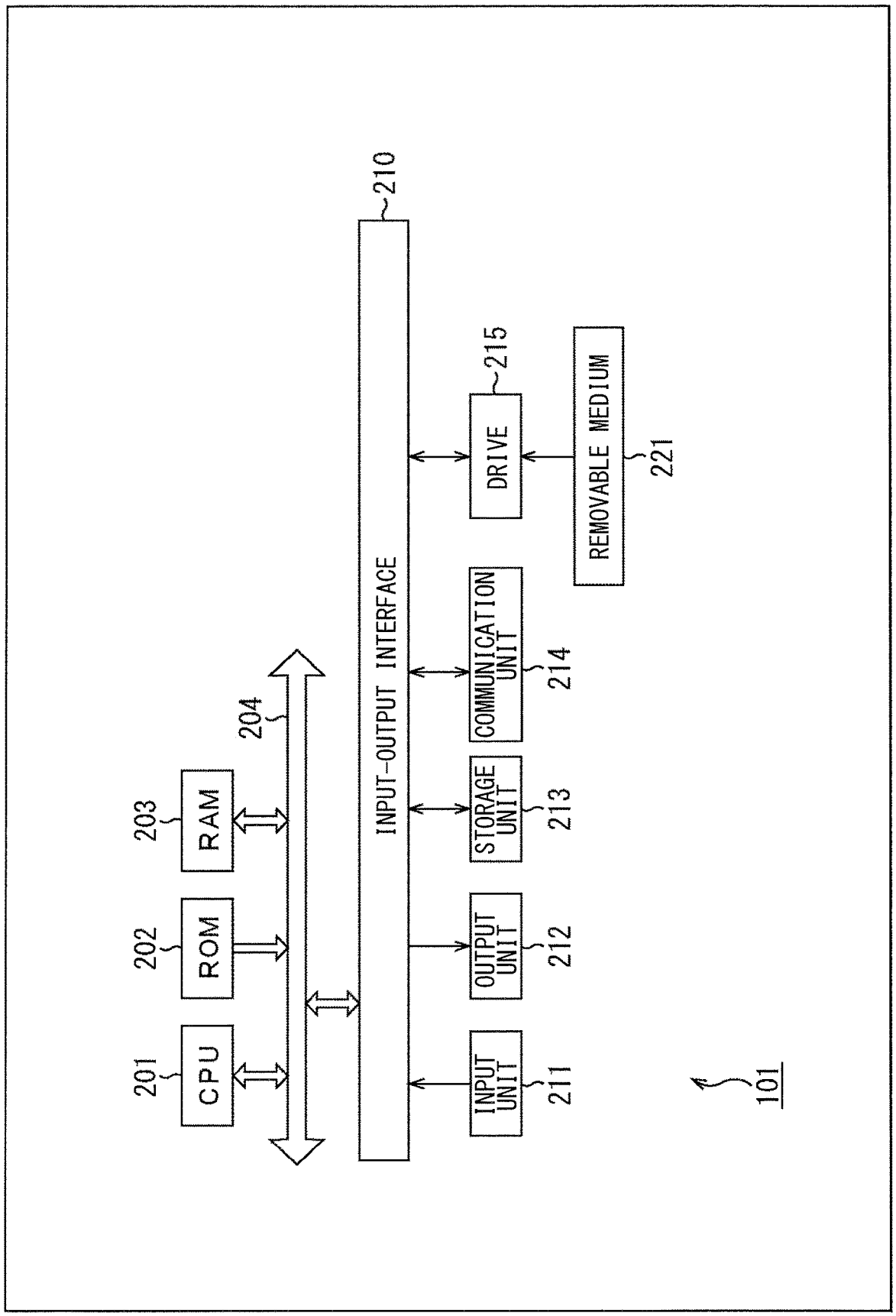
FIG. 20 is a block diagram illustrating a main configuration example of a control apparatus.

FIG. 20 is a block diagram illustrating an example of a main configuration of a control apparatus 101 which is an embodiment of an image processing apparatus to which the present technology is applied.

As illustrated in FIG. 20, the control apparatus 101 includes a CPU 201, a ROM 202, a RAM 203, a bus 204, an input-output interface 210, an input unit 211, an output unit 212, a storage unit 213, a communication unit 214, and a drive 215.

The CPU 201, the ROM 202, the RAM 203 are coupled to each other via the bus 204. The input-output interface 210 is also coupled to the bus 204. The input unit 211, the output unit 212, the storage unit 213, the communication unit 214, and the drive 215 are coupled to the input-output interface 210.

The input unit 211 includes any input device that accepts external information such as a user input. For example, the input unit 211 may include one or more of an operation button, a touch panel, a camera, a microphone, and an input terminal. Further, for example, the input unit 211 may include any one or more sensors such as an optical sensor or a temperature sensor. It goes without saying that the input unit 211 may include an input device other than those described above.

The output unit 212 includes any output device outputting information such as an image or a sound. For example, the output unit 212 may include one or more of a display, a speaker, and an output terminal. It goes without saying that the output unit 212 may include an output device other than those described above.

The storage unit 213 may be any storage medium holding information such as a program or data. For example, the storage unit 213 may include one or more of a hard disk, a RAM disk, and a non-volatile memory. It goes without saying that the storage unit 213 may include any storage medium other than those described above.

The communication unit 214 may include any communication device that performs communication exchanging information such as a program or data with an external apparatus via a predetermined communication medium (for example, any network such as the Internet). The communication unit 214 may include any network interface, for example. For example, the communication unit 214 communicates (exchange a program and data) with an apparatus outside the control apparatus 101. It is to be noted that the communication unit 214 may have a wired communication function, may have a wireless communication function, or may have both.

The drive 215 reads out information stored in the removable medium 221 attached to itself, and writes information on the removable medium 221 attached to itself. The drive 215 can, for example, read information from the removable medium 221 and supply the read information to the CPU 201, the RAM 203, or the like. Further, in a case where the writable removable medium 221 is mounted on the drive 215, it is possible to store information (a program, data, etc.) supplied from the CPU 201, the RAM 203, etc. in the removable medium 221. The removable medium 221 is a recording medium attachable to and detachable from the drive 215. For example, it may be a magnetic disk, an optical disk, a magneto-optical disk, a semiconductor memory, or the like.

For example, the CPU 201 loads a program stored in the storage unit 213 into the RAM 203 via the input-output interface 210 and the bus 204 and executes the program, thereby performing various processes. The RAM 203 also holds, as appropriate, data and the like required for the CPU 201 to execute various processes.

The CPU 201 executes the program and the like as described above, thereby performing a process related to corresponding point detection.

<Functional Block of Control Apparatus>

Figure 21:
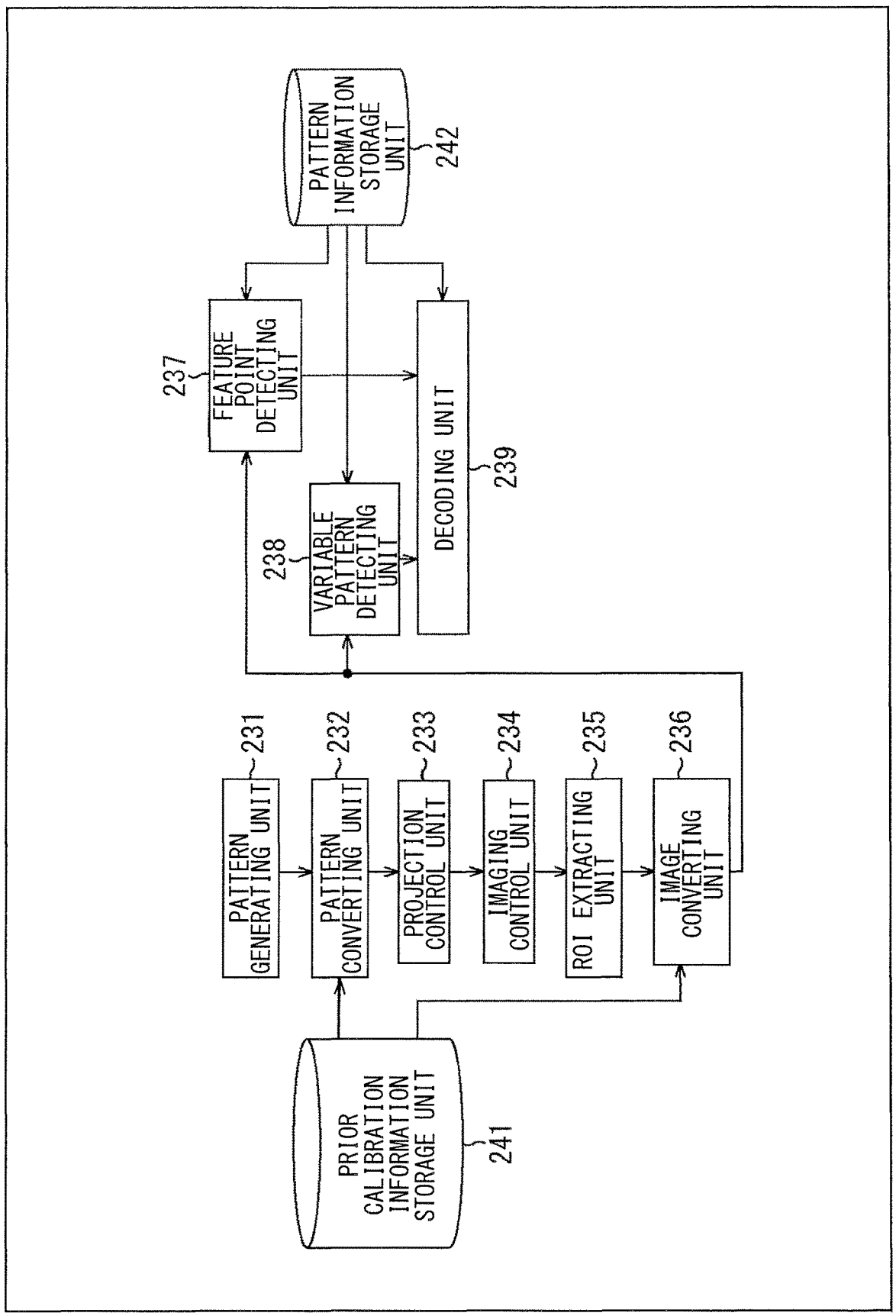
FIG. 21 is a functional block diagram illustrating an example of functions implemented by the control apparatus.

FIG. 21 is a functional block diagram illustrating an example of functions implemented by the control apparatus 101 executing a program or the like. As illustrated in FIG. 21, by executing a program, the control apparatus 101 includes, for example, processing units such as a pattern generating unit 231, a pattern converting unit 232, a projection control unit 233, an imaging control unit 234, an ROI (Region of Interest) extracting unit 235, an image converting unit 236, a feature point detecting unit 237, a variable pattern detecting unit 238, and a decoding unit 239. Further, the control apparatus 101 includes a prior calibration information storage unit 241 and a pattern information storage unit 242 by executing a program.

The pattern generating unit 231 generates a pattern image that includes a predetermined feature point and a predetermined variable pattern. The pattern image is directed to detection of corresponding points of the projected image projected by the projecting unit 111 and the captured image captured by the imaging unit 112. The pattern generating unit 231 supplies the generated pattern image to the pattern converting unit 232.

The pattern converting unit 232 acquires prior calibration information stored in the prior calibration information storage unit 241, and converts (perform prior correction on) the pattern image supplied from the pattern generating unit 231 on the basis of the prior calibration information. The pattern converting unit 232 supplies the obtained pattern image after the prior correction to the projection control unit 233.

The projection control unit 233 controls the projecting unit 111 to project the pattern image after the prior correction. The projection control unit 233 projects the pattern image, for example, as described with reference to FIGS. 16 to 19.

The imaging control unit 234 controls the imaging unit 112, and captures, at a predetermined timing, an image of a projected image of the pattern image projected by the projecting unit 111 controlled by the projection control unit 233. The predetermined timing is in synchronization with image projection by the projecting unit 111 controlled by the projection control unit 233. Further, the imaging control unit 234 generates a captured image. The imaging control unit 234 supplies the generated captured image to the ROI extracting unit 235.

The ROI extracting unit 235 extracts a partial region, of the supplied captured image, including the projected image of the pattern image, as a region of interest (ROI). The ROI extracting unit 235 supplies the captured image of the extracted region of interest to the image converting unit 236.

The image converting unit 236 acquires the prior calibration information stored in the prior calibration information storage unit 241, and converts (corrects) the captured image of the region of interest supplied from the ROI extracting unit 235 on the basis of the prior calibration information. The image converting unit 236 supplies the obtained captured image after the correction to the feature point detecting unit 237 and the variable pattern detecting unit 238.

The feature point detecting unit 237 acquires pattern information which is information related to a pattern image or the like and is stored in the pattern information storage unit 242. The feature point detecting unit 237 performs feature point detection on (the pattern image included in) the captured image after the correction on the basis of the pattern information. The feature point detecting unit 237 supplies information related to the detected feature point to the decoding unit 239.

The variable pattern detecting unit 238 acquires pattern information stored in the pattern information storage unit 242, and performs variable pattern detection on (the pattern image included in) the captured image after the correction on the basis of the pattern information. The variable pattern detecting unit 238 supplies information related to the detected variable pattern to the decoding unit 239.

The decoding unit 239 generates a code string corresponding to the variable pattern detected by the variable pattern detecting unit 238, acquires pattern information stored in the pattern information storage unit 242, and decodes the code string on the basis of the pattern information, thereby specifying a position, in the pattern image, of the feature point detected by the feature point detecting unit 237. Further, the decoding unit 239 detects the corresponding points on the basis of the position of the feature point.

The respective processing units from the pattern generating unit 231 to the decoding unit 239 are implemented by the CPU 201 executing a program and the like.

The prior calibration information storage unit 241 stores prior calibration information, which is (already-known) calibration information related to the projecting unit 111, the imaging unit 112, and the like, measured in advance. The prior calibration information storage unit 241 supplies the prior calibration information to the pattern converting unit 232, the image converting unit 236, and the like as needed or upon request.

The pattern information storage unit 242 stores pattern information. The pattern information storage unit 242 supplies the pattern information to the feature point detecting unit 237, the variable pattern detecting unit 238, and the decoding unit 239 as needed or upon request.

The prior calibration information storage unit 241 and the pattern information storage unit 242 are formed in a storage region of the storage unit 213, for example.

<Pattern Image>

Figure 22:
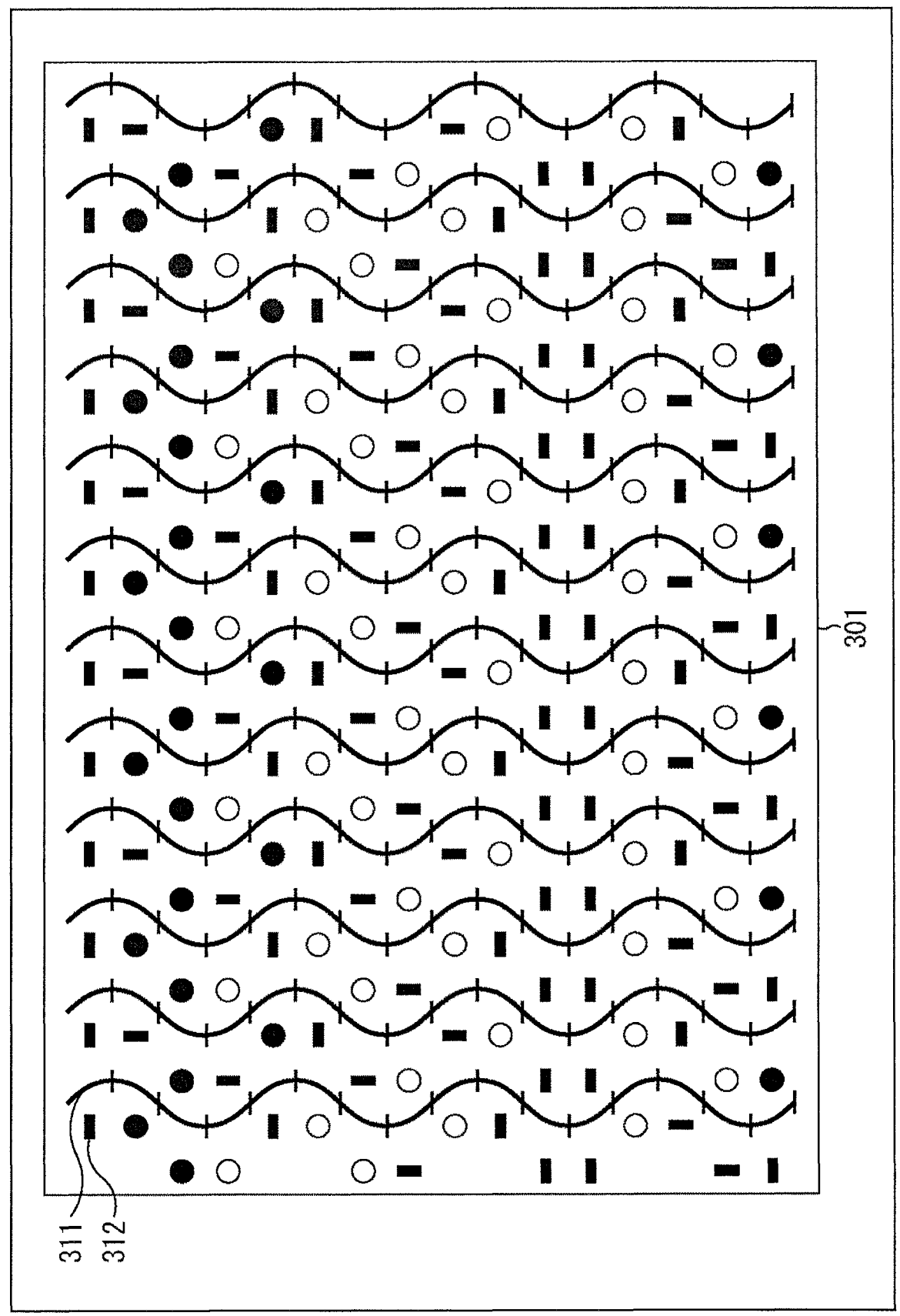
FIG. 22 is a diagram illustrating an example of a pattern image.

The pattern generating unit 231 generates, as a pattern image, a pattern image 301 having a configuration illustrated in FIG. 22, for example. The pattern image 301 is an image having a feature point of a repeating pattern that can be detected by template matching, and represents the uniqueness of the feature point by an M-sequence of a highly-distinguishable geometric pattern.

More specifically, the pattern image 301 is an image including a predetermined feature point 311 and a predetermined variable pattern 312, as illustrated in FIG. 22. The pattern image 301 is directed to detection of corresponding points of the projected image projected by the projecting unit 111 and the captured image captured by the imaging unit 112. The pattern image 301 is an image in which the feature point 311 and the variable pattern 312 are so arranged in accordance with predetermined regularity that the position of the feature point 311 in the pattern image 301 is uniquely determined on the basis of a code string obtained by parameterizing and permutationally expanding the variable pattern 312 group around the feature point 311.

<Feature Point>

The feature point 311 of the pattern image 301 is a repeating pattern. By allowing for this, the feature point 311 can be detected at a high speed by template matching.

More specifically, as illustrated in FIG. 22, an intersection of a wavy line and a line segment is defined as the feature point 311. Although a reference number (311) is attached to only one feature point in FIG. 22, a plurality of feature points 311 can be disposed in the pattern image 301 as illustrated in FIG. 22. It is to be noted that the number of the feature point 311 disposed in the pattern image 301 may be any number.

As described above, the feature point 311 is formed by the intersection of the wavy line and the line segment. Therefore, the structure thereof is simple, and can have a repetitive pattern (there are a plurality of feature points 311 having the same shape). Accordingly, template matching can be employed and detection can be performed more easily. That is, it is possible to perform a feature point detection process at a higher speed (to further shorten the processing time of the feature point detection process).

Figure 23:
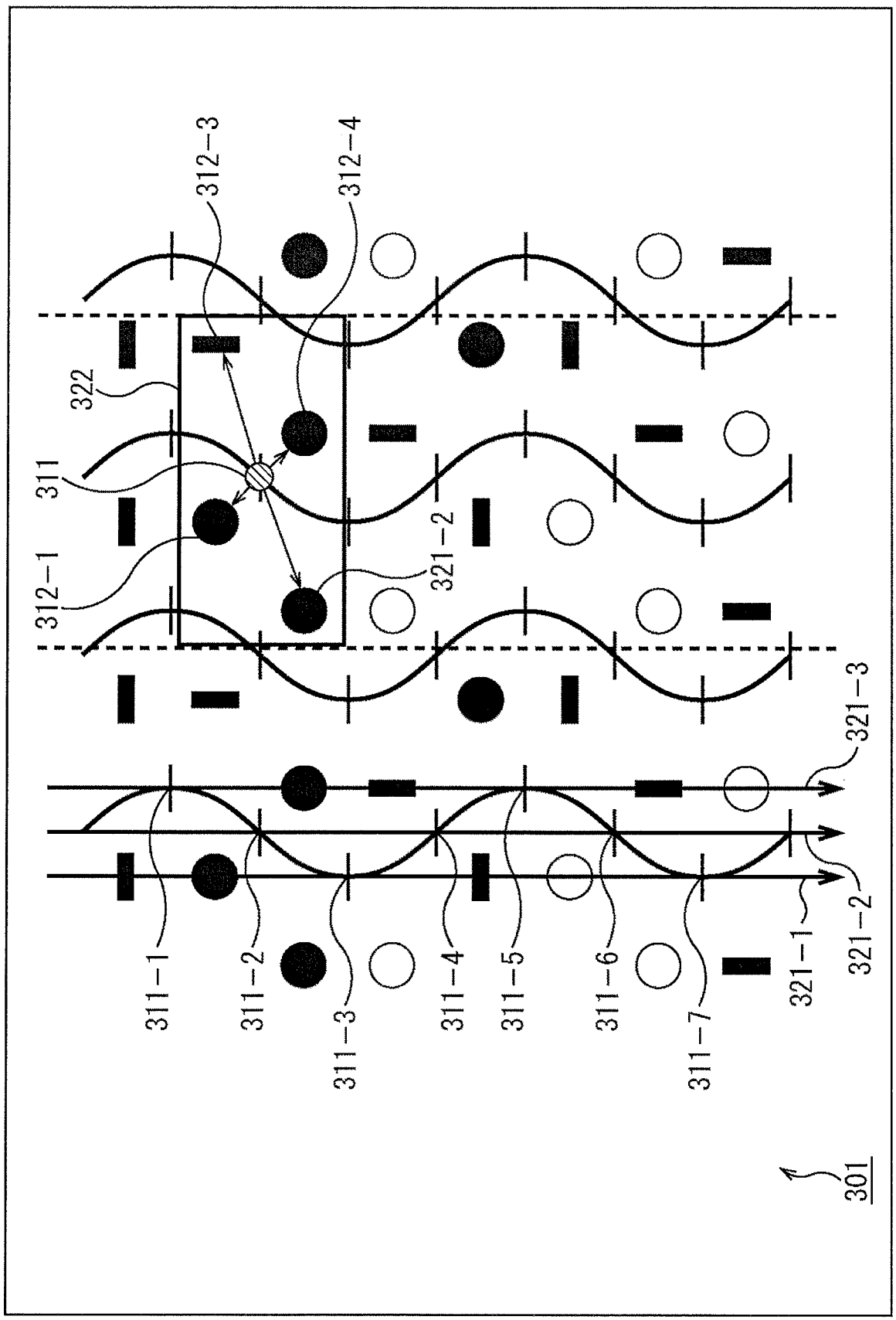
FIG. 23 is a diagram illustrating an example of a state of detection of a feature point and a variable pattern.

Further, since the feature point 311 is formed on the wavy line, the feature point 311 can be searched for along the wavy line as a search line 321-1, a search line 321-2, and a search line 321-3 illustrated on the left side in FIG. 23. Therefore, the search range can be made narrower and the detection can be performed more easily. That is, it is possible to perform the feature point detection process at a higher speed (to further shorten the processing time of the feature point detection process). For example, in a case in FIG. 23, the feature points 311-1 to 311-7 disposed on the same wavy line can be detected by searching for the search line 321-1, the search line 321-2, and the search line 321-3.

It is to be noted that the feature point 311 is classified in accordance with a shape of the portion of the wavy line that intersects the line segment. That is, in the pattern image 301, a plurality of types of feature points 311 classified in accordance with the shapes of the portions intersecting with the line segments of the wavy lines are arranged.

Figure 24:
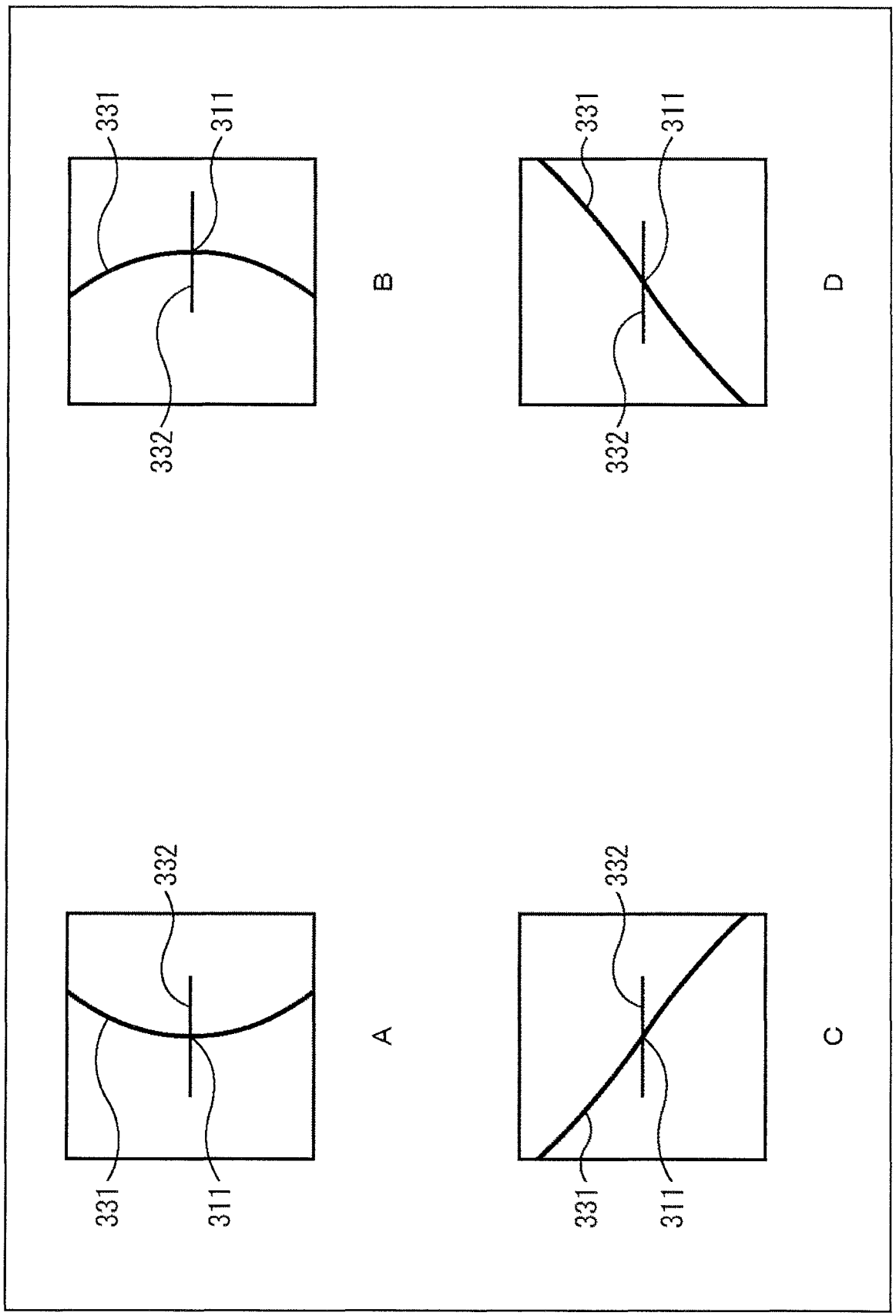
FIG. 24 is a diagram illustrating an example of a feature point.

For example, in the pattern image 301 in FIG. 22 or 23, the feature points 311 are classified into four types in accordance with the shape of the portion of the wavy line 331 that intersects with the line segment 332, as illustrated in FIG. 24. The feature point 311 illustrated in A of FIG. 24 is formed by an intersection of the line segment 332 and a portion, of the wavy line 331, that is curved to the left in the diagram. In the case of the example in FIG. 23, the feature point 311-3 and the feature point 311-7 belong to this type.

The feature point 311 illustrated in B of FIG. 24 is formed by an intersection of the line segment 332 and a portion, of the wavy line 331, curved to the right in the diagram. In the case of the example in FIG. 23, the feature point 311-1 and the feature point 311-5 belong to this type.

The feature point 311 illustrated in C of FIG. 24 is formed by an intersection of the line segment 332 and a portion, of the wavy line 331, in an upper-left-to-lower-right direction (oblique direction) in the diagram. In the case of the example in FIG. 23, the feature point 311-4 belongs to this type.

The feature point 311 illustrated in D of FIG. 24 is formed by an intersection of the line segment 332 and a portion, of the wavy line 331, in an upper-right-to-lower-left direction (oblique direction) in the diagram. In the case of the example in FIG. 23, the feature point 311-2 and the feature point 311-6 belong to this type.

As described above, the feature point 311 is set as the intersection of the wavy line and the line segment, and the line segments are caused to intersect a plurality of portions of the wavy line that differ in shape from each other. Thereby, the pattern generating unit 231 can dispose a plurality of types of feature points 311 classified in accordance with the shape of the portion, of the wavy line, that intersects the line segment. Therefore, the uniqueness of the feature point 311 can be improved, and the position of the feature point 311 can be more easily specified. In other words, it is possible to perform the corresponding point detection process at a higher speed (to further shorten the processing time of the corresponding point detection process).

It is to be noted that, by setting a plurality of portions with which the line segments intersect as predetermined portions that are determined in advance, the portion of the wavy line in which the feature point 311 is to be searched for is narrowed down (there is no need to search the entire wavy line). Therefore, feature point can be detected more easily. That is, it is possible to perform the feature point detection process at a higher speed (to further shorten the processing time of the feature point detection process). For example, in the case of the example in FIG. 23, it is sufficient that three search lines (the search line 321-1, the search line 321-2, and the search line 321-3) be searched (since they are straight lines, it is easier to search than a wavy line).

Further, as illustrated in FIG. 23, the types of feature points 311 detected on each of the search line 321-1, the search line 321-2, and the search line 321-3 are limited. For example, on the search line 321-1, the feature point 311 of the type illustrated in A of FIG. 24 is detected. On the search line 321-2, the feature point 311 of the type illustrated in C of FIG. 24 and the feature point 311 of the type illustrated in D of FIG. 24 are detected. On the search line 321-3, the feature point 311 of the type illustrated in B of FIG. 24 is detected. Accordingly, on each search line, only some predetermined types of feature points may be searched for (the types of feature point to be searched for may be narrowed). By narrowing the types of feature points to be searched for on the basis of known data in this manner, it is easier (faster) to detect the feature point 311 on all search lines than in a case where all types of feature points 311 are searched for.

It is to be noted that, in the pattern image 301 in FIG. 22 or the like, a longitudinal direction of the wavy line is set to a vertical direction in the drawing, but the longitudinal direction of the wavy line may be any direction. For example, it may be a lateral direction or an oblique direction. By setting the longitudinal direction of the wavy line to a direction corresponding to the positional relationship between the projecting unit 111 and the imaging unit 112, the corresponding point detection can be performed more easily. For example, in a case where the projecting unit 111 and the imaging unit 112 are arranged in parallel in the vertical direction and the positions in the horizontal direction are the same as each other, the corresponding point detection can be performed more easily by setting the longitudinal direction of the wavy line as its vertical direction as in the example in FIG. 22 or the like.

It is to be noted that the shape of the wavy line (a curvature, a line thickness, or the like) may be any shape and is not limited to the example illustrated in FIG. 22 or the like. Further, the number of wavy lines included in the pattern image 301 may be any number and is not limited to the example in FIG. 22 or the like.

It goes without saying that the feature point 311 may have any shape (structure), and is not limited to the example of the intersection of the wavy line and the line segment described above. In addition, the position of the wavy line where the line segment intersects may also be any position, and is not limited to the examples described above. However, by causing the feature point 311 to have the above-described shape (structure), the above-described effects can be obtained.

<Variable Pattern>

The variable pattern 312 of the pattern image 301 is a figure directed to specifying of the feature point 311. Although the reference number (312) is attached to only one variable pattern in FIG. 22. However, a plurality of variable patterns 312 may be disposed in the pattern image 301 as illustrated in FIG. 22. It is to be noted that the number, position, size, and shape of the variable pattern 312 disposed in the pattern image 301 may be any number, position, size, and shape.

For example, as illustrated on the right side in FIG. 23, the feature point 311 to be processed (the feature point 311 indicated by a shaded circle) (i.e., the position of the feature point 311) is specified on the basis of the arrangement pattern (arrangement of the variable pattern 312) of the variable patterns 312 (variable patterns 312-1 to 312-4) located within a predetermined range 322 with respect to the feature point 311.

More specifically, the variable patterns 312 are assigned with different codes for the respective types (that is, respective shapes) classified in accordance with their shapes. (Position of) Feature point is specified with use of a code string in which codes that are arranged in a predetermined order. The codes correspond to the respective variable patterns 312 selected on the basis of the feature point as described above.

In other words, in the pattern image 301, a plurality of types of variable patterns 312 classified in accordance with shapes and assigned with respective codes different from each other are disposed. By using the variable pattern 312 in this manner, the respective feature points 311 can be more accurately identified (that is, the position of the feature point 311 can be specified).

Figure 25:
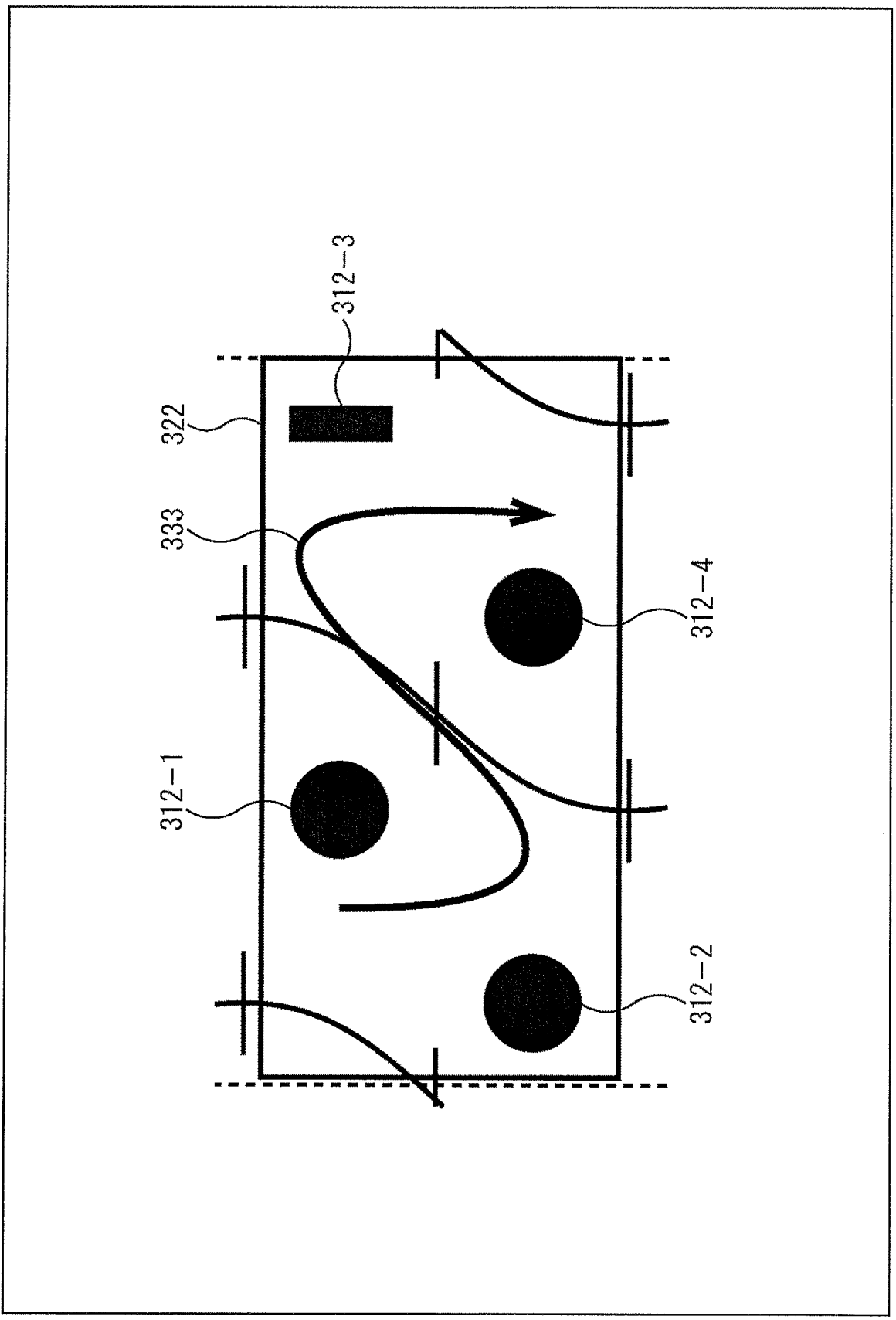
FIG. 25 is a diagram illustrating an example of a state of generation of a code string.
Figure 26:
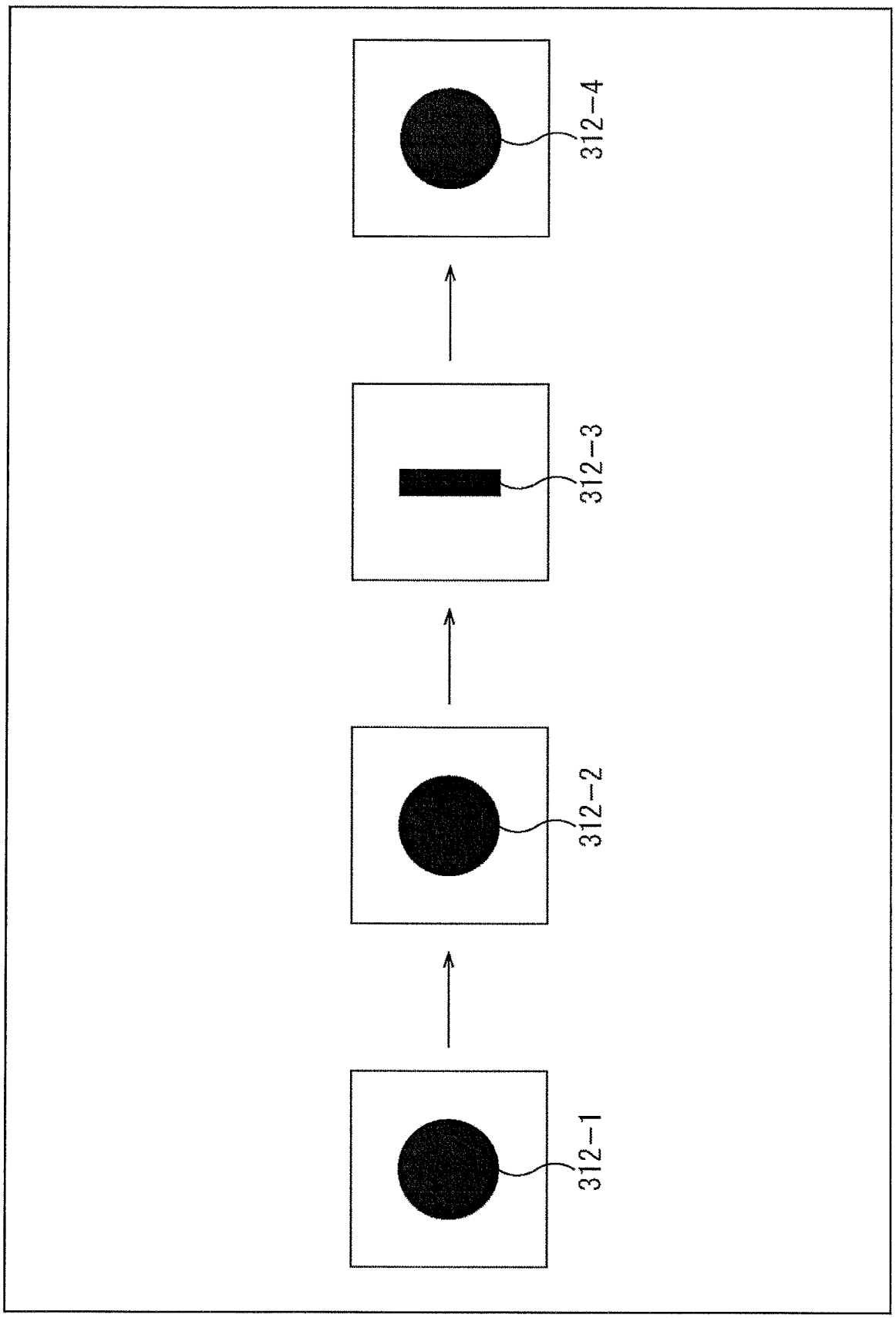
FIG. 26 is a diagram illustrating an example of a state of generation of of a code string.

For example, when the variable patterns 312 (e.g., the variable patterns 312-1 to 312-4 located in the range 322) located in the predetermined range 322 on the right side in FIG. 23 are arranged in the order of an arrow 333 as illustrated in FIG. 25, the variable pattern 312-1, the variable pattern 312-2, the variable pattern 312-3, and the variable pattern 312-4 are arranged in this order as illustrated in FIG. 26.

As described above, each variable pattern 312 is assigned with a code corresponding to its shape (type). Therefore, if the arrangement of the variable patterns 312 as the example in FIG. 26 is encoded, a code string including codes corresponding to the respective variable patterns 312 is generated.

In other words, in the pattern image 301, a plurality of variable patterns 312 is so arranged around each of the plurality of feature points 311 that a code string of a predetermined length can be obtained by arranging the plurality of variable patterns 312 in a predetermined order.

By comparing this code string with a list of code strings included in the predetermined pattern image 301, it is possible to specify the position of the feature point 311 corresponding to the code string can be specified in the pattern image 301. That is, in the pattern image 301, the respective variable patterns 312 are so arranged as to express the uniqueness of the feature point 311 by the arrangement of the variable pattern 312 in this manner.

It is to be noted that the order of arrangement of the variable patterns 312 may be any order, and is not limited to the example (the arrow 333) in FIG. 25. Further, in FIG. 25 and the like, description is given of a case where four variable patterns 312 are selected. However, the number of variable patterns 312 selected on the basis of the feature point 311, (that is, the length of the code string) may be any number. In other words, the range 322 may have any size and shape. Generally, the greater the number of variable patterns 312 selected for identification of the feature point 311 is, the more the identification characteristic of the feature point 311 improves. Further, generally, the smaller the number of the variable patterns 312 selected for identification of the feature point 311 is, the faster the position of the feature point 311 can be specified.

As illustrated in FIG. 22, the variable pattern 312 includes images (figures) of simple shapes such as a rectangle or a circle. This allows for easier (i.e., faster) identification of the shape (i.e., identification of type) of the variable pattern 312. For example, in the case of the pattern image 301 in FIG. 22 or 23, the variable pattern 312 is each image of a white circle (circle (Circle) with a circular contour and a non-colored center of gravity), a black circle (disc (Disc) with a circular contour and a colored center of gravity), a vertically-long rectangular (rectangle vertical (Recangle Vertical) that is a rectangle with a major axis in the vertical direction), and a horizontally-long rectangle (rectangle horizontal (Recangle Horizontal) which is a rectangular with a major axis in the horizontal direction).

It goes without saying that the shape of the variable pattern 312 may be any shape and is not limited to these examples. Further, the types (the number of shapes) of the variable patterns 312 may be any type, and may be five or more types or three or less types. Generally, as the number of types of the variable pattern 312 increases, an identification characteristic of the feature point 311 improves. Further, generally, the smaller the number of types of the variable patterns 312, the faster the type of the variable pattern 312 can be identified.

The position of the corresponding feature point 311 may be uniquely determined in the entire pattern image 301 or may be uniquely determined in the search range of the feature point 311 by the arrangement (i.e., code string) of the variable patterns 312 as described above. Since the position of the search range of the target to be processed is already known, if the feature point 311 can be uniquely specified in the search range, the feature point 311 can be uniquely specified also in the pattern image 301.

In other words, in the pattern image 301, a plurality of types of variable patterns 312 may be arranged at positions where the position of the feature point 311 in the search range is uniquely determined by decoding the code string. This makes it possible to decrease the identification characteristic of the feature point 311 required for specifying the feature point 311. For example, the number of variable patterns 312 to be selected (the length of the code string) can be reduced.

It is to be noted that, although the details will be described later, the position of the feature point in the search range may be uniquely determined by decoding a portion of the code string. That is, in the pattern image 301, a plurality of types of variable patterns 312 may be arranged at positions by which the position of the feature point 311 in the search range is uniquely determined by decoding a portion of the code string. Even in a case where a portion of the variable patterns 312 cannot be identified, this makes it possible to specify the position of the feature point 311. That is, it is possible to improve the robustness of specifying the position of the feature point 311.

<Generation of Pattern Image>

Returning to FIG. 21, the pattern generating unit 231 generates the pattern image 301 as described above. It is to be noted that the pattern image 301 may be generated in advance and stored in any storage medium such as the storage unit 213, for example. In that case, the pattern generating unit 231 reads the pattern image 301 from the storage medium and supplies it to the pattern converting unit 232.

It is to be noted that a plurality of pattern images 301 may be stored in any storage medium such as the storage unit 213, for example. The plurality of pattern images 301 differ from each other in the arrangement of the feature point 311, the variable pattern 312, and the like. In this case, the pattern generating unit 231 selects and reads out a desired pattern image 301 from the plurality of pattern images 301 on the basis of any condition such as a moving image to be projected, a projection state of an image, or the like, and supplies the read pattern image 301 to the pattern converting unit 232.

<Inverse Rectify>

The pattern converting unit 232 converts (corrects) the captured image of the projected image captured by the imaging unit 112 from the pattern image supplied from the pattern generating unit 231. Thereby, the pattern converting unit 232 performs prior correction on the pattern image supplied from the pattern generating unit 231 on the basis of the prior calibration information acquired from the prior calibration information storage unit 241. The pattern converting unit 232 so performs the prior correction that the centers of gravity of the feature point and the variable pattern are located at a predetermined pixel. It is to be noted that this prior correction is also referred to as inverse-Rectify.

Figure 28:
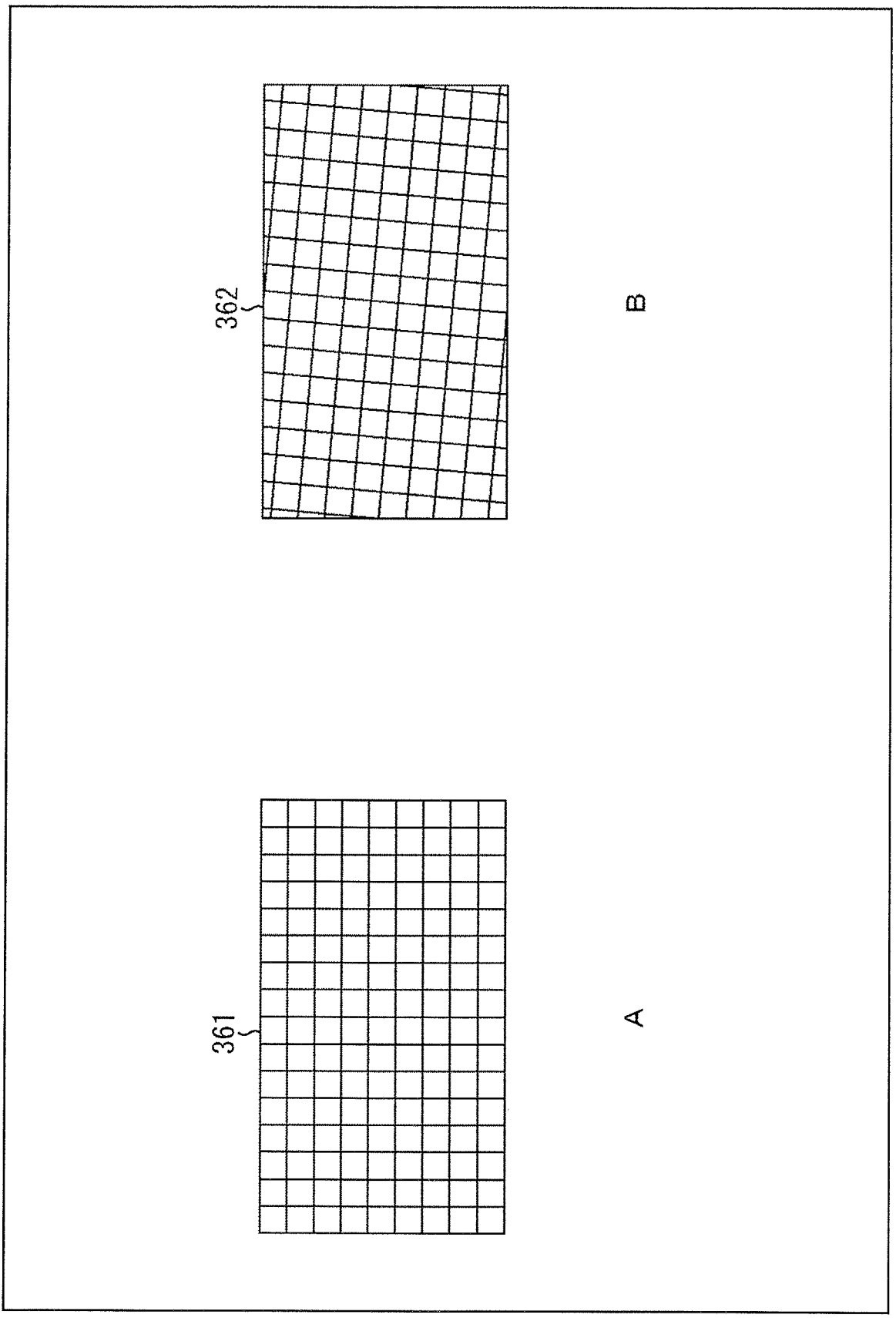
FIG. 28 is a diagram illustrating an example of prior correction.

For example, the pattern converting unit 232 converts the pattern image 361 generated as illustrated in A of FIG. 28 into a pattern image 362 as illustrated in B of FIG. 28 by inverse-Rectify.

The prior calibration information used by the pattern converting unit 232 for the prior correction may include one or both of information (e.g., translational component, rotational component, baseline length, etc.) related to a relative position, a relative posture, or the like between the projecting unit 111 and the imaging unit 112, and information (e.g., focal length, principal point, distortion of a lens, etc.) related to the lens unit 157. It is to be noted that the prior calibration information is not limited to these pieces of information, and may include already-known information that can be used for prior correction as appropriate. In other words, the process content of the prior correction (inverse-Rectify) may be any process as long as the feature point and the variable pattern of the pattern image are positioned at a predetermined pixel by correcting the captured image of the projected image.

The pattern converting unit 232 supplies the obtained pattern image after the prior correction (the pattern image subjected to inverse-Rectify) to the projection control unit 233.

The projection control unit 233 controls the projecting unit 111 to project the pattern image after the prior correction as an image of invisible light.

<ROI Extraction>

The imaging control unit 234 controls the imaging unit 112 to cause the pattern image of the invisible light projected by the projecting unit 111 to be subjected to imaging, and acquires the captured image thereof.

The ROI extracting unit 235 so sets a partial region as a region of interest (ROI) and extracts it that only the partial region, of the supplied captured image, that includes the projected image of the pattern image can be processed.

Figure 27:
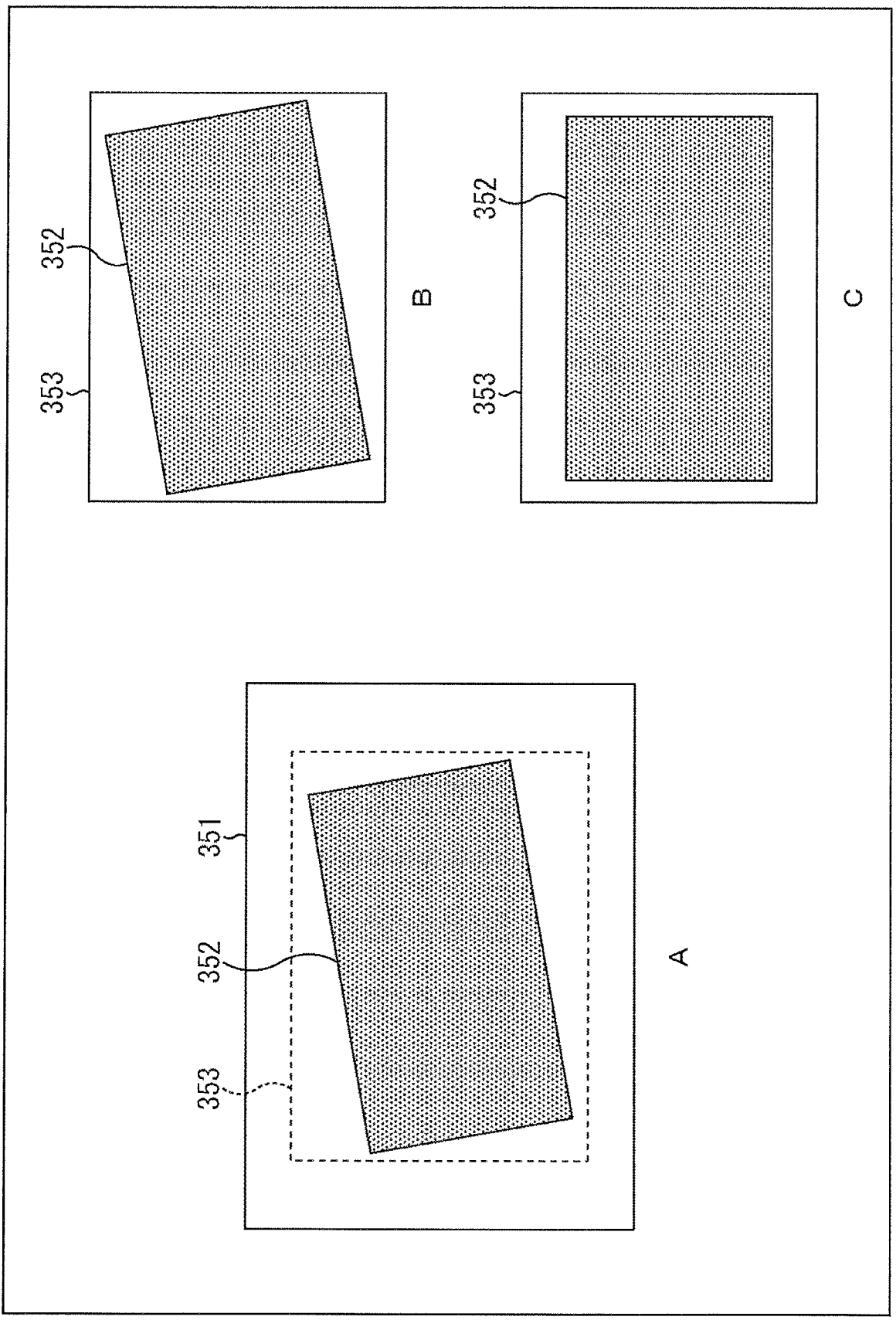
FIG. 27 is a diagram illustrating an example of a state of extraction and correction of a region of interest.

For example, suppose a captured image 351 illustrated in A of FIG. 27 is obtained. The captured image 351 includes a projected image 352 of the pattern image 301. The ROI extracting unit 235 sets and extracts a partial region 353 including the projected image 352 as the region of interest. B of FIG. 27 illustrates the extracted partial region 353.

The ROI extracting unit 235 supplies the captured image of the extracted region of interest (partial region 353 in B of FIG. 27) to the image converting unit 236.

<Rectify>

In order to perform searching in variable detection more efficiently, the image converting unit 236 converts (corrects) the supplied captured image (the partial region 353 in B of FIG. 27) on the basis of the prior calibration information acquired from the prior calibration information storage unit 241. This correction is also referred to as Rectify. As described above, the pattern image 301 is subjected to the inverse-Rectify and is projected. Therefore, the centers of gravity of the feature point and the variable pattern are located at a predetermined pixel by Rectify performed by the image converting unit 236 on the partial region 353.

That is, the image converting unit 236 corrects the captured image obtained by imaging, by the imaging unit 112, of the pattern image 301 of the invisible light projected by the projecting unit 111. The image converting unit 236 thereby cause each of the centers of gravity of the feature point 311 and the variable pattern 312 of the pattern image 301 to be positioned at a predetermined pixel.

By this Rectify, for example, the inclination of the projected image 352 of the pattern image 301 with respect to the partial region 353 as illustrated in B of FIG. 27 is corrected as illustrated in C of FIG. 27 (inclination is reduced).

<Feature Point Detecting Unit>

Figure 29:
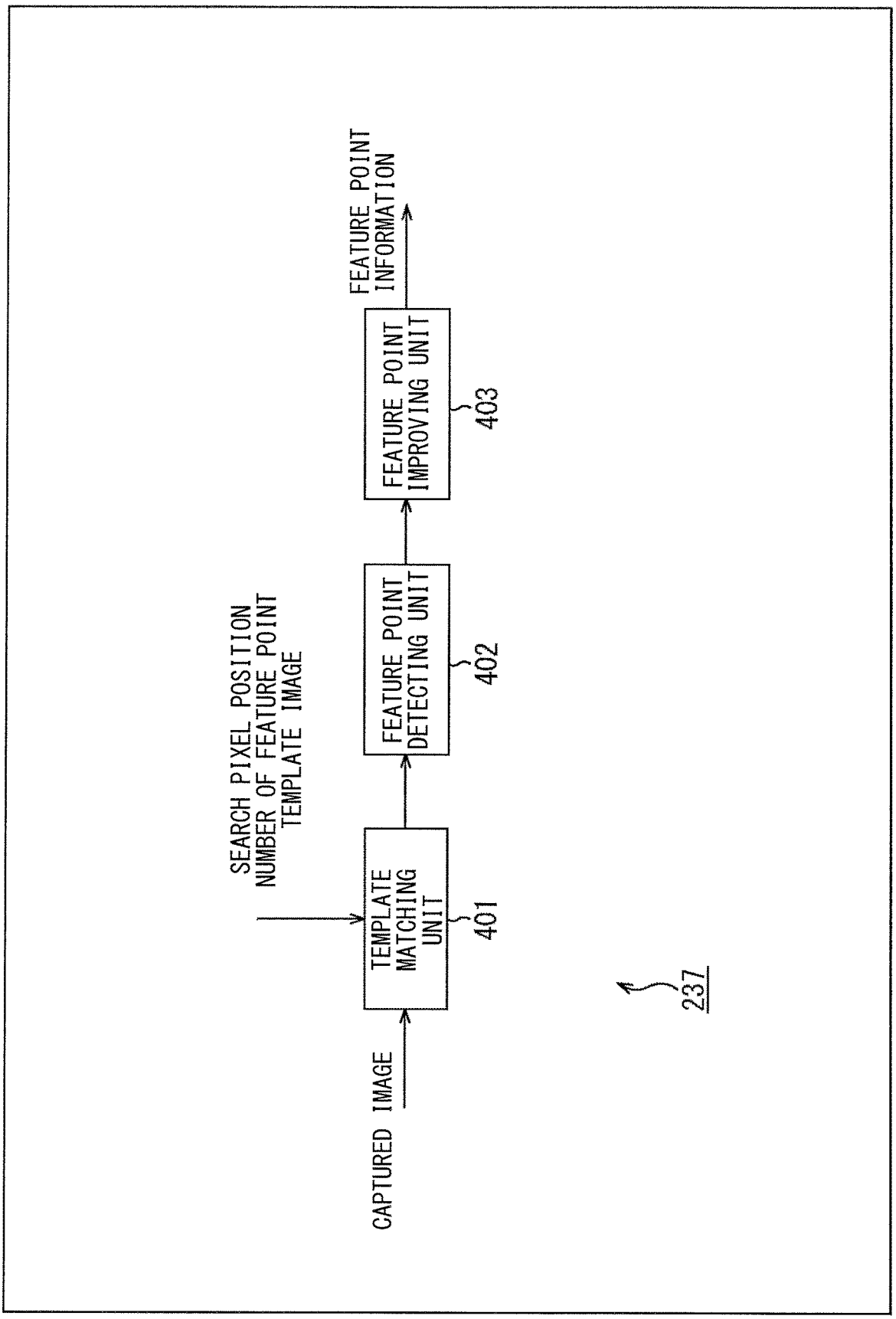
FIG. 29 is a functional block diagram illustrating an example of functions implemented by a feature point detecting unit.

FIG. 29 is a functional block diagram illustrating a main configuration example of the feature point detecting unit 237 illustrated in FIG. 21. As illustrated in FIG. 29, the feature point detecting unit 237 includes a template matching unit 401, a feature point detecting unit 402, and a feature point improving unit 403.

<Template Matching>

The template matching unit 401 obtains the similarity degree of the feature point 311 with the template image for each pixel in the search range of the feature point 311. That is, the template matching unit 401 compares the captured image with the template image (template matching), and detects the feature point 311 on the basis of a matching score thereof (similarity degree).

The template matching unit 401 acquires the image subjected to Rectify from the image converting unit 236. In addition, the template matching unit 401 acquires information such as a search pixel position, the number of characteristic points, or a template image as pattern information from the pattern information storage unit 242. The search pixel position is information that indicates a position of a pixel in which the feature point 311 is searched for (that is, the position of the search range).

For example, it is information indicating the positions of the search lines 321-1 to 321-3 and the like in FIG. 23. It is to be noted that the width of the search line (i.e., the width of the search range) may be one pixel, or may be two or more pixels. By widening the width of the search range, it is possible to improve the robustness of feature point detection. Further, by narrowing the width of the search range, it is possible to suppress an increase in load of the feature point detection process and to make it easier (faster).

The number of feature points is information indicating the number of feature points existing in the search range. Since the configuration of the pattern image 301 (such as the position of the feature point 311) is already known, the number of feature points 311 in the search range is also already known.

The template image is a template image of the feature point 311. For example, it includes an image illustrated in FIG. 24.

The template matching unit 401 uses such a template image and the search pixel position corresponding to the image to calculate a matching score in each pixel in the search range. Since the template image is generated by a simulation on a calculator, the template image has an ideal binary pattern with a pixel value of 0/255. In contrast, brightness of the captured image actually obtained by sensing depends on the situation.

Therefore, the template matching unit 401 calculates the similarity degree using the normalized cross-correlation (ZNCC (Zero-mean Normalized Cross-Correlation). By using the normalized cross-correlation, the similarity degree can be stably calculated even if there is variation in brightness.

Let $T(i, j)$ be the luminance value of the template image, $I(i, j)$ be the luminance value of the captured image, and $T_{AVG}$, $I_{AVG}$ be the respective average values of the luminance values. The similarity degree $Score_{ZNCC}$ of the ZNCC in this case is calculated as the following expression (1).

$$Score_{ZNCC} = \frac{\sum_{j=0}^{N-1}\sum_{i=0}^{M-1}((I(i,j) - I_{AVG})(T(i,j) - T_{AVG}))}{\sqrt{\sum_{j=0}^{N-1}\sum_{i=0}^{M-1}(I(i,j) - I_{AVG})^2 \times \sum_{j=0}^{N-1}\sum_{i=0}^{M-1}(T(i,j) - T_{AVG})^2}} \quad (1)$$

The average values $T_{AVG}$ and $I_{AVG}$ are calculated as the following expressions (2) and (3).

$$T_{AVG} = \frac{\sum_{j=0}^{N-1}\sum_{i=0}^{M-1}T(i,j)}{MN} \quad (2)$$

$$I_{AVG} = \frac{\sum_{j=0}^{N-1}\sum_{i=0}^{M-1}I(i,j)}{MN} \quad (3)$$

The similarity degree $Score_{ZNCC}$ is calculated as the following expression (4) by the expressions (1) to (3).

$$Score_{ZNCC} = \frac{MN\sum_{j=0}^{N-1}\sum_{i=0}^{M-1} I(i,j)T(i,j) - \sum_{j=0}^{N-1}\sum_{i=0}^{M-1} I(i,j) \times \sum_{j=0}^{N-1}\sum_{i=0}^{M-1} T(i,j)}{\sqrt{\left(MN\sum_{j=0}^{N-1}\sum_{i=0}^{M-1} I(i,j)^2 - \left(\sum_{j=0}^{N-1}\sum_{i=0}^{M-1} I(i,j)\right)^2\right)\left(MN\sum_{j=0}^{N-1}\sum_{i=0}^{M-1} T(i,j)^2 - \left(\sum_{j=0}^{N-1}\sum_{i=0}^{M-1} T(i,j)\right)^2\right)}} \quad (4)$$

By doing so, the template matching unit 401 can calculate the similarity degree $Score_{ZNCC}$ by a one-pass computation method. Therefore, the template matching unit 401 can calculate the similarity degree at a higher speed.

The template matching unit 401 supplies the calculated similarity degree $Score_{ZNCC}$ of each pixel to the feature point detecting unit 402.

<Feature Point Detection>

The feature point detecting unit 402 detects the feature point on the basis of the similarity degree $Score_{ZNCC}$ of each pixel supplied from the template matching unit 401. For example, the feature point detecting unit 402 detects a pixel having a high similarity degree as the feature point 311. For example, the feature point detecting unit 402 may detect a pixel having a similarity degree higher than those in the surrounding region as the feature point 311. For example, the feature point detecting unit 402 may refer to the similarity degree of each pixel within a predetermined range, and may detect a pixel having the highest similarity degree as a feature point.

Figure 30:
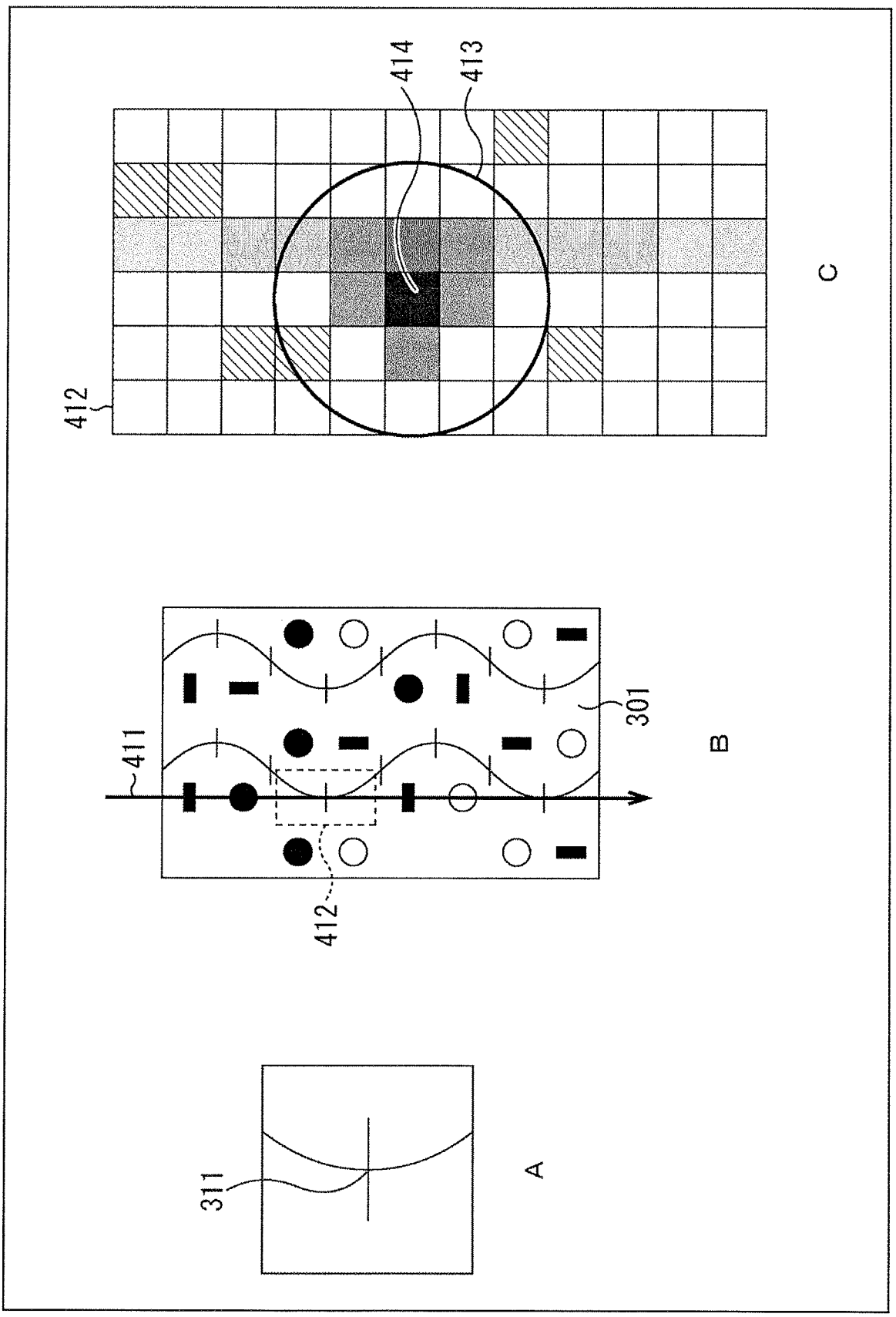
FIG. 30 is a diagram illustrating an example of a state of feature point detection.

Generally, the pixel in the vicinity of the feature point 311 also has a high similarity degree. For example, when the similarity degree with the template image of the feature point 311 as illustrated in A of FIG. 30 is calculated in a search range having a predetermined width centered on the search line 411 of the captured image of the pattern image 301 illustrated in B of FIG. 30, it is assumed that the similarity degree of each pixel is obtained as illustrated in C of FIG. 30 in a range 412. In C of FIG. 30, each square indicates a pixel. A concentration indicates the similarity degree of each pixel, and the higher the concentration is, the higher the score is.

In such a case, the score of the pixel 414 is highest, but the score of the surrounding pixel is also high. Therefore, if a pixel having a high similarity degree is simply detected as the feature point 311, the pixel in the vicinity of the pixel matching the real feature point 311 may also be detected as the feature point 311.

Therefore, as illustrated in C of FIG. 30, the scores of respective pixels are compared in a predetermined range 413. By comparing the heights of the similarity degree with the surroundings in this manner, only the pixel 414 most likely to be the feature point 311 in the vicinity can be detected as the feature point 311. It is thereby possible to suppress unnecessary pixel detection.

It is to be noted that the range 413 for comparing the similarity degree may have any size and any shape.

Further, the number of feature points (the number of assumed feature points) present in the search range (search line) is already known and is indicated by the number of feature points in the pattern information. Therefore, the feature point detecting unit 402 detects the feature point as a candidate as described above. In a case where the number of the candidates is larger than the number of the feature points acquired as the pattern information from the pattern information storage unit 242, that is, the assumed number of the feature point, the feature point detecting unit 402 selects the candidates for the assumed number of candidates in descending order of similarity degree. In this manner, the feature point detecting unit 402 can perform feature point detection with higher accuracy.

The feature point detecting unit 402 supplies, to the feature point improving unit 403, information related to the pixel detected as the feature point 311.

<Feature Point Refinement>

Coordinates (feature point coordinates) of the pixel detected as the feature point 311 are of integer pixel accuracy. Then, the feature point improving unit 403 improves (refines) the feature point coordinates of the integer pixel accuracy to decimal point pixel accuracy.

More specifically, the feature point improving unit 403 refers to the ZNCC scores of the neighboring pixel of the feature point 311, and estimates the feature point pixel position of the decimal point pixel accuracy by performing parabola fitting.

Figure 31:
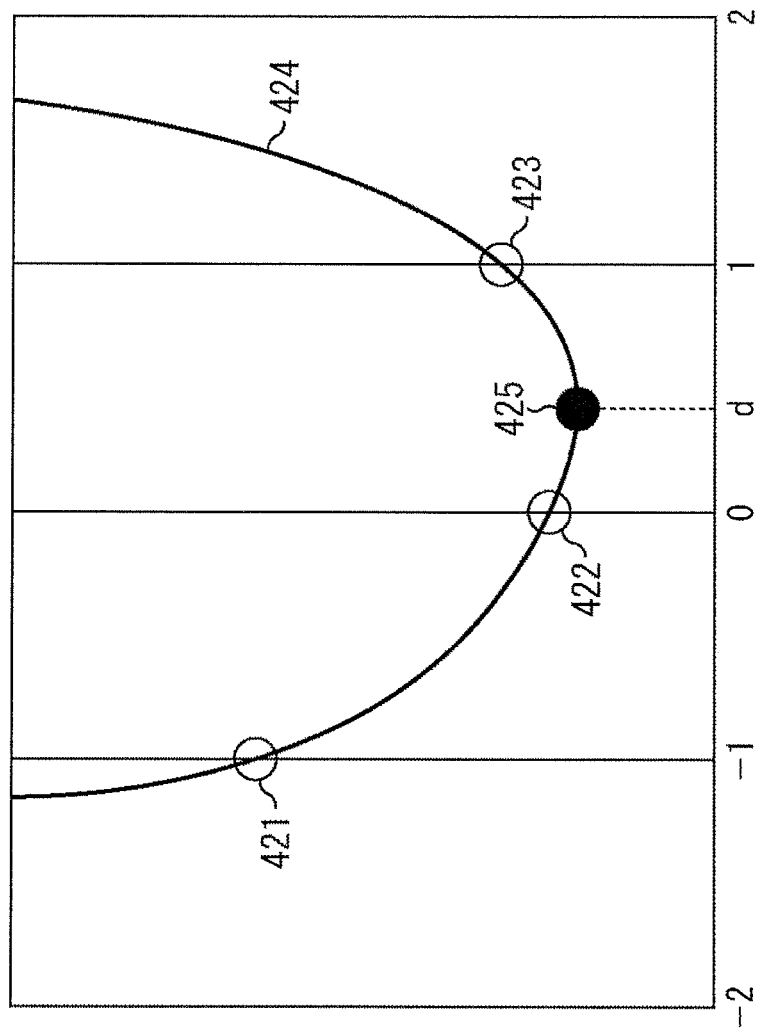
FIG. 31 is a diagram illustrating an example of a state of feature point refinement.

For example, it is assumed that the ZNCC score R(−1) of the value indicated at a point 421 is obtained at the coordinate −1, the ZNCC score R(0) of the value indicated at a point 422 is obtained at the coordinate 0, and the ZNCC score R(1) of the value indicated at a point 423 is obtained at the coordinate 1, as in a graph illustrated in FIG. 31. In this graph, the lower direction in the diagram indicates a higher score. In this case, it is assumed that the ZNCC score R transitions as indicated by a curved line 424. Therefore, the ZNCC score R(z) (point 425 in the diagram) of the coordinate d, which is the lowest end of the curved line 424, is the maximum.

Therefore, the feature point improving unit 403 calculates the coordinate d as in the following expression (5), and sets the coordinate d as the feature point pixel position.

$$d = \frac{R(-1) - R(1)}{2R(-1) - 4R(0) + 2R(1)} \quad (5)$$

It is to be noted that the parabolic fitting is one-dimensional parabolic fitting. By performing such parabola fitting in each of the horizontal direction and the vertical direction, two-dimensional refinement can be performed.

Figure 32:
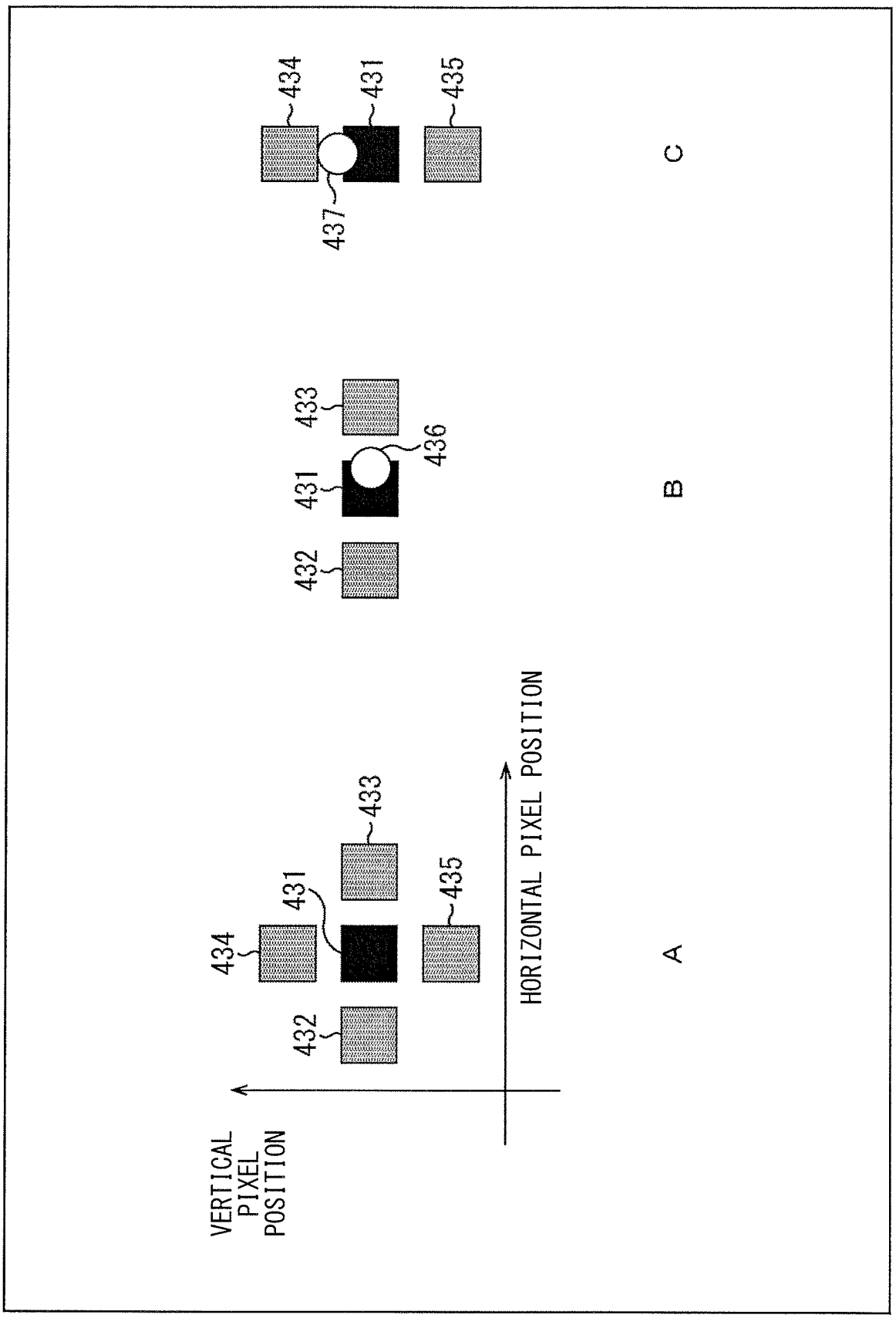
FIG. 32 is a diagram illustrating an example of a state of feature point refinement.

For example, as illustrated in A of FIG. 32, the feature point improving unit 403 performs one-dimensional parabola fitting in the horizontal direction as illustrated in B of FIG. 32 with use of a pixel 432 and a pixel 433 horizontally neighboring the pixel 431 having the highest score in the integer pixel accuracy. The feature point improving unit 403 thereby obtains a feature point pixel position 436 of the decimal point pixel accuracy in the horizontal direction. Next, as illustrated in A of FIG. 32, the feature point improving unit 403 performs one-dimensional parabola fitting in the vertical direction as illustrated in C of FIG. 32 with the use of a pixel 434 and a pixel 435 which are vertically neighboring the pixel 431 having the highest score of the integer pixel accuracy. The feature point improving unit 403 thereby obtains a feature point pixel position 437 of the decimal point pixel accuracy in the vertical direction. In this manner, the feature point pixel position of the two-dimensional decimal point pixel accuracy can be obtained.

It is to be noted that the feature point improving unit 403 may perform two-dimensional parabola fitting using eight pixels neighboring the pixel of the highest score of integer pixel accuracy. In general, one-dimensional parabola fitting can suppress an increase in computational load. Further, generally, two-dimensional parabola fitting can more accurately determine the feature point pixel position of the decimal point pixel accuracy.

The feature point improving unit 403 supplies the decoding unit 239 with information related to the feature point 311 that is obtained by refining the coordinates to decimal point pixel accuracy as described above.

<Variable Pattern Detecting Unit>

Figure 33:
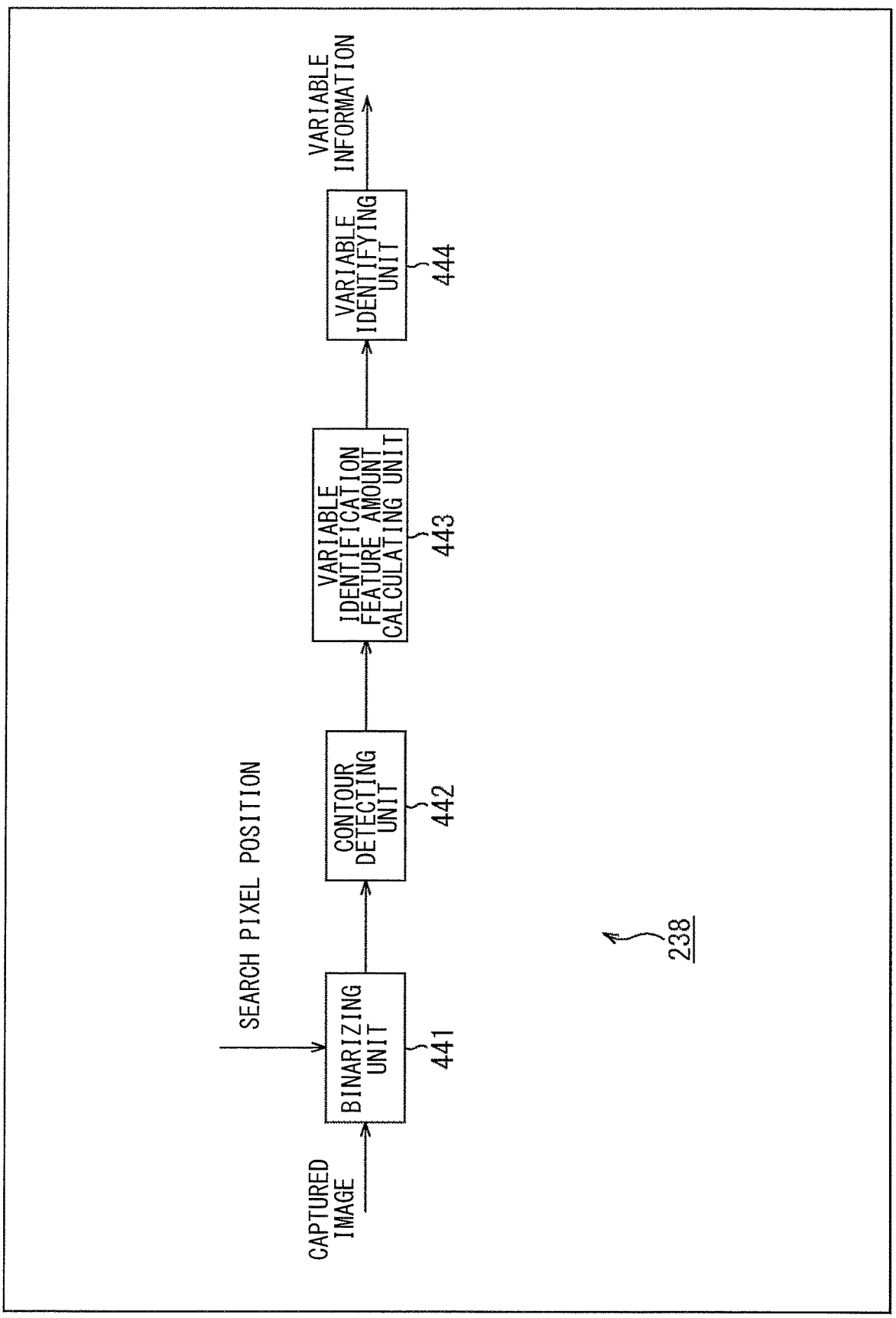
FIG. 33 is a functional block diagram illustrating an example of functions implemented by a variable pattern detecting unit.

FIG. 33 is a functional block diagram illustrating a main configuration example of the variable pattern detecting unit 238 illustrated in FIG. 21. As illustrated in FIG. 33, the variable pattern detecting unit 238 includes a binarizing unit 441, a contour detecting unit 442, a variable identification feature amount calculating unit 443, and a variable identifying unit 444.

<Binarization>

The binarizing unit 441 binarizes the captured image subjected to Rectify. For example, the binarizing unit 441 may perform binarization by dividing the search range into blocks and using the average luminance value for each region in view of a reflectance resulting from peripheral dimming of the imaging unit 112, the projection situation, or the like.

Specifically, since only the projector projected region is targeted, the binarizing unit 441 truncates a low-luminance portion as expressed by the following expression (6).
Threshold to Zero $$dst(i, j) = \begin{cases} src(i, j) & \text{if } src(i, j) > \text{threshold} \\ 0 & \text{otherwise} \end{cases} \quad (6)$$

Next, the binarizing unit 441 performs binarization with the use of the average luminance value for each block. Furthermore, the binarizing unit 441 so sets a negative value to Const. and adjusts the value that the variable pattern does not shrink to the extent that the geometric shape changes. That is, the binarizing unit 441 performs binarization as in the following expression (7).
Threshold Binary $$dst(i, j) = \begin{cases} 255 & \text{if } src(i, j) > T_{AVG} \\ 0 & \text{otherwise} \end{cases}, T_{AVG} = \frac{\sum_{j=0}^{N-1}\sum_{i=0}^{M-1} src(i, j)}{MN} + Const. \quad (7)$$

The binarizing unit 441 supplies the binarized captured image to the contour detecting unit 442.

<Contour Detection>

The contour detecting unit 442 performs contour detection with the use of the binarized captured image, and obtains a rectangular circumscribing the variable pattern. For example, as illustrated in FIG. 34, the contour detecting unit 442 performs contour detection with the use of a chain code on the premise of raster scanning.

Figure 34:
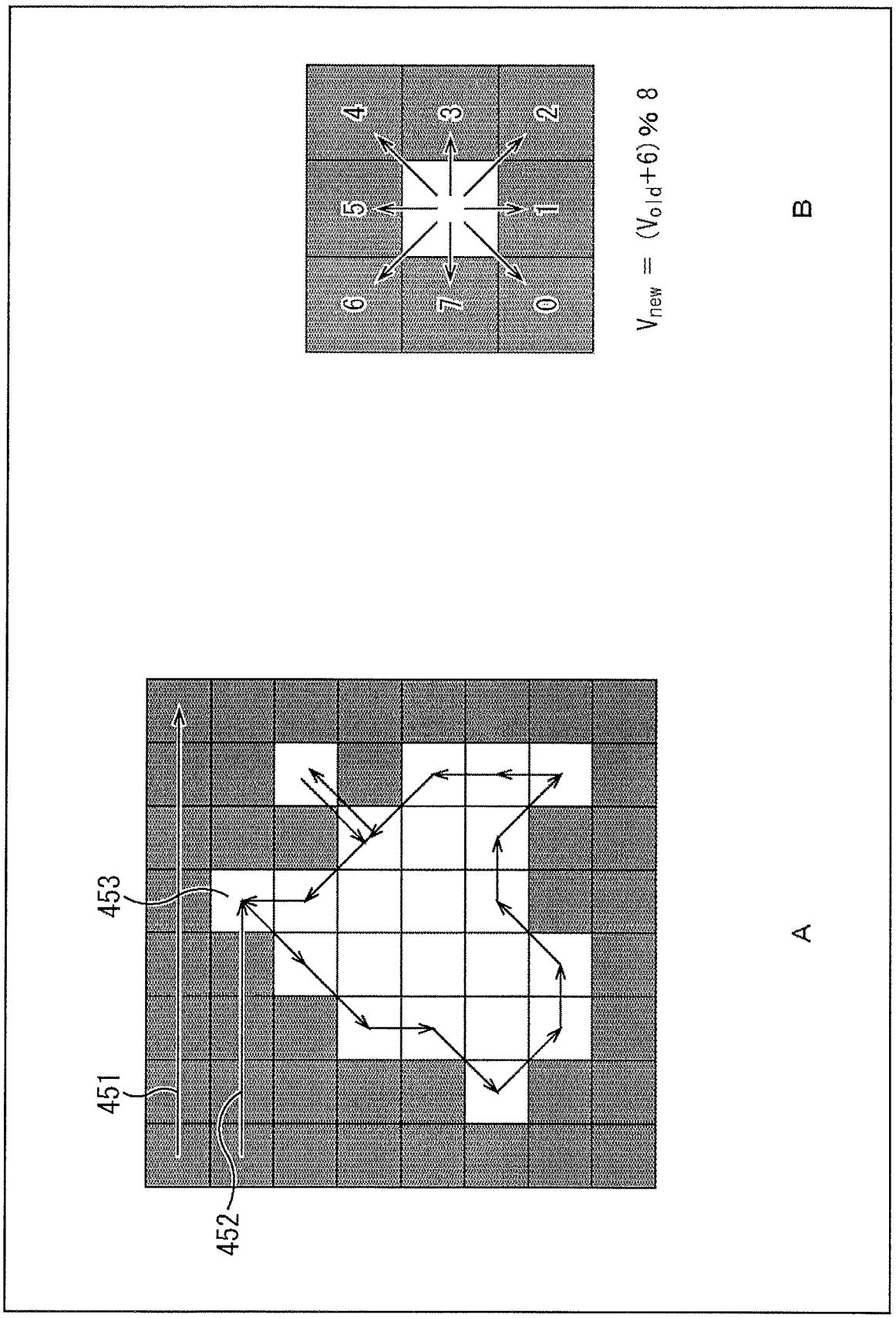
FIG. 34 is a diagram illustrating an example of a state of contour detection.

For example, the contour detecting unit 442 performs raster scanning as indicated by an arrow 451 and an arrow 452, as illustrated in A of FIG. 34. The contour detecting unit 442 thereby detects the pixel with the largest luminance value (255 or not zero), and use the detected pixel as a start point 453 for contour tracking.

Further, the contour detecting unit 442 tracks the contour from the start point 453. For example, the contour detecting unit 442 assigns number to each direction as illustrated in B of FIG. 34. The contour detecting unit 442 sets a direction of the previous contour as $V_{old}$, sets a value of a direction in which the searching for the contour is started as $V_{new}$, and obtains the direction $V_{new}$ in which the searching for the contour is started as expressed by the following expression (8).

$$V_{new} = (V_{old}+6)\%8 \quad (8)$$

The contour detecting unit 442 starts searching for the contour from the direction $V_{new}$ obtained in this manner. In this manner, the contour detecting unit 442 can efficiently track the contour.

When detecting the contour as described above, the contour detecting unit 442 supplies the variable identification feature amount calculating unit 443 with information indicating a result of the detection.

<Calculation of Variable Identification Feature Amount>

The variable identification feature amount calculating unit 443 calculates a variable identification feature amount, which is a feature amount directed to identifying of the variable pattern 312.

For example, it is assumed that four types of variable patterns 312 illustrated in FIG. 35 are arranged in the pattern image 301. That is, as illustrated in FIG. 35, it is assumed that the variable pattern 312 includes four types of variable patterns: a circle (Circle) having a circular contour and a non-colored center of gravity; a disc (Disc) having a circular contour and a colored center of gravity; a rectangle vertical (Recangle Vertical) that is a rectangular having a major axis in the vertical direction; and a rectangle horizontal (Recangle Horizontal) that is a rectangular having a major axis in the horizontal direction.

In this case, the variable identification feature amount calculating unit 443 obtains the center of gravity Centroid for the variable pattern 312 whose contour has been detected by the contour detecting unit 442, as expressed by the following expressions (9) to (11).

$$x_{AVG} = \frac{\sum_{y=0}^{Y-1}\sum_{x=0}^{X-1} x}{XY} \quad (9)$$

$$y_{AVG} = \frac{\sum_{y=0}^{Y-1}\sum_{x=0}^{X-1} y}{XY} \quad (10)$$

$$Centroid = (x_{AVG}, y_{AVG}) \quad (11)$$

Further, the variable identification feature amount calculating unit 443 calculates each variable as expressed by the following expressions (12) to (16).

$$M_{2,0} = \sum_{y=0}^{Y-1}\sum_{x=0}^{X-1}(x - x_{AVG})^2 \quad (12)$$

-continued $$M_{0,2} = \sum_{y=0}^{Y-1}\sum_{x=0}^{X-1}(y-y_{AVG})^2 \quad (13)$$

$$M_{1,1} = \sum_{y=0}^{Y-1}\sum_{x=0}^{X-1}(x-x_{AVG})(y-y_{AVG}) \quad (14)$$

$$MajorAxis = \sqrt{2}\sqrt{M_{2,0} + M_{0,2} + \sqrt{(M_{2,0}-M_{0,1})^2 + 4M_{1,1}^2}} \quad (15)$$

$$MinorAxis = \sqrt{2}\sqrt{M_{2,0} + M_{0,2} - \sqrt{(M_{2,0}-M_{0,1})^2 + 4M_{1,1}^2}} \quad (16)$$

Further, the variable identification feature amount calculating unit 443 uses these variables to calculate each feature amount as expressed by the following expressions (17) to (20).

$$InertiaRatio = \frac{MinorAxis}{MajorAxis} \quad (17)$$

$$MajorAxisRad = \frac{1}{2}\tan^{-1}\left(\frac{2M_{1,1}}{M_{2,0}-M_{0,2}}\right) \quad (18)$$

$$CandPixCondition: \; I(x,y) < I(x_{AVG}, y_{AVG}) \quad (19)$$

$$LowLumiRatio = \frac{CandPixNum}{XY} \quad (20)$$

The variable identification feature amount calculating unit 443 supplies the variable identifying unit 444 with each variable identification feature amount calculated as described above. In addition, the position of the center of gravity of the variable is calculated along with the feature amount, and each variable pattern is also used as a candidate for the corresponding point information.

<Variable Identification>

The variable identifying unit 444 identifies each variable pattern on the basis of the variable identification feature amount calculated as described above.

First, identification of the Disc will be described. Of the variable patterns 312 illustrated in FIG. 35, only the center of gravity of the Disc is non-colored (the luminance value is low). Therefore, the variable identifying unit 444 uses a luminance distribution to identify the Disc. More specifically, the variable identifying unit 444 identifies that the variable pattern 312 is the Disc in a case where most of the pixels have the luminance value of the center of gravity of the variable pattern 312 that is lower than the luminance value in the surrounding region.

For example, a pixel having the luminance value lower than the average value is obtained by the above-described expression (19), and the ratio of such a pixel is calculated as a feature amount LowLumiRatio (Low Luminance Ratio) by the expression (20). The variable identifying unit 444 identifies the Disc on the basis of the value of this feature amount LowLumiRatio. More specifically, the variable identifying unit 444 identifies the variable pattern 312 as the Disc in a case where it is determined that the value of the feature amount LowLumiRatio is smaller than a predetermined threshold (Threshold).

Next, identification of the Circle and the Rectangle will be described. The primary difference between the Circle and the Rectangle is whether the geometry shape of the pattern is elongate. Therefore, the variable identifying unit 444 uses an image moment feature amount to perform identification with the use of a ratio between a minor-axis component and a major-axis component.

For example, a feature amount of the major-axis component is obtained by the expression (15), a feature amount of the minor-axis component is obtained by the expression (16), and a ratio between the major-axis component and the minor-axis component is calculated as a feature amount InertiaRatio by the expression (17). The variable identifying unit 444 identifies the Circle and the Rectangle on the basis of the value of the feature amount InertiaRatio. More specifically, in a case where it is determined that the value of the feature amount InertiaRatio is sufficiently smaller than a predetermined threshold (Threshold), the variable identifying unit 444 identifies the variable pattern 312 as the Rectangle. Further, in a case where it is determined that the value of the feature amount InertiaRatio is sufficiently greater than the predetermined threshold (Threshold), the variable identifying unit 444 identifies that the variable pattern 312 is the Circle.

Next, identification of the Rectangle Vertical and the Rectangle Horizontal will be described. The primary difference between the Vertical and the Horizontal of the Rectangle is an angle of the major or minor axis. Thus, the variable identifying unit 444 determines a slope of the major axis also from the imaging moment feature amount to perform identification.

For example, the slope of the major axis is calculated as a feature amount MajorAxisRad by the expression (18). The variable identifying unit 444 identifies the Rectangle Vertical and the Rectangle Horizontal on the basis of the value of this feature amount MajorAxisRad. More specifically, the variable identifying unit 444 identifies the variable pattern 312 as the Rectangle Horizontal in a case where the value of this feature amount MajorAxisRad is determined to be the horizontal direction (i.e., the major axis direction is the horizontal direction or close to the horizontal direction). The variable identifying unit 444 identifies the variable pattern 312 as the Rectangle Vertical in a case where the value of this feature amount MajorAxisRad is determined to be the vertical direction (i.e., the major axis direction is the vertical direction or close to the vertical direction).

It is to be noted that, in a case where it is determined from the value of the feature amount MajorAxisRad that the direction of the major axis is neither the vertical direction nor the horizontal direction although the variable pattern 312 has an elongate shape, the variable identifying unit 444 may determine the variable pattern 312 as non-identifiable on the assumption that a contour other than the variable pattern is erroneously detected.

Further, in some cases, the value of the feature amount InertiaRatio is approximately the same as the predetermined threshold (Threshold) and it may be determined that it is not clear whether the shape of the variable pattern 312 is round or elongate. For example, in a case where the major axis of the Rectangle collapses or the Circle extends, the feature amount InertiaRatio may not be a significant feature amount and may not be identifiable. In such cases, the variable identifying unit 444 may identify the variable pattern 312 as a grey variable without determining it as non-identifiable.

The variable identifying unit 444 supplies information indicating the result of identification of the variable pattern 312 obtained as described above to the decoding unit 239 as variable information.

<Decoding>

First, the decoding unit 239 searches for the variable pattern 312 existing around the feature point coordinates and converts it into a code string. As illustrated in FIG. 36, a code (code) is assigned to each type (each shape) of the variable pattern 312 in advance. As illustrated in A of FIG. 37, the decoding unit 239 arranges the codes corresponding to the respective variable patterns 312 in a predetermined order as illustrated by an arrow 472, for example, and converts the variable patterns 312 included in a predetermined range 471 around the feature point coordinates into a code string as illustrated in B of FIG. 37.

Figure 37:
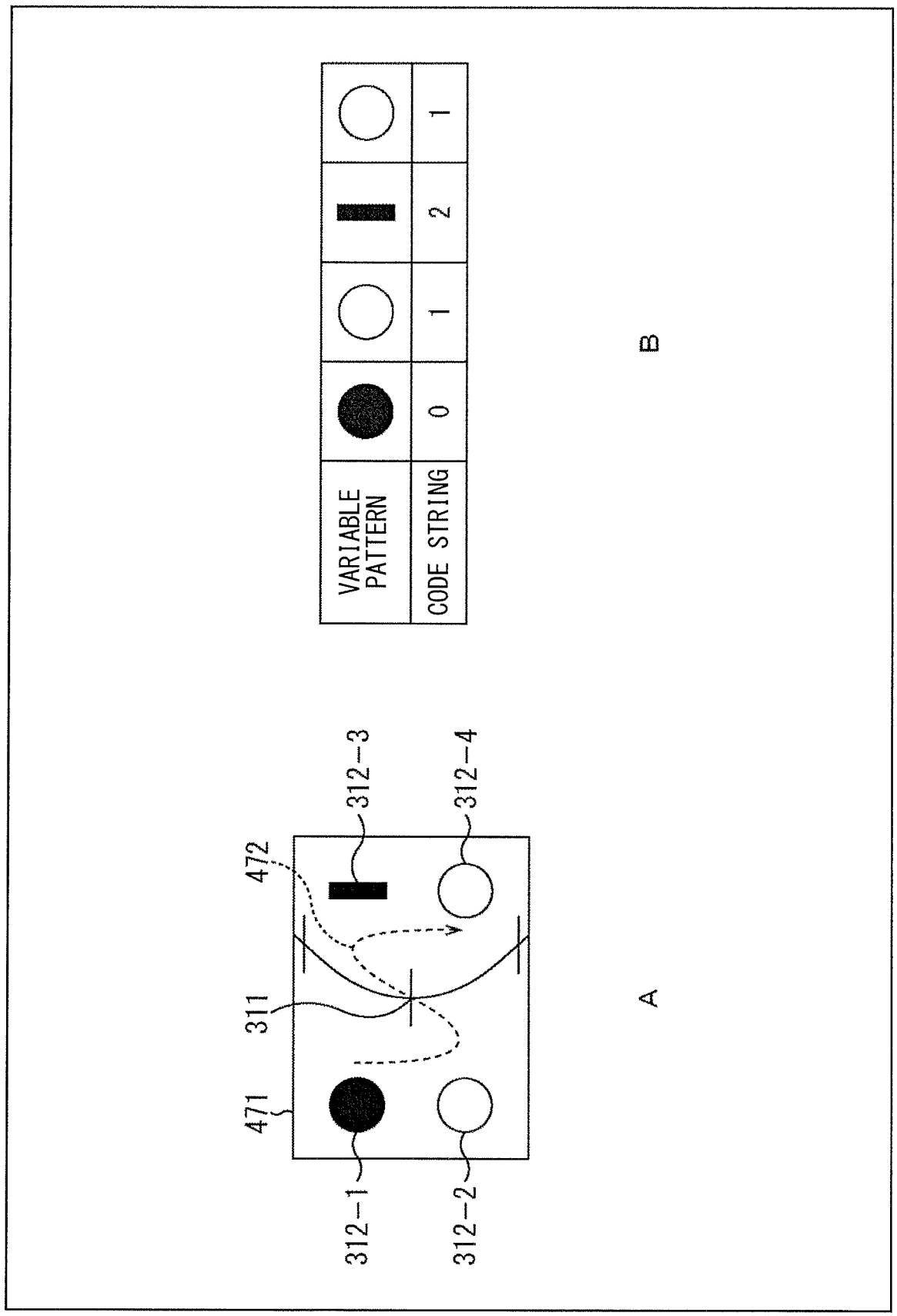
FIG. 37 is a diagram illustrating an example of a state of generation of a code string.

In the case of an example in B of FIG. 37, the variable patterns 312-1 to 312-4 to which the codes are assigned as in the example in FIG. 36 are arranged in the order of the arrow 472 as illustrated in A of FIG. 37. Therefore, the code string is "0121".

Next, the decoding unit 239 refers to the code string obtained in this manner to a database prepared in advance, and specifies the position of the feature point 311. Since the feature point 311 and the variable pattern 312 disposed in the pattern image 301 are already known, the code string corresponding to each feature point 311 is also already known. A list of code strings corresponding to the respective feature points 311 included in the pattern image 301 described above is stored in the pattern information storage unit 242 as pattern information.

Figure 38:
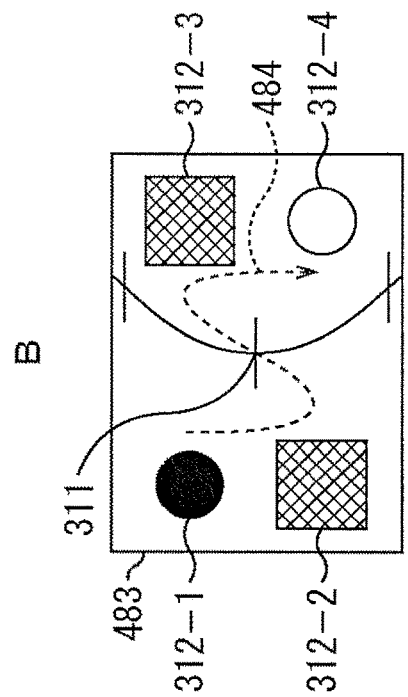
FIG. 38 is a diagram illustrating an example of partial decoding.

The list of the code strings may be summarized for each search range (search line) as illustrated in A of FIG. 38, for example. The decoding unit 239 compares the code string obtained from the captured image as described above with the code string list of the search range of the feature point 311 corresponding to the code string (for example, a table in A of FIG. 38).

In a case of the table in A of FIG. 38, the code string illustrated in B of FIG. 37 matches the code string enclosed by a rectangular frame 481. That is, the position of the feature point 311 corresponding to the code string obtained from the captured image is specified by the position of the code string in the table (or information (not illustrated) indicating the position of the feature point corresponding to the code string or the like).

That is, the decoding unit 239 arranges the codes corresponding to the respective variable patterns 312 that are detected by the variable pattern detecting unit 238, and are located within a predetermined range with reference to the feature point 311 detected by the feature point detecting unit 237, in a predetermined order to thereby converts them into an code string. The decoding unit 239 compares the code string (code string illustrated in B of FIG. 37) with the information (table in A of FIG. 38) related to the code string included in the pattern image 301, thereby specifying the position of the feature point 311 in the pattern image 301.

As described above, the decoding unit 239 can easily specify the position of the feature point only by comparing the code string with the data base.

<Partial Decoding>

It is to be noted that the feature point may have uniqueness even if all the codes of the code string are not provided. For example, a table illustrated in B of FIG. 38 describes an example of uniqueness in a case where a portion of the code string "0121" is unknown.

That is, in this table, the values in the columns Code0 to Code3 indicate the codes of the known values, and "–" indicates a code of unknown value. Further, the value of the "partial uniqueness" column indicates whether or not there is uniqueness. The value "1" indicates uniqueness, and the value "0" indicates non-uniqueness. It is to be noted that "–" in this column indicates a case where all of the codes are known and the uniqueness is not judged.

The uniqueness indicates that the position of the feature point 311 can be specified by the code string of the row, i.e., a code string in which a value of a portion of codes is unknown. For example, the code string of the row surrounded by a rectangular frame 482 is "0-1" and only the codes of the Code0 and the Code3 are known, but the position of the feature point 311 can be specified (the partial uniqueness is "1"). That is, this indicates that, in this search range, there is only one code string whose Code0 is "0" and whose Code3 is "1".

For example, it is known from the table in FIG. 36 that the code of the variable pattern 312-1 is "0" and that of the variable pattern 312-4 is "1" in the variable patterns 312-1 to 312-4 included in a predetermined range 483 with reference to the predetermined feature point 311 illustrated in C of FIG. 38. However, the codes of the variable pattern 312-2 and the variable pattern 312-3 are unknown.

Even in such a case, according to the table in B of FIG. 38, since the code string "0-1" has the partial uniqueness of "1", the position of the feature point 311 can be specified.

Therefore, the decoding unit 239 may not force itself to perform identification on the variable pattern which can be erroneously identified such as that determined as a gray variable by the variable identifying unit 444. The decoding unit 239 may save such a variable pattern by performing partial decoding as described above. By doing so, the feature point 311 can be specified more easily, and the corresponding point detection can be performed with higher accuracy.

In addition, to increase a probability that such a situation will occur, for example, the feature point 311 and the variable pattern 312 may be so arranged that the Hamming distance, which is the identification characteristic of the code string, is as large as possible when the pattern generating unit 231 generates the pattern image 301.

By executing each process as described above, the control apparatus 101 can perform the corresponding point detection at a higher speed and with higher accuracy.

<Flow of Corresponding Point Detection Process>

Next, a flow of a process executed by the projection imaging system 100 described above will be described. Referring to a flowchart in FIG. 39, an example of a flow of the corresponding point detection process executed by the control apparatus 101 will be described.

When the corresponding point detection process is started, the pattern generating unit 231 generates the pattern image 301 in step S101.

In step S102, the pattern converting unit 232 performs prior correction (inverse-Rectify) on the pattern image 301 generated in step S101 on the basis of the prior calibration information.

In step S103, the projection control unit 233 controls the projecting unit 111 to project the pattern image 301 subjected to the prior correction in step S102 as an image of invisible light.

In step S104, the imaging control unit 234 controls the imaging unit 112 to capture an image of the projected image of the pattern image projected in step S103.

In step S105, the ROI extracting unit 235 extracts the region of interest including the projected image of the pattern image 301 from the captured image obtained in step S104.

In step S106, the image converting unit 236 performs correction (Rectify) on the captured image of the region of interest extracted in step S105 on the basis of the prior calibration information.

In step S107, the feature point detecting unit 237 detects the feature point 311 from the captured image corrected in step S106.

In step S108, the variable pattern detecting unit 238 detects the variable pattern 312 from the captured image corrected in step S106.

In step S109, the decoding unit 239 converts the variable pattern 312 detected in step S108 into a code string, decodes the code string to specify the position of the feature point 311, and detects corresponding points of the projecting unit 111 and the imaging unit 112 on the basis of the feature point 311.

When the process in step S109 is completed, the corresponding point detection process is completed.

<Flow of Feature Point Detection Process>

Next, referring to a flowchart of FIG. 40, an example of a flow of the feature point detection process executed in step S107 of FIG. 39 will be described.

When the feature point detecting process is started, the template matching unit 401 of the feature point detecting unit 237 performs template matching of the feature point 311 in step S111.

In step S112, the feature point detecting unit 402 detects the feature point 311 on the basis of the result of the template matching performed in step S111.

In step S113, the feature point improving unit 403 refines the coordinates of the feature point 311 of the integer pixel accuracy detected in step S112 to the decimal point pixel accuracy.

Figure 39:
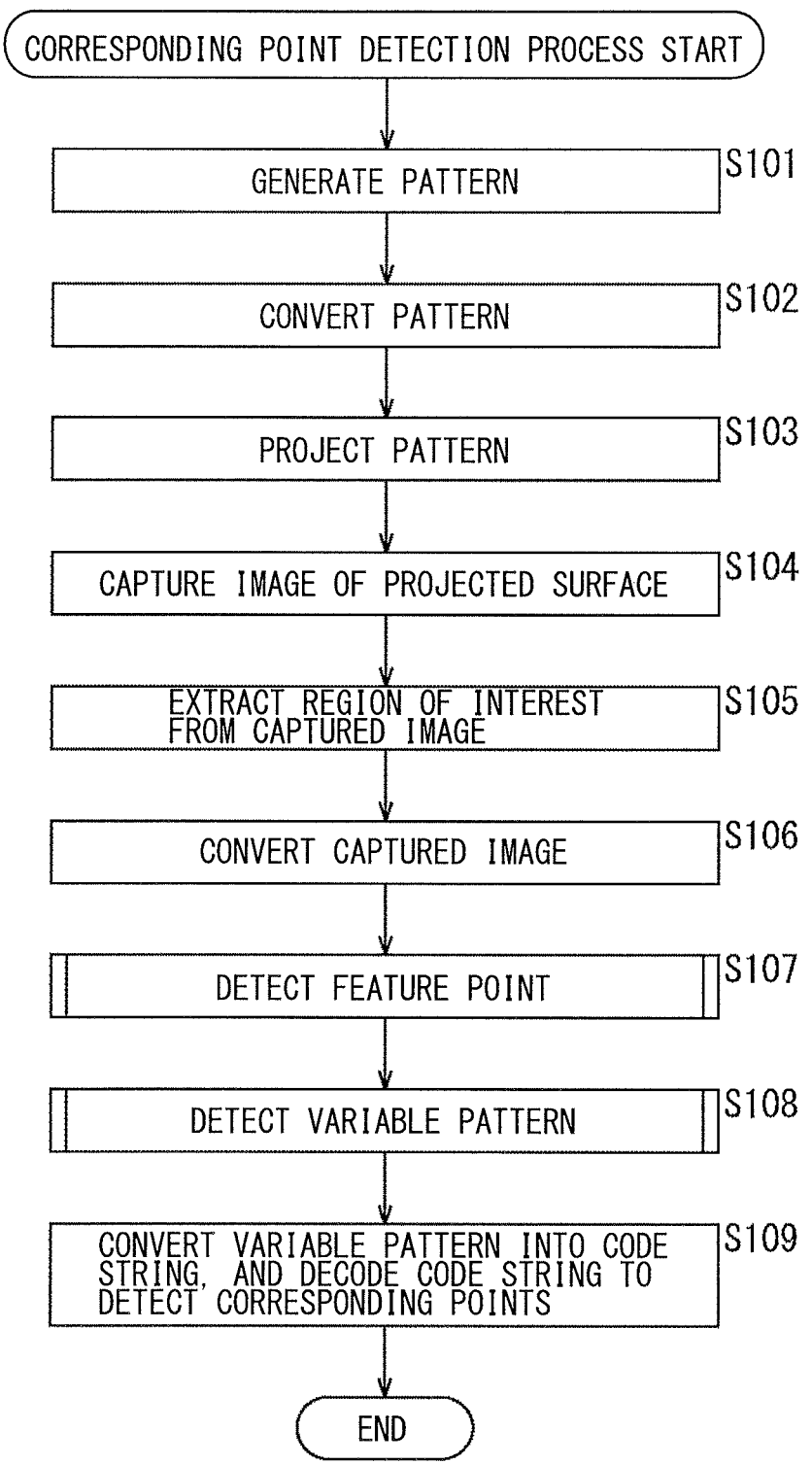
FIG. 39 is a flowchart describing an example of a flow of a corresponding point detection process.
Figure 40:
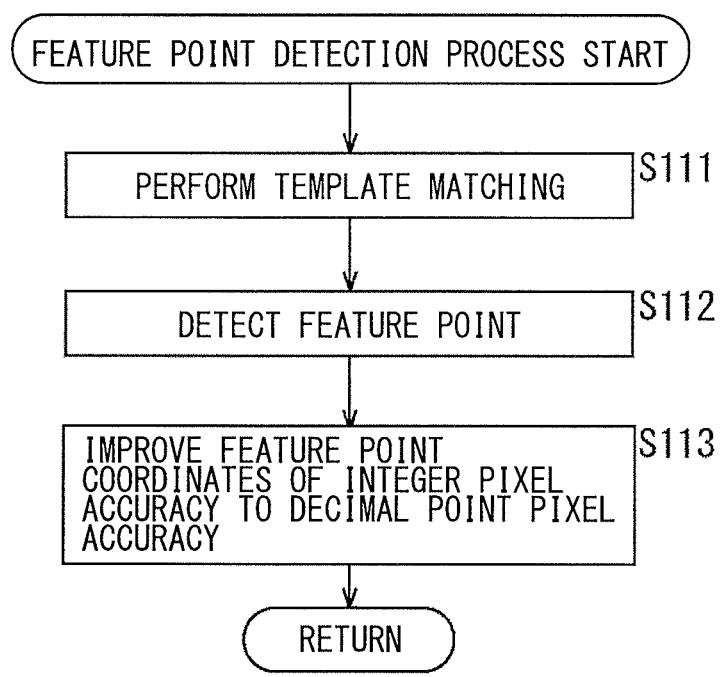
FIG. 40 is a flowchart describing an example of a flow of a feature point detection process.

When the process of step S113 is completed, the process returns to FIG. 39.

<Flow of Variable Pattern Detection Process>

Figure 41:
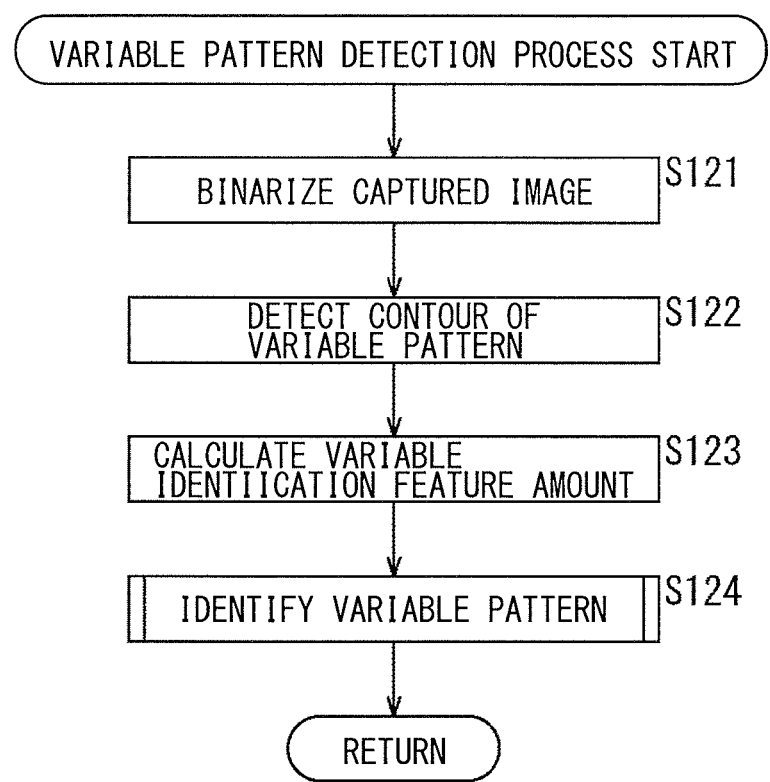
FIG. 41 is a flowchart describing an example of a flow of a variable pattern detection process.

Next, referring to a flowchart of FIG. 41, an example of a flow of the variable pattern detection process executed in step S108 of FIG. 39 will be described.

When the variable pattern detection process is started, the binarizing unit 441 binarizes the corrected captured image in step S121.

In step S122, the contour detecting unit 442 detects the contour of the variable pattern 312 in the captured image binarized in step S121.

In step S123, the variable identification feature amount calculating unit 443 calculates a variable identification feature amount directed to identifying of the variable pattern 312 for the variable pattern 312 whose contour has been detected in step S122.

In step S124, the variable identifying unit 444 identifies the variable pattern 312 on the basis of the variable identification feature amount calculated in step S123.

When the process of step S124 is completed, the process returns to FIG. 39.

<Flow of Variable Pattern Identification Process>

Next, referring to a flowchart of FIG. 42, an example of a flow of the variable pattern identification process executed in step S124 of FIG. 41 will be described.

When the variable pattern identification process is started, the variable identifying unit 444 determines whether or not the luminance of the center of gravity of the variable pattern 312 is low in step S131. For example, the variable identifying unit 444 determines whether or not the value of the feature amount LowLumiRatio is smaller than a predetermined threshold. In a case it is determined that the luminance of the center of gravity of the variable pattern 312 is low (the value of the feature amout LowLumiRatio is smaller than a predetermined threshold), the process proceeds to step S132.

In step S132, the variable identifying unit 444 determines that the variable pattern 312 is the Disc. When the process of step S132 is completed, the process returns to FIG. 41.

Figure 42:
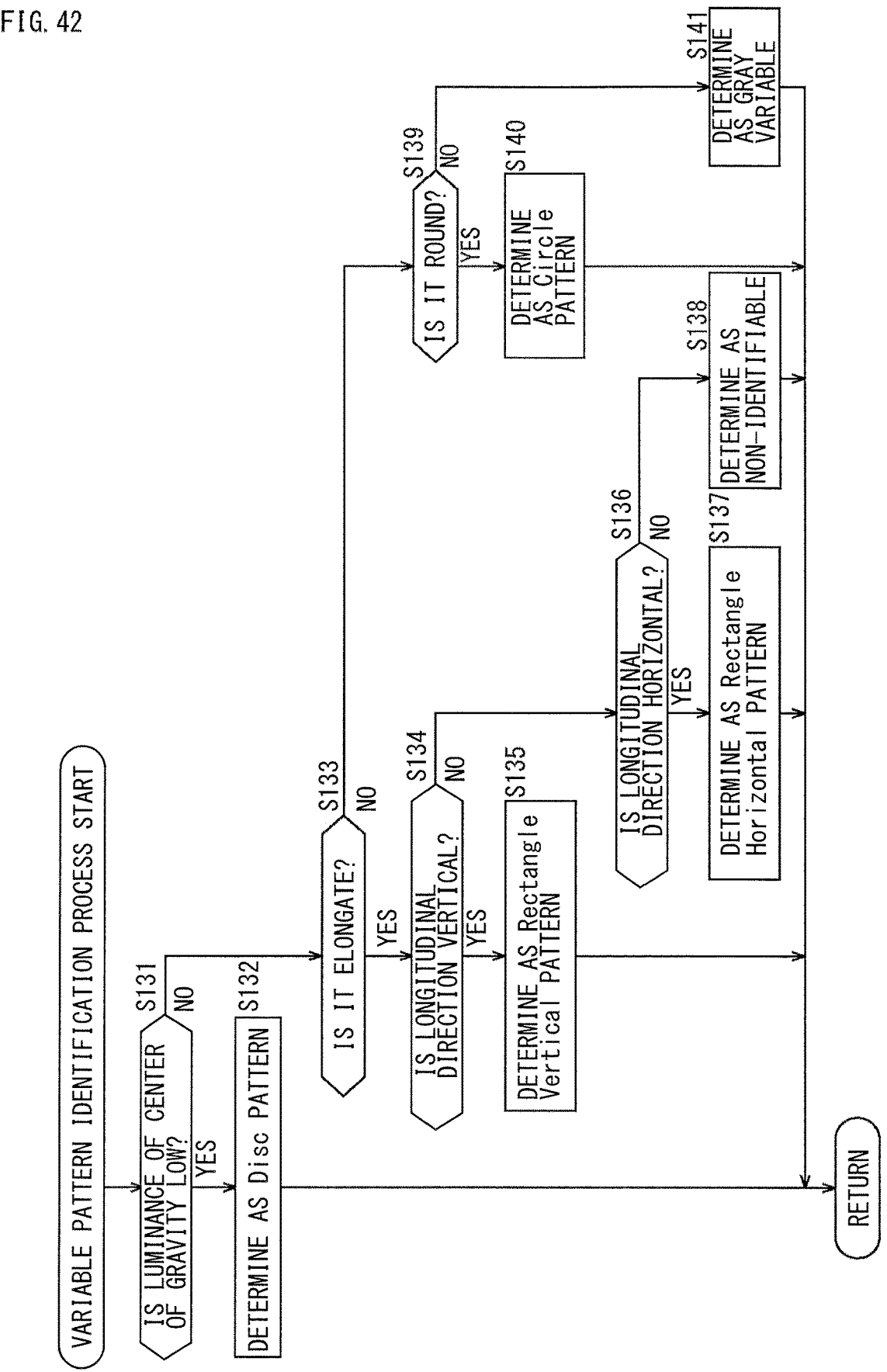
FIG. 42 is a flowchart describing an example of a flow of a variable pattern identification process.
Figure 43:
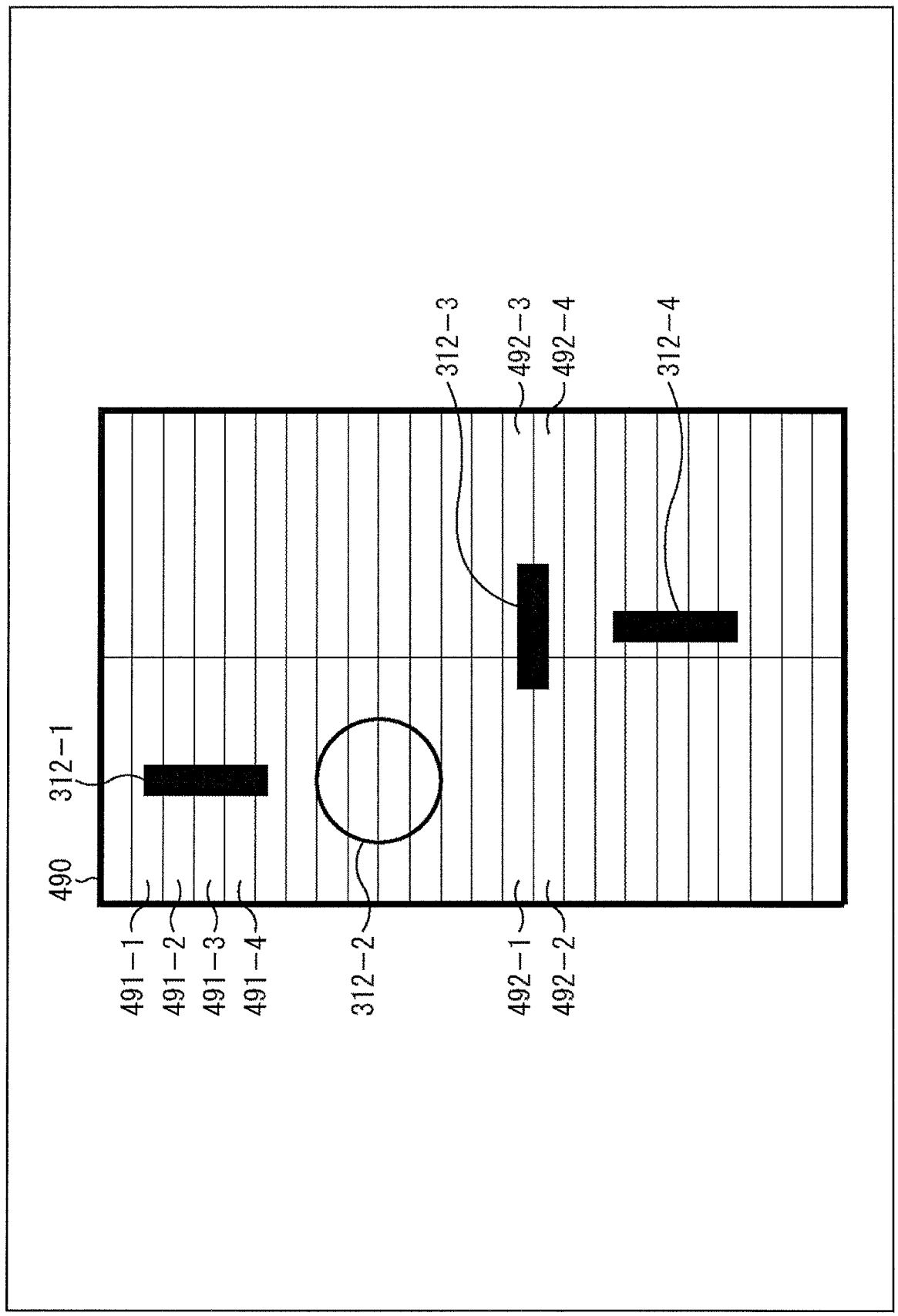
FIG. 43 is a diagram illustrating an example of a state of contour detection.

Further, in a case where it is determined in step S131 of FIG. 42 that the luminance of the center of gravity of the variable pattern 312 is not low (the value of the feature amount LowLumiRatio is not smaller than the predetermined threshold), the process proceeds to step S133.

In step S133, the variable identifying unit 444 determines whether or not the variable pattern 312 is elongate. For example, the variable identifying unit 444 determines whether or not the feature amount InertiaRatio is smaller than a predetermined threshold. In a case where the variable pattern 312 is determined to be elongate (feature amount InertiaRatio is smaller than a predetermined threshold), the process proceeds to step S134.

In step S134, the variable identifying unit 444 determines whether or not the longitudinal direction (the major-axis direction) of the elongate variable pattern 312 is vertical. For example, the variable identifying unit 444 determines whether or not the longitudinal direction is vertical on the basis of the value of the feature amount MajorAxisRad. In a case where it is determined that the longitudinal direction of the variable pattern 312 is vertical (the value of the feature amount MajorAxisRad indicates the vertical direction), the process proceeds to step S135.

In step S135, the variable identifying unit 444 determines that the variable pattern 312 is the Rectangle Vertical. When the process in step S135 is completed, the process returns to FIG. 41.

Further, in a case where it is determined in step S134 of FIG. 42 that the longitudinal direction of the variable pattern 312 is not vertical (the value of the feature amount MajorAxisRad does not indicate the vertical direction), the process proceeds to step S136.

In step S136, the variable identifying unit 444 determines whether or not the longitudinal direction (the major-axis direction) of the elongate variable pattern 312 is horizontal. For example, the variable identifying unit 444 determines whether or not the longitudinal direction is horizontal on the basis of the value of the feature amount MajorAxisRad. In a case where it is determined that the longitudinal direction of the variable pattern 312 is horizontal (the value of the feature amount MajorAxisRad indicates the horizontal direction), the process proceeds to step S137.

In step S137, the variable identifying unit 444 determines that the variable pattern 312 is the Rectangle Horizontal. When the process in step S137 is completed, the process returns to FIG. 41.

Further, in a case where it is determined in step S136 of FIG. 42 that the longitudinal direction of the variable pattern 312 is not horizontal (the value of the feature amount MajorAxisRad does not indicate the horizontal direction), the process proceeds to step S138.

In this case, since the longitudinal direction of the variable pattern 312 is neither the vertical direction nor the horizontal direction, the variable identifying unit 444 determines in step S138 that the variable pattern 312 is non-identifiable. When the process in step S138 is completed, the process returns to FIG. 41.

Further, in a case where it is determined in step S133 of FIG. 42 that the variable pattern 312 is not elongate (the feature amount Inertia Ratio is not smaller than a predetermined threshold), the process proceeds to step S139.

In step S139, the variable identifying unit 444 determines whether or not the variable pattern 312 is round. For example, the variable identifying unit 444 determines whether or not the feature amount InertiaRatio is sufficiently greater than a predetermined threshold. In a case where it is determined that the variable pattern 312 is round (the feature amount InertiaRatio is sufficiently greater than the predetermined threshold), the process proceeds to step S140.

In step S140, the variable identifying unit 444 determines that the variable pattern 312 is the Circle. When the process in S140 is completed, the process returns to FIG. 41.

Further, in a case where it is determined in step S139 of FIG. 42 that the variable pattern 312 is not round (the feature amount InertiaRatio is not sufficiently greater than the predetermined threshold), the process proceeds to step S141.

In this case, since the shape of the variable pattern 312 is neither elongate nor round, the variable identifying unit 444 determines the variable pattern 312 as a grey variable in step S141. As described above, the code string including the grey variable is used for identification by partial decoding. When the process in step S141 is completed, the process returns to FIG. 41.

By executing each process as described above, the control apparatus 101 can perform the corresponding point detection at a higher speed and with higher accuracy.

<Parallel Processing of Contour Tracking>

Most of the above-described processes can be processed with high parallelism for a pixel, a block, a search line, the number of detections, etc. However, the contour detection performed by the contour detecting unit 442 may be a bottleneck in the processing rate because not only the parallelism is low in the search window parallelism but also the processing amount is not small.

Therefore, the start point searching of the contour tracking may be performed in parallel with fine blocks. For example, a region 490 in which the start point of the contour tracking is to be searched for as illustrated in FIG. 49 may be divided into a plurality of partial regions. The start point of the contour tracking may be searched for in each partial region, and the processes of each partial region may be executed in parallel.

By doing so, it is possible to perform contour detection at a higher speed.

It is to be noted that, in this case, for example, the start point of the variable pattern 312-1 is detected in the partial regions 491-1 to 491-4, etc. Since the contour detection is performed from the start point detected in each partial region, the contour detection is performed for the variable pattern 312-1 a plurality of times. That is, the detected contours are duplicated.

Further, for example, the start point of the variable pattern 312-3 is detected in the partial regions 492-1 to 492-4, etc. As the variable pattern 312-3, the start point of the contour and a column index of the center of gravity may differ in some cases when it is present in a plurality of columns of partial regions.

The duplication of the detected contours and the difference between the start point of the contour and the column index of the center of gravity are made consistent with a sub-sample in the subsequent process. Therefore, it is possible to achieve contour tracking with high parallelism.

3. Second Embodiment

<Other Configuration Examples of Projection Imaging System and Projection Imaging Apparatus>

Figure 44:
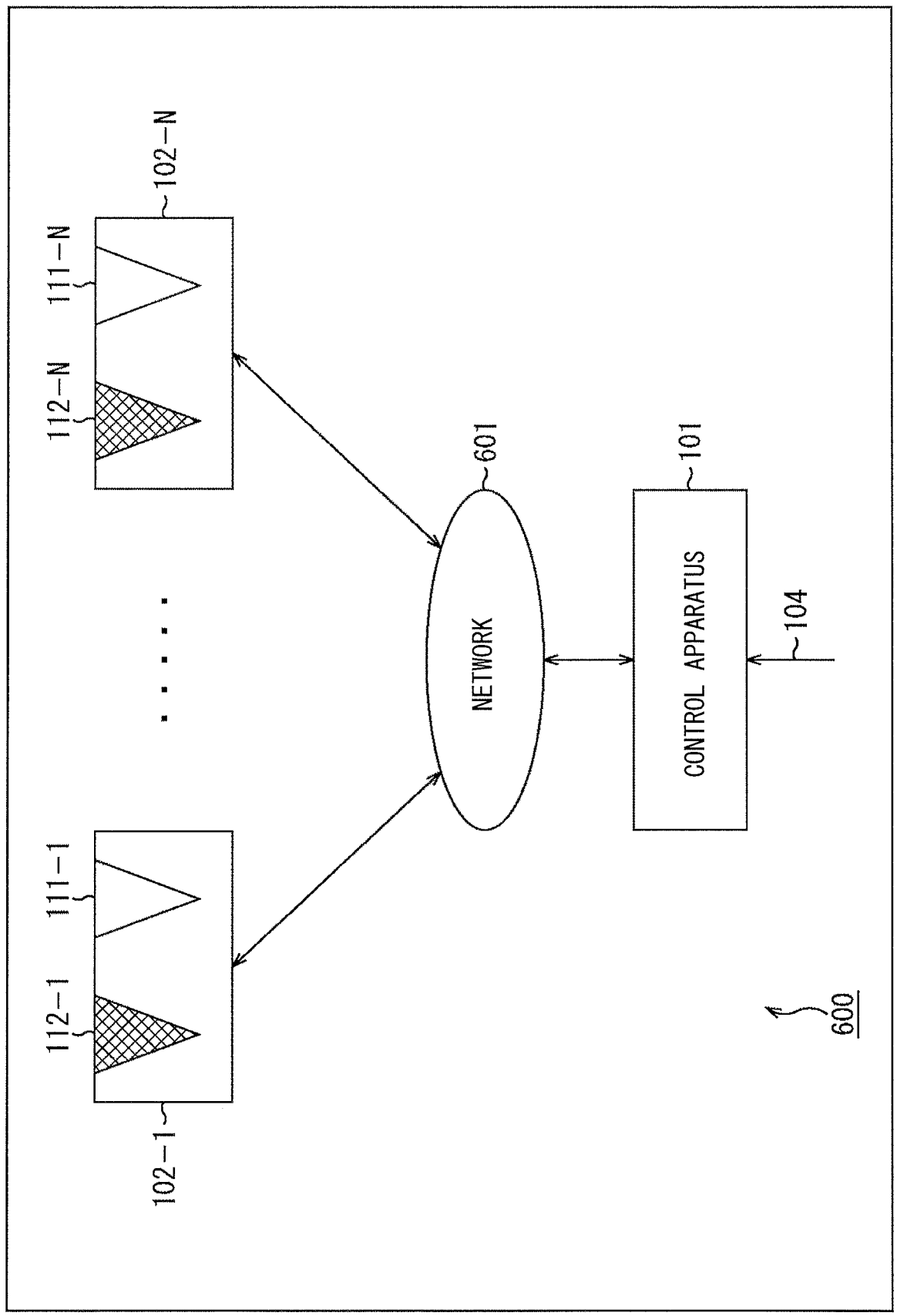
FIG. 44 is a block diagram illustrating another configuration example of the projection imaging system.

It is to be noted that the configuration example of the projection imaging system to which the present technology is applied is not limited to the example described above. For example, as a projection imaging system 600 illustrated in FIG. 44, the control apparatus 101 and each projection imaging apparatus 102 may be coupled to each other via a network 601.

The network 601 may be any communication network. A communication method employed in the network 601 may be any method. For example, it may be wired communication, wireless communication, or both. Further, the network 601 may include a single communication network or a plurality of communication networks. For example, the network 601 may include a communication network or communication path of any communication standard, such as the Internet, a public telephone network, a wide area communication network for a wireless mobile body such as a so-called 3G line or a 4G line, a wireless communication network that performs communication conforming to WAN (Wide Area Network), LAN (Local Area Network), or Bluetooth (registered trademark) standard, a communication path of short-range wireless communication such as NFC (Near Field Communication), a communication path of infrared communication, a communication network of wired communication conforming to a standard such as HDMI (registered trademark) (High-Definition Multimedia Interface) or USB (Universal Serial Bus), or the like.

The control apparatus 101 and each projection imaging apparatus 102 (each of the projection imaging apparatuses 102-1 to 102-N (N is any natural number)) are communicatively coupled to the network 601. It is to be noted that this coupling may be wired (i.e., coupling via wired communication), wireless (i.e., coupling via wireless communication), or both. It is to be noted that the number of each apparatus, the shape and size of the housing, the arrangement position, and the like may be freely set.

The control apparatus 101 and each projection imaging apparatus 102 can communicate with each other via the network 601 (exchange of information, etc.) In other words, the control apparatus 101 and each projection imaging apparatus 102 may be communicably coupled to each other via another facility (such as an apparatus or a transmission path).

Also in a case of the projection imaging system 600 having such a configuration, the present technology can be applied in a similar manner to that in the case of the projection imaging system 100 described in the first embodiment, and the above-described workings and effects can be obtained.

Figure 45:
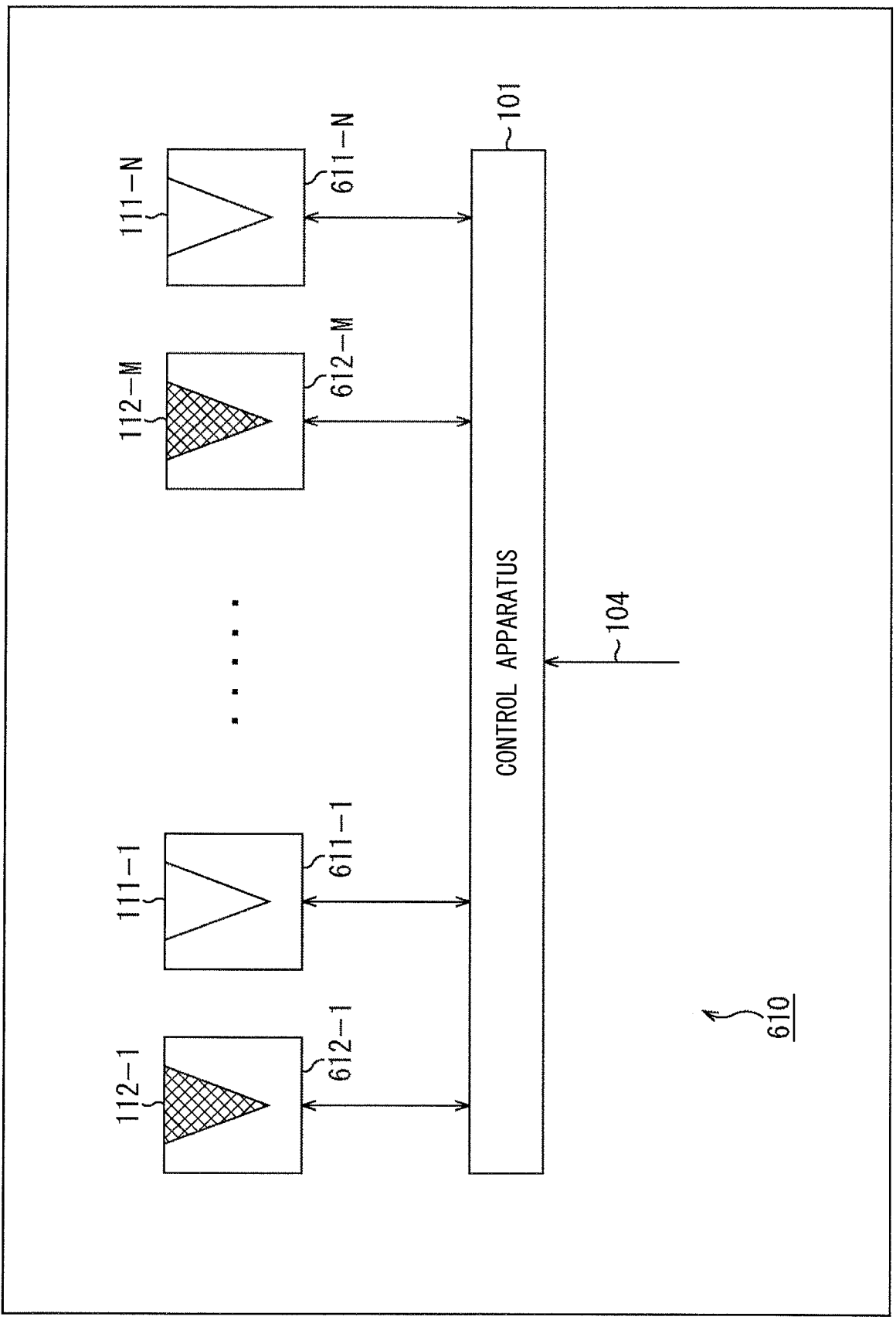
FIG. 45 is a block diagram illustrating another configuration example of the projection imaging system.

Further, for example, as in a projection imaging system 610 illustrated in FIG. 45, the projecting unit 111 and the imaging unit 112 may be configured as devices differing from each other. The projection imaging system 610 has projection apparatuses 611-1 to 611-N (N is any natural number) and imaging apparatuses 612-1 to 612-M (M is any natural number) instead of the projection imaging apparatus 102. The projection apparatuses 611-1 to 611-N include the respective projecting unit 111 (projecting units 111-1 to 111-N), and perform projection of an image. The imaging apparatuses 612-1 to 612-M have the respective imaging units 112 (the imaging units 112-1 to 112-M), and perform imaging of a projection surface (projected image projected by the projecting unit 111).

In a case where the projection apparatuses 611-1 to 611-N need not be described being distinguished from each other, they are referred to as a projection apparatus 611. In a case where the imaging apparatuses 612-1 to 612-M do not need to be described being distinguished from each other, they are referred to as an imaging apparatus 612.

Each projection apparatus 611 and each imaging apparatus 612 are communicably coupled to the control apparatus 101, and can communicate (exchange information) with the control apparatus 101 by wired communication, wireless communication, or both. It is to be noted that each projection apparatus 611 and each imaging apparatus 612 may communicate with another projection apparatus 611, another imaging apparatus 612, or both via the control apparatus 101.

In addition, the number of each apparatus (the projection apparatus 611, the imaging apparatus 612, and the control apparatus 101), the shape and size of the housing, the arrangement position, and the like may be freely set. Further, as in the case of the example in FIG. 44, the respective apparatuses (the projection apparatus 611, the imaging apparatus 612, and the control apparatus 101) may be so coupled to each other as to be able to communicate with each other via another facility (apparatus or transmission path) such as the network 601.

Also in the case of the projection imaging system 610 having such a configuration, the present technology can be applied in a similar manner to that in the case of the projection imaging system 100 described in the first embodiment, and the above-described workings and effects can be obtained.

Figure 46:
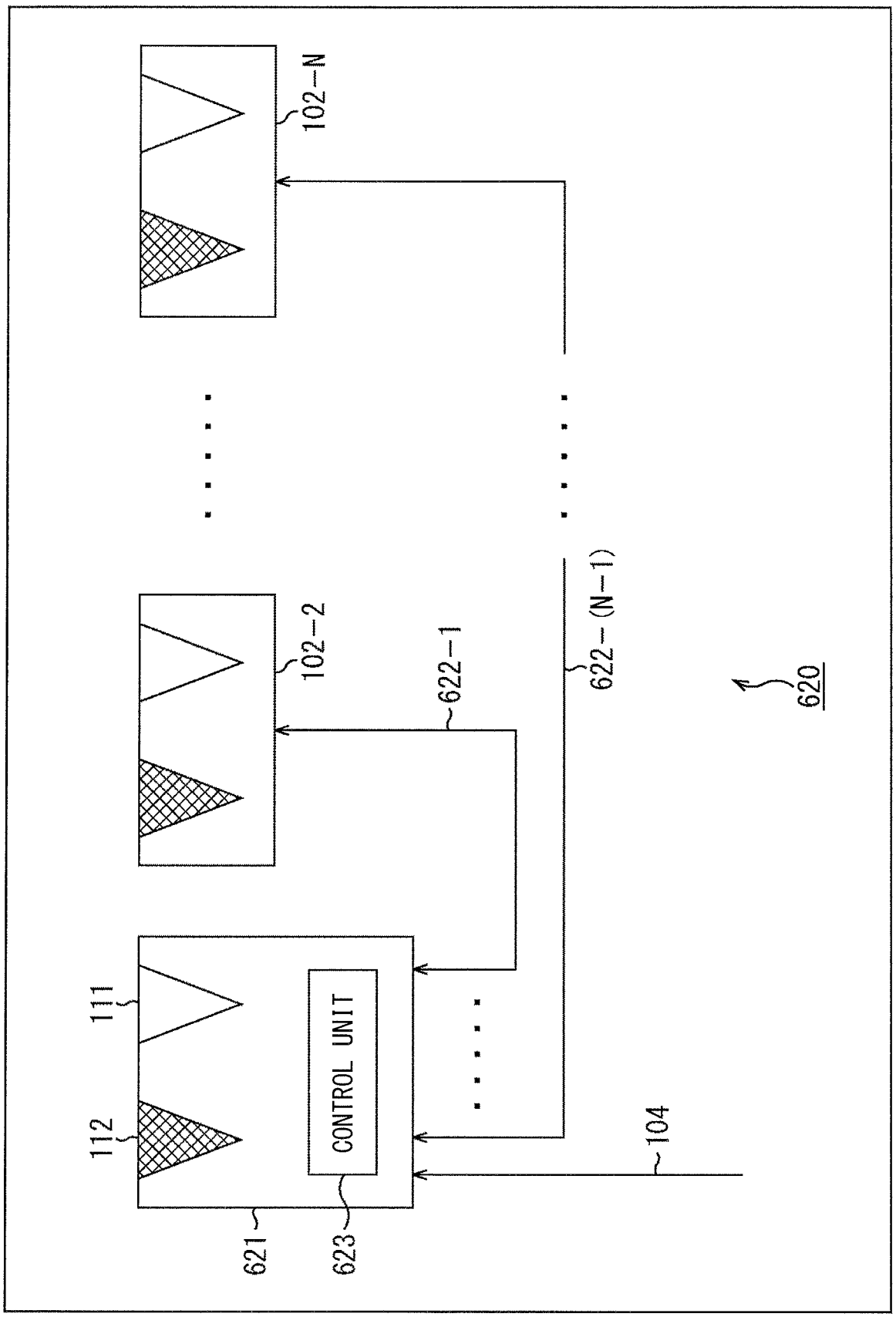
FIG. 46 is a block diagram illustrating another configuration example of the projection imaging system.

Further, the control apparatus 101 may be omitted, for example, as in the projection imaging system 620 illustrated in FIG. 46. As illustrated in FIG. 46, the projection imaging system 620 has a projection imaging apparatus 621 and projection imaging apparatuses 102-2 to 102-N (N is any natural number). The projection imaging apparatus 621 is so coupled to the respective projection imaging apparatuses 102 via communication cables 622-1 to 622-(N−1) as to be able to communicate with each other. In a case where the communication cables 622-1 to 622-(N−1) need not be described being distinguished from each other, they are referred to as a communication cable 622. It is to be noted that the communication cable 622 may be omitted, and the projection imaging apparatus 621 may communicate with each projection imaging apparatus 102 by wireless communication.

The projection imaging apparatus 621 includes the projecting unit 111 and the imaging unit 112 as with the projection imaging apparatus 102, and further includes a control unit 623. The control unit 623 has a similar function to that of the control apparatus 101, and can perform a similar process. That is, in a case of this projection imaging system 620, the process performed by the control apparatus 101 described above is executed by (the control unit 623 of) the projection imaging apparatus 621.

Also in the case of the projection imaging system 620 having such a configuration, the present technology can be applied in a manner similar to that in the case of the projection imaging system 100 described in the first embodiment, and the above-described workings and effects can be obtained.

It is to be noted that the projection imaging system 620 may include a plurality of projection imaging apparatuses 621. In this case, any one of (the control units 623 of) the projection imaging apparatuses 621 may execute all of the processes performed in the control apparatus 101, or a plurality of (control units 623 of) projection imaging apparatuses 621 may execute the processes in cooperation with each other by exchanging information or the like.

Figure 47:
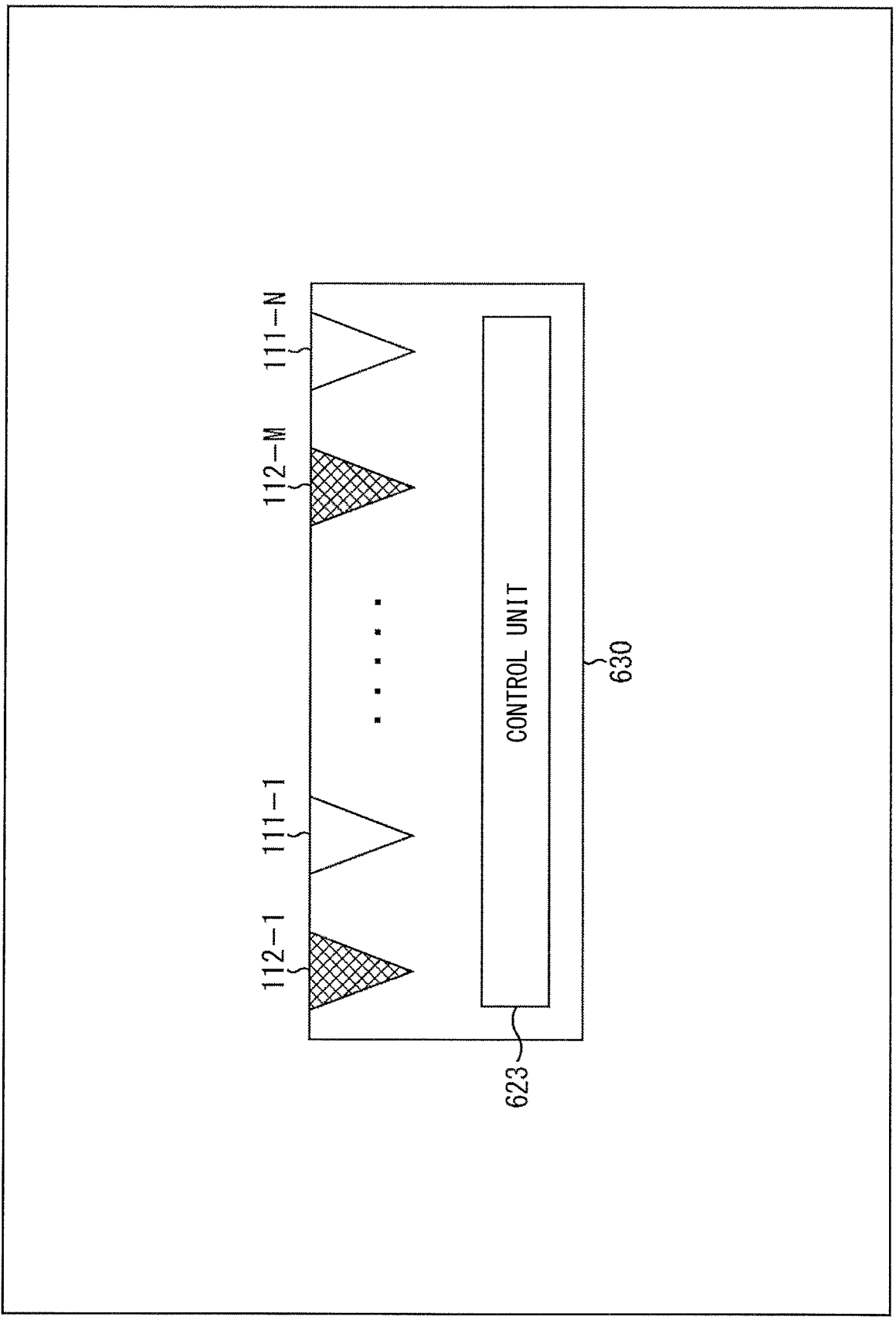
FIG. 47 is a block diagram illustrating a main configuration example of a projection imaging apparatus.

Further, as illustrated in FIG. 47, for example, the projection imaging system 100 described in the first embodiment may be configured as a single apparatus. A projection imaging apparatus 630 illustrated in FIG. 47 includes the projecting units 111 (projecting units 111-1 to 111-N (N is any natural number), the imaging units 112 (imaging units 112-1 to 112-M (M is any natural number), and the control unit 623.

In the projection imaging apparatus 630, the control unit 623 controls each of the projecting units 111 and each of the imaging units 112 to perform the corresponding point detection or the like by executing the process performed in the control apparatus 101 described above.

Therefore, also in the case of the projection imaging apparatus 630 having such a configuration, the present technology can be applied in a manner similar to that in the case of the projection imaging system 100 described in the first embodiment, and the above-described workings and effects can be obtained.

4. Others

<Field of Application of Present Technology>

The present technology can be applied to, for example, a system, an apparatus, a processing unit, or the like used in any field such as transportation, medical care, crime prevention, agriculture, livestock industry, mining, beauty, factory, household appliances, weather, natural surveillance, or the like as long as it processes an image.

For example, the present technology can be applied to a system or a device used for viewing. Further, for example, the present technology can also be applied to a system or a device used for traffic management. Further, for example, the present technology can be applied to a system or a device used for security. Further, for example, the present technology can be applied to a system or a device used for sports. Further, for example, the present technology can be applied to a system or a device used for agriculture. Further, for example, the present technology can also be applied to a system or a device used for livestock industry. Further, the present technology can be applied to a system or a device for monitoring a natural condition such as a volcano, a forest, or an ocean. Further, the present technology can be applied to a weather observation system or a weather observation apparatus which observes, for example, weather, temperature, humidity, wind speed, sunshine time, and the like. Further, the present technology can be applied to, for example, a system or a device for observing the ecology of wildlife such as birds, fish, reptiles, amphibians, mammals, insects, plants, or the like.

<Software>

The series of processes described above can be executed by hardware or software. Further, it is also possible to cause some processes to be executed by hardware and other processes to be executed by software. In a case where the series of processes described above is executed by software, a program, data, and the like included in the software are installed from a network, a recording medium, or the like.

For example, in the case of the projection imaging apparatus 102 of FIG. 14, the recording medium includes a removable medium 141 in which a program, data, and the like are recorded and which is distributed to distribute the program, data, and the like to the user, separately from the main body of the apparatus. In this case, for example, by mounting the removable medium 141 to the drive 135, the program, data, and the like stored in the removable medium 141 can be read and installed in the storage unit 133.

Further, for example, in the case of the control apparatus 101 in FIG. 20, the recording medium includes a removable medium 221 in which a program, data, and the like are recorded and which is distributed to distribute the program, data, and the like to the user, separately from the apparatus main body. In this case, for example, by mounting the removable medium 221 to the drive 215, the program, data, and the like stored in the removable medium 221 can be read and installed in the storage unit 213.

Further, the program, data, and the like can also be provided via a wired or wireless transmission medium such as a local area network, the Internet, or digital satellite broadcasting. For example, in the case of the projection imaging apparatus 102 of FIG. 14, the program, data, and the like can be received by the communication unit 134 and installed in the storage unit 133. Further, for example, in the case of the control apparatus 101 of FIG. 20, the program, data, and the like can be received by the communication unit 214 and installed in the storage unit 213.

In addition, the program, data, and the like can be installed in advance in a storage unit, a ROM, or the like. For example, in the case of the projection imaging apparatus 102 illustrated in FIG. 14, the program, data, and the like may be installed in advance in the storage unit 133, a ROM (not illustrated) in the control unit 121, or the like. Further, for example, in the case of the control apparatus 101 in FIG. 20, the program, data, and the like may be installed in advance in the storage unit 213, the ROM 202, and the like.

<Supplement>

An embodiment of the present technology is not limited to the embodiments described above, but various modifications may be made without departing from the scope of the present technology.

For example, the present technology may be implemented as any configuration configuring an apparatus or a system, for example, a processor as a system LSI (Large Scale Integration) or the like, a module using a plurality of processors or the like, a unit using a plurality of modules or the like, a set in which another function is added to the unit, or the like (i.e., a configuration of a portion of the apparatus).

It is to be noted that, in the present specification, a system refers to a set of a plurality of components (devices, modules (parts), and the like), and whether or not all of the components are in the same housing does not matter. Therefore, the system encompasses both a plurality of apparatuses accommodated in separate housings and coupled to each other via a network, and a single apparatus having a plurality of modules accommodated in a single housing.

Further, the processing unit described above may be implemented by any configuration as long as it has the function described for the processing unit. For example, the processing unit may include any circuit, LSI, system LSI, processor, module, unit, set, device, apparatus, system, or the like. In addition, a plurality of them may be combined. For example, the same type of configurations such as a plurality of circuits, a plurality of processors, and the like may be combined. For example, different types of configurations such as a circuit and an LSI or the like may be combined.

In addition, for example, the configuration described as one apparatus (or processing unit) may be divided and configured as a plurality of apparatuses (or processing units). Conversely, the configurations described above as a plurality of apparatuses (or processing units) may be collectively configured as one apparatus (or processing unit). Further, it is needless to say that a configuration other than that described above may be added to the configuration of each apparatus (or each processing unit). Further, if the configuration and operation of the entire system are substantially the same, a portion of the configuration of one apparatus (or processing unit) may be included in the configuration of another apparatus (or other processing unit).

In addition, for example, the present technology can adopt a configuration of cloud computing in which one function is shared by a plurality of apparatuses via a network and processing is performed in association.

Further, for example, the above-described program can be executed in any apparatus. In that case, the apparatus may have a necessary function (function block), so that necessary information can be obtained.

In addition, it is possible execute the respective steps described in the flowcharts described above with a single apparatus and it is also possible to distribute the steps to a plurality of apparatuses for execution. Further, in a case where a plurality of processes is included in one step, it is possible to execute the plurality of processes included in the one step with one apparatus and it is also possible to distribute the plurality of processes to a plurality of apparatuses for execution. In other words, a plurality of processes included in one step can be executed as processes of a plurality of steps. Conversely, the processes described as a plurality of steps may be collectively executed as one step.

The program executed by the computer may be executed so that the processes in the steps describing the program are executed in a time-sequential manner in accordance with the order described in the present specification, or may be executed in parallel or individually at required timings such as at a timing when a call is made. That is, as long as there is no inconsistency, the process of each step may be executed in an order different from the order described above. Further, the process in the step describing this program may be executed in parallel with a process of another program, or may be executed in combination with the process of another program.

The plurality of present technologies described in the present specification may each be implemented independently and singly, as long as they do not cause inconsistency. It goes without saying that any of the plurality of present technologies can be implemented in combination. For example, a portion or all of the technologies described in any embodiment may be implemented in combination with a portion or all of the present technologies described in another embodiment. Further, a portion or all of any of the above-described present technologies can be implemented in combination with another technology that is not described above.

It is to be noted that the present technology can also have the following configurations.

<Projecting Unit>

(1) An image processing apparatus including a projecting unit that outputs invisible light and visible light via the same optical system and thereby projects an image of the invisible light and an image of the visible light to cause a portion or all of the image of the invisible light and a portion or all of the image of the visible light to be projected in the same region on a projection surface.

(2) The image processing apparatus according to (1), in which the invisible light includes infrared light.

(3) The image processing apparatus according to (1) or (2), in which the projecting unit projects an image of visible light and an image of invisible light corresponding to inputted image data onto the projecting unit.

(4) The image processing apparatus according to (3), in which
the image data includes a format of image data of visible light, the image data of the visible light is stored in a portion of bits of the format, image data of invisible light is stored in another portion of the bits, and the projecting unit extracts each of the image data of the visible light and the image data of the invisible light included in the inputted image data, and projects the image of the visible light corresponding to the image data of the visible light and the image of the invisible light corresponding to the image data of the invisible light.

(5) The image processing apparatus according to (4), in which the format is RGB, image data of each color component of visible light is stored in an upper portion of data of each color component, and image data of invisible light is stored in a lower portion of data of each color component.

(6) The image processing apparatus according to (5), in which the projecting unit sequentially projects images of respective color components of visible light and an image of invisible light in a predetermined order.

(7) The image processing apparatus according to (6), in which the images of the respective color components of the visible light sequentially projected by the projecting unit are images of frames different from each other of a moving image, and the image of the invisible light is a pattern image including a predetermined feature point and a predetermined variable pattern, and is directed to detecting of corresponding points of a projected image projected by the projecting unit and a captured image captured by the imaging unit.

(8) The image processing apparatus according to (7), further including an imaging unit that receives invisible light and captures an image of a subject, in which the imaging unit causes an imaging timing to correspond to a projection timing of an image projected by the projecting unit, and captures an image of the projected image of the invisible light in a plurality of projected images sequentially projected by the projecting unit.

(9) The image processing apparatus according o any one of (1) to (8), in which the projecting unit projects an image of visible light and an image of invisible light with use of a liquid crystal device.

(10) An image processing method including outputting, by an image processing apparatus, invisible light and visible light via the same optical system and thereby projecting an image of the invisible light and an image of the visible light to cause the image of the invisible light and the image of the visible light to be superimposed on each other.

<Pattern Image>

(11) Data of a pattern image, the pattern image including a predetermined feature point and a predetermined variable pattern, the pattern image being directed to detecting of corresponding points of a projected image projected by a projecting unit and a captured image captured by an imaging unit, the pattern image including the feature point and the variable pattern that are arranged to allow for unique determination of a position of the feature point in the pattern image on the basis of a code string resulting from subjecting the variable pattern group around the feature point to conversion into variables and permutational expansion.

(12) The data according to (11), in which the feature point is an intersection of a wavy line and a line segment.

(13) The data according to (12), in which a plurality of types of the feature points that are classified on the basis of a shape of a portion of an intersection of the wavy line and the line segment are arranged in the pattern image.

(14) The data according to (13), in which a plurality of types of the variable patterns which are classified on the basis of a shape and to which codes different from each other are assigned to are arranged in the pattern image.

(15) The data according to (14), in which a plurality of the variable patterns is arranged around each of a plurality of the feature points in the pattern image to cause a code string having a predetermined length is obtainable by arranging the plurality of variable patterns in a predetermined order.

(16) The data according to (15), in which
the variable pattern includes four types of variable patterns that are
a circle (Circle) having a circular contour and non-colored center of gravity,
a disc (Disc) having a circular contour and colored center of gravity,
a rectangle vertical (Recangle Vertical) that is a rectangular having a major axis in a vertical direction,
a rectangle horizontal (Recangle Horizontal) that is a rectangular having a major axis in a horizontal direction.

(17) The data according to (16), in which a plurality of types of the variable patterns is arranged in the pattern image at positions that allow the position of the feature point in the search range to be uniquely determined by decoding the code string.

(18) The data according to (17), in which a plurality of types of the variable patterns is arranged in the pattern image at positions that allow the position of the feature point in the search range to be uniquely determined by decoding a portion of the code string.

(19) A recording medium in which data of a pattern image is recorded, the pattern image including a predetermined feature point and a predetermined variable pattern, the pattern image being directed to detecting of corresponding points of a projected image projected by a projecting unit and a captured image captured by an imaging unit, the pattern image including the feature point and the variable pattern that are arranged to allow for unique determination of a position of the feature point in the pattern image on the basis of a code string resulting from subjecting the variable pattern group around the feature point to conversion into variables and permutational expansion.

(20) An image processing apparatus including a generating unit that generates data of a pattern image, the pattern image including a predetermined feature point and a predetermined variable pattern, the pattern image being directed to detecting of corresponding points of a projected image projected by a projecting unit and a captured image captured by an imaging unit, the pattern image including the feature point and the variable pattern that are arranged to allow for unique determination of a position of the feature point in the pattern image on the basis of a code string resulting from subjecting the variable pattern group around the feature point to conversion into variables and permutational expansion.

<Control Apparatus>

(31) An image processing apparatus including:
a prior correcting unit that performs correction on a pattern image on the basis of prior calibration information, the pattern image including a predetermined feature point and a predetermined variable pattern, the pattern image being directed to detection of corresponding points of a projected image projected by a projecting unit and a captured image captured by an imaging unit, the correction correcting a captured image of the projected image to cause the feature point and the variable pattern to be positioned at a predetermined pixel, the captured image of the projected image being captured by the imaging unit; and a control unit that controls the projecting unit to project, as an image of invisible light, the pattern image after being subjected to the correction performed by the prior correction unit.

(32) The image processing apparatus according to (31), further including a correcting unit that corrects a captured image obtained by imaging, of the pattern image of invisible light projected by the projecting unit, performed by the imaging unit controlled by the control unit, the correcting unit thereby causing each of the feature point and the variable pattern in the pattern image to be positioned at the predetermined pixel.

(33) The image processing apparatus according to (32), in which the control unit controls a plurality of the projecting units to project the pattern images after the correction as the images of the invisible light at timings different from each other, and the control unit controls the imaging unit to capture an image of each of the pattern images of the invisible light projected by the respective projecting units.

(34) The image processing apparatus according to (33), in which, when controlling the projecting unit to project a moving image, the control unit causes the projecting unit to sequentially project, for every consecutive six frames in the moving image, images of an R-component of the visible light in first two frames of the six frames, images of a G-component of the visible light in subsequent two frames of the six frames, images of a B-component of the visible light in subsequent two frames of the six frames, and the pattern image of the invisible light.

(35) The image processing apparatus according to (34), in which the control unit controls the projecting unit to project the pattern image for a period corresponding to two frames.

(36) The image processing apparatus according to (35), in which the control unit controls four or more the projecting units to project the image of each color component of the visible light in each of the frames in the moving image and the pattern image of the invisible light in each of the frames in the moving image for the same period.

(37) The image processing apparatus according to (36), in which the control unit controls the imaging unit to capture an image of the projected image for every two frames in synchronization with projection timing of each of the frames in the moving image, the control unit thereby causing the imaging unit to capture an image of the pattern image of the invisible light projected by each of the projecting units.

(38) The image processing apparatus according to any one of (32) to (37), further including:

a feature point detecting unit that detects the feature point from the captured image after the correction performed by the correcting unit;

a variable pattern detecting unit that detects the variable pattern from the captured image after the correction performed by the correcting unit; and a decoding unit that performs decoding of a code string and specify a position of the feature point in the pattern image on the basis of an obtained result of the decoding, the code string corresponding to a plurality of variable patterns, the variable patterns corresponding to the feature point detected by the feature point detecting unit and being detected by the variable pattern detecting unit.

(39) The image processing apparatus according to (38), in which the feature point detecting unit determines similarity between each pixel in a search range of the feature point and a template image of the feature point, and detects the feature point on the basis of a degree of the similarity.

(40) The image processing apparatus according to (39), in which the feature point detecting unit detects, as the feature point, a pixel having the similarity that is highest in a predetermined range.

(41) The image processing apparatus according to (40), in which the feature point detecting unit selects the feature point in descending order of the similarity degree in a case where the feature points are detected more than the number of the feature point in the search range determined on the basis of the pattern image.

(42) The image processing apparatus according to any one of (38) to (41), in which the feature point detecting unit converts detected feature point coordinates of integer accuracy into that of decimal point accuracy.

(43) The image processing apparatus according to any one of (38) to (42), in which the variable pattern detecting unit binarizes the captured image after the correction, detects a contour of the variable pattern in the binarized captured image, calculates a feature amount of the variable pattern with the detected contour, and identify the variable pattern on the basis of the calculated feature amount.

(44) The image processing apparatus according to (43), in which the variable pattern detecting unit calculates the feature amount on the basis of one or more of a luminance value at center of gravity, a ratio between a minor-axis component and a major-axis component, and inclination of the major-axis component, the variable pattern detecting unit identifying the variable pattern on the basis of the calculated feature amount.

(45) The image processing apparatus according to (44), in which the decoding unit arranges, in a predetermined order, codes corresponding to respective variable patterns that are detected by the variable pattern detecting unit and that are located within a predetermined range with reference to the feature point detected by the feature point detecting unit to perform conversion into a code string, compares the code string with information related to a code string included in the pattern image, and thereby specifies the position of the feature point in the pattern image.

(46) The image processing apparatus according to (44) or (45), in which the variable pattern detecting unit determines the variable pattern as a gray variable for which the variable pattern is not specified, in a case where the feature amount does not have a significant ratio between the minor-axis component and the major-axis component.

(47) The image processing apparatus according to any one of (43) to (46), in which the variable pattern detecting unit divides, when detecting the contour of the variable pattern, a detection target region into a plurality of partial regions, and performs detection of the contour of the variable pattern in the respective partial regions in parallel.

(48) The image processing apparatus according to any one of (31) to (47), further including the projecting unit.

(49) The image processing apparatus according to any one of (31) to (48), further including the imaging unit.

(50) An image processing method including:
correcting, by an image processing apparatus, a pattern image on the basis of prior calibration information to cause a feature point and a variable pattern to be positioned at a predetermined pixel by correcting a captured image of a projected image captured by an imaging unit, the pattern image including a predetermined feature point and a predetermined variable pattern, the pattern image being directed to detecting of corresponding points of a projected image projected by a projecting unit and a captured image captured by an imaging unit; and
controlling, by the image processing apparatus, the projecting unit to project the pattern image after the correction as an image of invisible light.

DESCRIPTION OF REFERENCE NUMBERS 100 projection imaging system, 101 control apparatus, 102 projection imaging apparatus, 111 projecting unit, 112 imaging unit, 121 control unit, 151 control unit, 152 IR-light output unit, 153 R-light output unit, 154 G-light output unit, 155 B-light output unit, 156 mirror, 157 lens unit, 201 CPU, 231 pattern generating unit, 232 pattern converting unit, 233 projection control unit, 234 imaging control unit, 235 ROI extracting unit, 236 image converting unit, 237 feature point detecting unit, 238 variable pattern detecting unit, 239 decoding unit, 241 prior calibration information storage unit, 242 pattern information storage unit, 301 pattern image, 311 feature point, 312 variable pattern, 401 template matching unit, 402 feature point detecting unit, 403 feature point improving unit, 441 binarizing unit, 442 contour detecting unit, 443 variable identification feature amount calculating unit, 444 variable identifying unit, 600 projection imaging system, 601 network, 610 projection imaging system, 611 projecting apparatus, 612 imaging apparatus, 620 projection imaging system, 621 projection imaging apparatus, 623 control unit, 630 projection imaging apparatus

The invention claimed is:

1. An image processing apparatus comprising:
a projector configured to
output invisible light and visible light via a same optical system, and
project an image of the invisible light and an image of the visible light to cause a portion or all of the image of the invisible light and a portion or all of the image of the visible light to be projected in a same region on a projection surface,
wherein the projector projects the image of the invisible light based on prior calibration information, and
wherein the image processing apparatus further comprises circuitry configured to perform correction on a pattern image on a basis of the prior calibration information, the pattern image including a predetermined feature point and a predetermined variable pattern, the pattern image being directed to detection of corresponding points of a projected image projected by the projector and a captured image captured by a camera, the correction correcting a captured image of the projected image to cause the feature point and the variable pattern to be positioned at a predetermined pixel, the captured image of the projected image being captured by the camera.

2. The image processing apparatus according to claim 1, wherein the invisible light comprises infrared light.

3. The image processing apparatus according to claim 1, wherein the circuitry is further configured to control the projector to project, as the image of invisible light, the pattern image after being subjected to the correction performed by the prior correction unit.

4. The image processing apparatus according to claim 3, wherein the circuitry is further configured to correct a captured image obtained by imaging of the pattern image of invisible light projected by the projector, performed by the camera controlled by the control unit, the correcting unit thereby causing each of the feature point and the variable pattern in the pattern image to be positioned at the predetermined pixel.

5. The image processing apparatus according to claim 4, wherein
the circuitry controls a plurality of respective projectors to project the pattern images after the correction as the images of the invisible light at timings respectively different from each other, and
the circuitry controls the camera to capture an image of each of the pattern images of the invisible light projected by the respective projectors.

6. The image processing apparatus according to claim 5, wherein, when controlling each projector to project a moving image, the circuitry causes the projector to sequentially project, for every consecutive six frames in the moving image, images of an R-component of the visible light in first two frames of the six frames, images of a G-component of the visible light in subsequent two frames of the six frames, images of a B-component of the visible light in subsequent two frames of the six frames, and the pattern image of the invisible light.

7. The image processing apparatus according to claim 6, wherein the circuitry controls each projector to project the pattern image for a period corresponding to two frames.

8. The image processing apparatus according to claim 7, wherein the circuitry controls four or more projectors to project the image of each color component of the visible light in each of the frames in the moving image and the pattern image of the invisible light in each of the frames in the moving image for a same period.

9. The image processing apparatus according to claim 8, wherein the circuitry controls the camera to capture an image of the projected image for every two frames in synchronization with projection timing of each of the frames in the moving image, the circuitry thereby causing the camera to capture an image of the pattern image of the invisible light projected by each of the projectors.

10. The image processing apparatus according to claim 4, wherein the circuitry is further configured to
detect the feature point from the captured image after the correction performed by the correcting unit,
detect the variable pattern from the captured image after the correction performed by the correcting unit, and
perform decoding of a code string and specify a position of the feature point, corresponding to the feature point detected by the feature point detecting unit, in the pattern image on a basis of an obtained result of the decoding the code string corresponding to a plurality of variable patterns, the variable patterns being detected by the variable pattern detecting unit.

11. The image processing apparatus according to claim 10, wherein the circuitry is further configured to
determine similarity between each pixel in a search range of the feature point and a template image of the feature point, and
detect the feature point on a basis of a degree of the similarity.

12. The image processing apparatus according to claim 11, wherein the circuitry detects, as the feature point, a pixel having the similarity that is highest in a predetermined range.

13. The image processing apparatus according to claim 10, wherein the circuitry converts detected feature point coordinates of integer accuracy into that of decimal point accuracy.

14. The image processing apparatus according to claim 10, wherein the circuitry binarizes the captured image after the correction, detects a contour of the variable pattern in the binarized captured image, calculates a feature amount of the variable pattern with the detected contour, and identify the variable pattern on a basis of the calculated feature amount.

15. The image processing apparatus according to claim 14, wherein the circuitry calculates the feature amount on a basis of one or more of a luminance value at center of gravity, a ratio between a minor-axis component and a major-axis component, and inclination of the major-axis component, the circuitry identifying the variable pattern on a basis of the calculated feature amount.

16. The image processing apparatus according to claim 15, wherein
the circuitry determines the variable pattern as a gray variable for which the variable pattern is not specified, in a case where the feature amount does not have a significant ratio between the minor-axis component and the major-axis component, and
the decoding unit circuitry specifies the position of the feature point in the pattern image on a basis of a code string corresponding to a variable pattern other than the gray variable.

17. The image processing apparatus according to claim 14, wherein the circuitry divides, when detecting the contour of the variable pattern, a detection target region into a plurality of partial regions, and performs detection of the contour of the variable pattern in the respective partial regions in parallel.

18. The image processing apparatus according to claim 3, wherein the pattern image includes the feature point and the variable pattern that are arranged such that a position of the feature point in the pattern image is determined uniquely on a basis of a code string resulting from conversion of a group of the variable patterns around the feature point into variables.

19. The image processing apparatus according to claim 18, wherein the feature point is an intersection of a wavy line and a line segment.

20. An image processing method comprising:
outputting, by an image processing apparatus, invisible light and visible light via a same optical system; and
projecting an image of the invisible light and an image of the visible light to cause the image of the invisible light and the image of the visible light to be superimposed on each other,
wherein the image of the invisible light is projected based on prior calibration information, and
wherein the image processing method further comprises performing correction on a pattern image on a basis of the prior calibration information, the pattern image including a predetermined feature point and a predetermined variable pattern, the pattern image being directed to detection of corresponding points of a projected image projected by the projector and a captured image captured by a camera, the correction correcting a captured image of the projected image to cause the feature point and the variable pattern to be positioned at a predetermined pixel, the captured image of the projected image being captured by the camera.

* * * * *